(12) United States Patent
Nose et al.

(10) Patent No.: US 12,305,736 B2
(45) Date of Patent: May 20, 2025

(54) PARALLEL LINK MECHANISM AND LINK ACTUATION DEVICE

(71) Applicant: NTN CORPORATION, Osaka (JP)

(72) Inventors: Kenzou Nose, Iwata (JP); Hideki Matsuzawa, Iwata (JP)

(73) Assignee: NTN CORPORATION, Osaka (JP)

( * ) Notice: Subject to any disclaimer, the term of this patent is extended or adjusted under 35 U.S.C. 154(b) by 495 days.

(21) Appl. No.: 17/441,669

(22) PCT Filed: Mar. 18, 2020

(86) PCT No.: PCT/JP2020/012004
§ 371 (c)(1),
(2) Date: Sep. 21, 2021

(87) PCT Pub. No.: WO2020/196164
PCT Pub. Date: Oct. 1, 2020

(65) Prior Publication Data
US 2022/0166288 A1    May 26, 2022

(30) Foreign Application Priority Data

Mar. 22, 2019  (JP) ................................ 2019-054806
Aug. 8, 2019   (JP) ................................ 2019-145973

(51) Int. Cl.
*F16H 21/02*    (2006.01)
*B25J 9/00*     (2006.01)
(Continued)

(52) U.S. Cl.
CPC ............ *F16H 21/02* (2013.01); *B25J 9/0048* (2013.01); *B25J 9/1623* (2013.01); *F16H 21/46* (2013.01)

(58) Field of Classification Search
CPC .... B25J 9/0048; B25J 9/1623; B25J 17/0216; F16H 21/02; F16H 21/46
See application file for complete search history.

(56) References Cited

U.S. PATENT DOCUMENTS 6,196,081 B1 * 3/2001 Yau ........................ B23Q 3/18
                                                901/29
9,109,743 B2 * 8/2015 Schwab .................. F16H 21/46
(Continued)

FOREIGN PATENT DOCUMENTS

CN   201364233 Y    12/2009
CN   105965474 A  * 9/2016  .......... B25J 19/0091
(Continued)

OTHER PUBLICATIONS

Andrea Bulgarelli et al., "A Low-cost Open Source 3D-Printable Dexterous Anthropomorphic Robotic Hand with a Parallel Spherical Joint Wrist for Sign Languages Reproduction" International Journal of Advanced Robotic Systems, May 2016.
(Continued)

Primary Examiner — Bobby Rushing, Jr.
(74) Attorney, Agent, or Firm — Rimon P.C.

(57) ABSTRACT

A parallel link mechanism includes a proximal end-side link hub, three link mechanisms, a rotating body, and a distal end-side link hub. The rotating body is connected to one link mechanism among the three link mechanisms. The rotating body is rotatably coupled to the proximal end-side link hub. In the link mechanism, a first center axis of a first revolute pair portion intersects with a second center axis of a second revolute pair portion at a spherical link center point. The rotation center axis of the rotating body intersects with the spherical link center point.

19 Claims, 40 Drawing Sheets

(51) Int. Cl.
    B25J 9/16        (2006.01)
    F16H 21/46    (2006.01)

(56) References Cited

U.S. PATENT DOCUMENTS

| | | | |
|---|---|---|---|
| 9,205,566 B2 * | 12/2015 | Schwab | B25J 17/0266 |
| 2002/0166404 A1 | 11/2002 | Rosheim | |
| 2012/0286123 A1 | 11/2012 | Schwab | |
| 2013/0055843 A1 | 3/2013 | Isobe et al. | |
| 2014/0060234 A1 | 3/2014 | Uemura | |
| 2016/0256998 A1 * | 9/2016 | Isobe | F16H 21/46 |
| 2017/0014994 A1 | 1/2017 | Isobe et al. | |
| 2017/0333724 A1 * | 11/2017 | Lee | A61B 90/50 |
| 2019/0047159 A1 | 2/2019 | Isobe et al. | |
| 2019/0105769 A1 | 4/2019 | Nose et al. | |
| 2020/0206897 A1 | 7/2020 | Isobe et al. | |

FOREIGN PATENT DOCUMENTS

| | | | | |
|---|---|---|---|---|
| CN | 107363814 A | * | 11/2017 | B25J 9/0033 |
| CN | 107932480 A | * | 4/2018 | |
| CN | 108972505 A | * | 12/2018 | |
| EP | 0987087 A2 | | 3/2000 | |
| FR | 2770432 A1 | * | 5/1999 | B23Q 1/5462 |
| JP | 2000-094245 A | | 4/2000 | |
| JP | 2011-240440 A | | 12/2011 | |
| JP | 2013-517951 A | | 5/2013 | |
| JP | 2014-46434 A | | 3/2014 | |
| JP | 2015-194207 A | | 11/2015 | |
| JP | 2015-224786 A | | 12/2015 | |
| JP | 2016-223482 A | | 12/2016 | |
| JP | 2017-193009 A | | 10/2017 | |
| JP | 2017-219122 A | | 12/2017 | |
| JP | 2018-167350 A | | 11/2018 | |
| JP | 2018-168885 A | | 11/2018 | |
| JP | 2018-194056 A | | 12/2018 | |
| JP | 2019-58969 A | | 4/2019 | |
| WO | 2011/145499 A1 | | 11/2011 | |
| WO | 2018/008491 A1 | | 1/2018 | |

OTHER PUBLICATIONS

Bassem Sudki et al., "Marine Propulsor based on a Three-Degree-of-Freedom Actuated Spherical Joint", Third International Symposium on Marine Propulsors smp'13, May 2013.

Isobe, Hiroshi et al., "Parallel Link High Speed Angle Control Equipment", 2013 Society for Precision Engineering spring convention academic lecture meeting lecture papers, Feb. 2013.

E. Cavallo et al., "A Robotic Equipment For The Guidance Of A Vectored Thrustor AUV", 35th International Symposium on Robotics International Search Report 2004, Paris, Mar. 23-26, 2004.

Marc Simnofske et al., "Active Ankle—an Almost-Spherical Parallel Mechanism", International Symposium on Robotics, Sep. 2016.

Sylvie Leguay-Durand et al., "Optimal design of a redundant spherical parallel manipulator", Robotica (1997) vol. 15, pp. 399-405, Jul. 1, 1997, Cambridge University Press.

International Search Report issued in corresponding International Patent Application No. PCT/JP2020/012004, dated May 12, 2020, with English translation.

Bulgarelli et al., A Low-cost Open Source 3D-Printable Dexterous Anthropomorphic Robotic Hand with a Parallel Spherical Joint Wrist for Sign Languages Reproduction, published by the International Journal of Advanced Robotic Systems, accessible at https://journals.sagepub.com/doi/epub/10.5772/64113, published May-Jun. 2016.

Simnofske et al., Active Ankle—an Almost-Spherical Parallel Mechanism, accessible at https://ieeexplore.ieee.org/abstract/document/7559094, published Sep. 5, 2016.

Leguay-Durand et al., Optimal design of a redundant spherical parallel manipulator, accessible at https://www.cambridge.org/core/journals/robotica/article/abs/optimal-design-of-a-redundant-spherical-parallel-manipulator/CB41E12389F538B4E93B3E5678CF0152, published Jul. 1, 1997.

Sudki et al., Marine Propulsor based on a Three-Degree-of-Freedom Actuated Spherical Joint, published for the Third International Symposium on Marine Propulsors SMP '13, accessible at https://www.marinepropulsors.com/proceedings/2013/10A.3.pdf, published May 2013.

Cavallo et al., A Robotic Equipment for the Guidance of a Vectored Thrustor AUV, published for the 35th International Symposium on Robotics ISR 2004, Mar. 23-26, 2004, accessible at https://www.researchgate.net/publication/255593233, published Mar. 2004.

Shintemirov et al., Numerical Optimal Control of a Spherical Parallel Manipulator Based on Unique Kinematic Solutions, accessible at https://www.researchgate.net/publication/282397532, published Jan. 2015.

* cited by examiner

PARALLEL LINK MECHANISM AND LINK ACTUATION DEVICE

CROSS REFERENCE TO RELATED APPLICATIONS

This patent application is the U.S. National Phase under 35 U.S.C. § 371 of International Application No. PCT/JP2020/012004, filed on Mar. 18, 2020, which claims the benefit of Japanese Patent Application No. 2019-054806, dated Mar. 22, 2019, and Japanese Patent Application No. 2019-145973, dated Aug. 8, 2019, the entire contents of each are hereby incorporated by reference in their entirety.

TECHNICAL FIELD

The present invention relates to a parallel link mechanism and a link actuation device.

BACKGROUND ART

Conventionally, parallel link mechanisms for use in various apparatuses such as medical equipment and industrial equipment are known (for example, see Japanese Patent Laying-Open No 2000-94245 (PTL 1) and Japanese Patent Laying-Open No. 2015-194207 (PTL 2)).

CITATION LIST

Patent Literature

PTL 1: Japanese Patent Laying-Open No. 2000-94245
PTL 2: Japanese Patent Laying-Open No. 2015-194207

SUMMARY OF INVENTION

Technical Problem

The parallel link mechanism in PTL 1 has a relatively simple configuration but the operating angle of each link is small. Therefore, when a large operating range of the traveling plate is set, the link length is increased, leading to size increase of the entire mechanism and size increase of the apparatus. It is thus difficult to use this mechanism in applications that require a compact construction and require a precise and wide operating range.

In the link actuation device in PTL 2, a proximal end-side link hub and a distal end-side link hub are coupled through three or more sets of link mechanisms in a four-bar chain. The link actuation device in PTL 2 is compact and can operate in a precise and wide operating range.

However, in the link actuation device in PTL 2, the distal end-side link hub operates in two degrees of freedom of rotation for the posture control drive sources provided at three or more sets of link mechanisms. Therefore, in order to add another degree of freedom of rotation, a mechanism that rotates the entire device is required outside the link actuation device. As a result, the size of the entire device is increased. Moreover, because of the structure, the radius of rotation of the distal end-side link hub changes in accordance with the bend angle of the link mechanism, and the position of the center of rotation in rotational movement of the distal end-side link hub is unable to be fixed. That is, the distal end-side link hub is unable to move on a sphere having a certain radius from the fixed center of rotation as viewed from the proximal end-side link hub and, therefore, it is difficult to imagine the operation of the distal end-side link hub.

An object of the present invention is to provide a parallel link mechanism and a link actuation device in which a distal end member is movable on a sphere having a certain radius from a fixed center of rotation.

Solution to Problem

A parallel link mechanism according to the present disclosure includes a proximal end-side link hub, three or more link mechanisms, one or more rotating bodies, and a distal end-side link hub. The one or more rotating bodies are connected to at least one link mechanism among the three or more link mechanisms. The one or more rotating bodies are rotatably coupled to the proximal end-side link hub. Each of the three or more link mechanisms includes a first link member and a second link member. The first link member is fixed to the one or more rotatable bodies. The second link member is rotatably connected to the first link member at a first revolute pair portion. The second link member is rotatably connected to the distal end-side link hub at a second revolute pair portion. In the three or more link mechanisms, a first center axis of the first revolute pair portion intersects with a second center axis of the second revolute pair portion at a spherical link center point. A rotation center axis of the one or more rotating bodies intersects with the spherical link center point.

A link actuation device according to the present disclosure includes the parallel link mechanism described above and a posture control drive source. The posture control drive source rotates at least three rotating bodies among three or more rotating bodies and changes a posture of the distal end-side link hub as desired relative to the proximal end-side link hub.

The present disclosure relates to a link actuation device including a parallel link mechanism and a control device. The parallel link mechanism includes a proximal end-side first link hub, at least three link mechanisms, a first rotating body and a second rotating body respectively connected to a first link mechanism and a second link mechanism among the at least three link mechanisms, and a distal end-side second link hub. Each of the first rotating body and the second rotating body is rotatably coupled to the first link hub. Each of the at least three link mechanisms includes a first link member and a second link member rotatably connected to the first link member at a first revolute pair portion. The second link member is rotatably connected to the second link hub at a second revolute pair portion. The first link member of the first link mechanism is fixed to the first rotating body, and the first link member of the second link mechanism is fixed to the second rotating body. In the at least three link mechanisms, a first center axis of the first revolute pair portion intersects with a second center axis of the second revolute pair portion at a spherical link center point. A rotation center axis of the first rotating body and the second rotating body intersects with the spherical link center point. When the control device receives information representing a normal vector corresponding to a posture of the second link hub relative to the spherical link center point, the control device determines rotation angles of the first rotating body and the second rotating body.

Preferably, the parallel link mechanism further includes a third rotating body connected to a third link mechanism among the at least three link mechanisms. When the control device receives the information, the control device determines rotation angles of the first to third rotating bodies.

More preferably, when a bend angle indicated by the normal vector indicated by the information is unable to be achieved with a rotation angle of the third rotating body at a point of time when the information is received, the control device changes the rotation angle of the first rotating body and determines rotation angles of the first to third rotating bodies such that the bend angle is achieved.

Further preferably, when the rotation angle of the third rotating body is changed, the control device also executes a rotation process for an end effector attached to the second link hub.

Advantageous Effects of Invention

According to the description above, a parallel link mechanism and a link actuation device are provided in which a distal end member is movable on a sphere having a certain radius from a fixed center of rotation.

DESCRIPTION OF EMBODIMENTS

Figure 1:
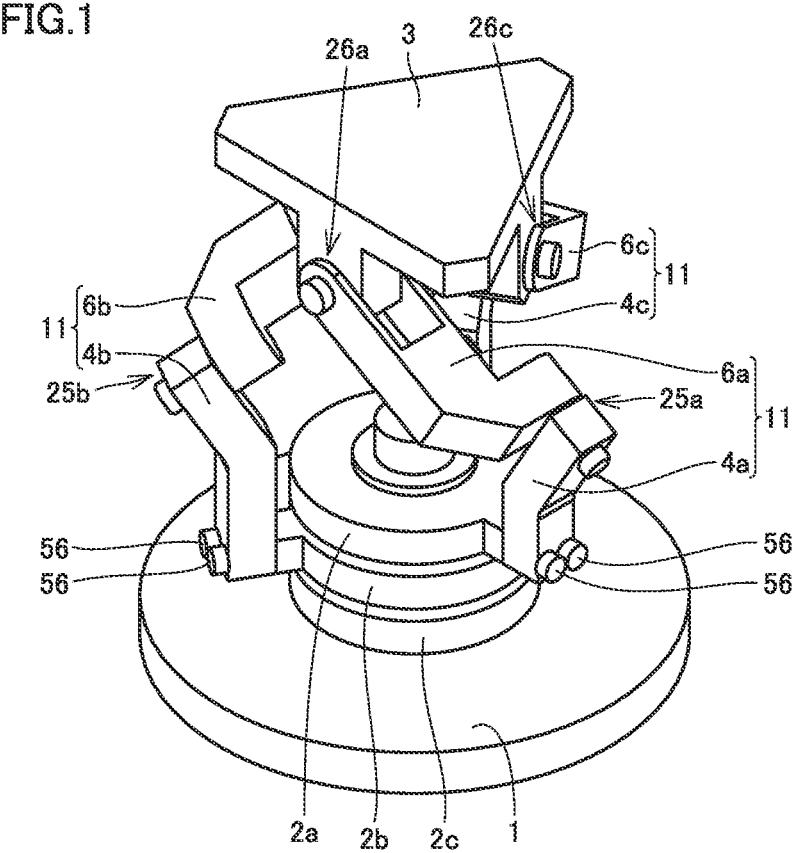
FIG. 1 is a perspective view illustrating a configuration of a parallel link mechanism according to a first embodiment.

Embodiments of the present invention will be described below with reference to the drawings. In the following drawings, like or corresponding parts in the drawings are denoted by like reference numerals and a description thereof is not repeated.

First Embodiment

<Configuration of Parallel Link Mechanism>

Figure 2:
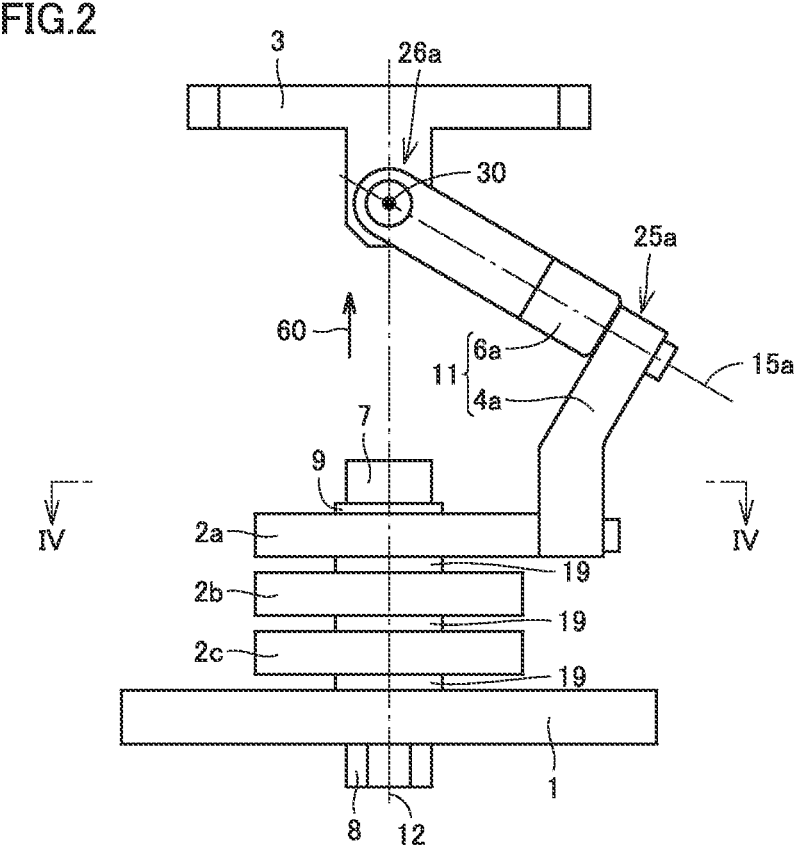
FIG. 2 is a front view of the parallel link mechanism illustrated in FIG. 1.
Figure 3:
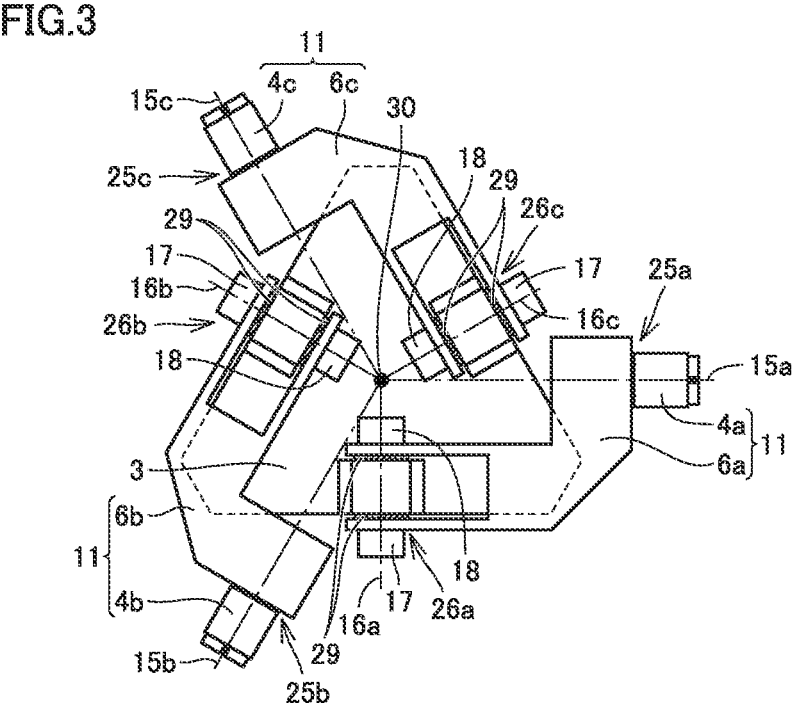
FIG. 3 is a partial view of a distal end-side link hub and a link mechanism as viewed from the direction along arrow 60 in FIG. 2.
Figure 4:
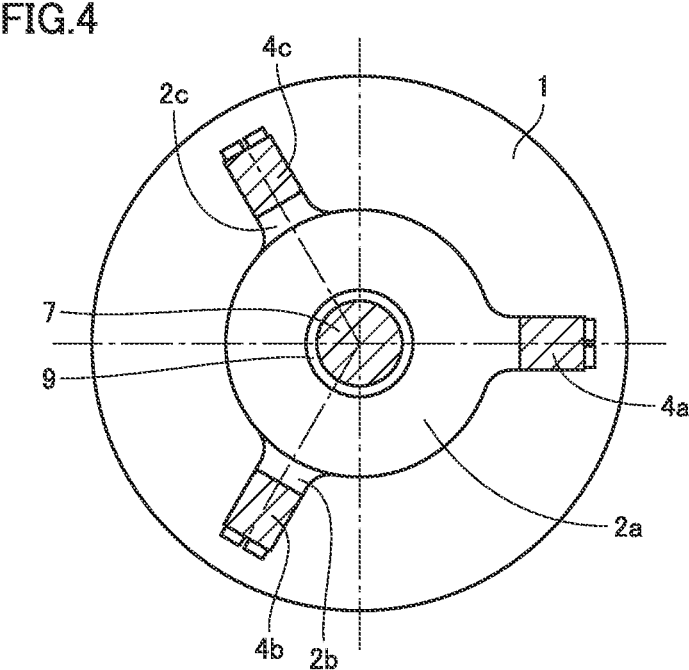
FIG. 4 is a cross-sectional view along line IV-IV in FIG. 2.

FIG. 1 is a perspective view illustrating a configuration of a parallel link mechanism according to a first embodiment. FIG. 2 is a front view of the parallel link mechanism illustrated in FIG. 1. FIG. 3 is a partial view of a distal end-side link hub and a link mechanism as viewed from the direction along arrow 60 in FIG. 2. FIG. 4 is a cross-sectional view along line IV-IV in FIG. 2.

A parallel link mechanism illustrated in FIG. 1 to FIG. 4 includes a proximal end-side link hub 1, three link mechanisms 11, three rotating bodies 2a to 2c, and a distal end-side link hub 3. Proximal end-side link hub 1 is a disc-shaped member. Although the two-dimensional shape of proximal end-side link hub 1 illustrated in FIG. 1 is circular, the two-dimensional shape may be a polygonal shape such as a triangular shape or a quadrangular shape or any other shape such as an oval shape or a semi-circular shape. Furthermore, proximal end-side link hub 1 may be a plate-like body as illustrated in FIG. 1, or may have any other shape or may be a part of another mechanical device. The number of link mechanisms 11 is three or more, for example, may be four or five.

Three rotating bodies 2a to 2c are rotatably coupled to proximal end-side link hub 1 in a stacked state such that their respective rotation center axes 12 are coincident. Three rotating bodies 2a to 2c are connected to proximal end-side link hub 1 by a bolt 7 and a nut 8 serving as fastening members. Three rotating bodies 2a to 2c each have a hole at the center to allow the bolt 7 to pass through. A washer 9 is arranged between the head at an end of bolt 7 and rotating body 2a. Rotation friction reducing members 19 are arranged between the stacked three rotating bodies 2a to 2c. Rotation friction reducing member 19 is also arranged between proximal end-side link hub 1 and rotating body 2c located closest to proximal end-side link hub 1 among the stacked three rotating bodies 2a to 2c.

The two-dimensional shape of three rotating bodies 2a to 2c is substantially circular. Three rotating bodies 2a to 2c have protrusions for connecting link mechanisms 11 at the respective outer peripheral portions. The protrusions are convex portions protruding from the outer peripheral end faces of rotating bodies 2a to 2c to the outside. Three rotating bodies 2a to 2c are each connected to the corresponding one of the three link mechanisms 11 at the protrusion.

Three link mechanisms 11 include respective first link members 4a to 4c and respective second link members 6a to 6c. The first first link member 4a is fixed to the protrusion of rotating body 2a. The second first link member 4b is fixed to the protrusion of rotating body 2b. The third first link member 4c is fixed to the protrusion of rotating body 2c. Any method can be used to fix the first link members 4a to 4c to the protrusions of rotating bodies 2a to 2c. For example, first link members 4a to 4c may be fixed to rotating bodies 2a to 2c by screws 56 serving as fastening members. Alternatively, first link members 4a to 4c may be fixed to the protrusions of rotating bodies 2a to 2c by welding or may be fixed through an adhesive layer.

First link members 4a to 4c each have a pillar-like shape having a bending portion. The lengths of first link members 4a to 4c are different from each other. First link member 4c connected to rotating body 2c arranged at a position closest to proximal end-side link hub 1 is longest. First link member 4a connected to rotating body 2a arranged farthest from proximal end-side link hub 1 is shortest. First link members 4a to 4c each have a first portion extending vertically to a surface of the corresponding one of rotating bodies 2a to 2c, a second portion extending diagonally to the direction in which the first portion extends, and the bending portion that is a connection portion between the first portion and the second portion. As illustrated in FIG. 2, one end of the first portion of each of first link members 4a to 4c is fixed to the corresponding one of rotating bodies 2a to 2c. The other end on the opposite side to one end of the first portion is connected to one end of the second portion. The other end on the opposite side to one end of the second portion is rotatably connected to the corresponding one of second link members 6a to 6c The second portion is formed such that the distance from rotation center axis 12 of rotating bodies 2a to 2c gradually increases from one end toward the other end. That is, the direction in which the second portions of first link members 4a to 4c extend is inclined relative to rotation center axis 12.

The first second link member 6a is rotatably connected to first link member 4a at a first revolute pair portion 25a. The second second link member 6b is rotatably connected to first link member 4b at a first revolute pair portion 25b. The third second link member 6c is rotatably connected to first link member 4c at a first revolute pair portion 25c. First revolute pair portions 25a to 25c have first center axes 15a to 15c, respectively. First center axes 15a to 15c extend in a direction toward rotation center axis 12 of rotating bodies 2a to 2c Furthermore, first center axes 15a to 15c are inclined relative to rotation center axis 12 such that the distance from rotating bodies 2a to 2c increases as the distance to rotation center axis 12 decreases.

First revolute pair portions 25a to 25c may have any structure. For example, first revolute pair portions 25a to 25c each may be formed with a shaft portion extending along first center axis 15a to 15c, a portion of first link member 4a to 4c having a through hole into which the shaft portion is inserted, and a portion of second link member 6a to 6b having a through hole into which the shaft portion is inserted. In this case, first link members 4a to 4c and second link members 6a to 6c are rotatable about the respective shaft portions. For example, nuts serving as positioning members may be fixed to both ends of each shaft portion in order to prevent the shaft portions from dropping off from the through holes of first link members 4a to 4c and second link members 6a to 6c.

Alternatively, the shaft portion may be connected to one of first link member 4a to 4c and second link member 6a to 6c, and the shaft portion may be inserted into the through hole formed in the other of first link member 4a to 4c and second link member 6a to 6c. The other of first link member 4a to 4c and second link member 6a to 6c may be rotatable around the shaft portion. For example, a nut serving as a positioning member may be fixed to a distal end of the shaft portion in order to prevent the shaft portion from dropping off from the through hole.

The second link members 6a to 6c each include a first portion extending in a direction intersecting the direction in which first center axis 15a to 15c extends and a second portion extending from a distal end of the first portion along first center axis 15a to 15c. A base portion on the opposite side to the distal end of the first portion is a portion of first revolute pair portion 25a to 25c rotatably connected to first link member 4a to 4c.

Second link members 6a to 6c are rotatably connected to distal end-side link hub 3 at second revolute pair portions 26a to 26c. Second revolute pair portions 26a to 26c have second center axes 16a to 16c, respectively. Specifically, second revolute pair portions 26a to 26c each include a shaft portion extending along second center axis 16a to 16c, a protrusion of distal end-side link hub 3 having a through hole into which the shaft portion is inserted, and a pair of wall portions arranged to sandwich the protrusion and having through holes into which the shaft portion is inserted. A pair of wall portions are formed at a distal end of the second portion of each of second link members 6a to 6c. The shaft portion is formed with a bolt 17 and a nut 18. The protrusion of the distal end-side link hub 3 and each of second link members 6a to 6c are rotatable around the shaft portion. As illustrated in FIG. 3, rotation resistance reducing members 29 are arranged between a pair of wall portions and the protrusion of distal end-side link hub 3. Any member that can reduce the friction coefficient between the pair of wall portions and the protrusion can be used as rotation friction reducing member 29. For example, a resin shim washer with a lower friction coefficient can be used as rotation friction reducing member 29.

Second center axes 16a to 16c extend in a direction different from first center axes 15a to 15c and extend in a direction toward rotation center axis 12 of rotating bodies 2a to 2c. Second center axes 16a to 16c extend, for example, in a direction orthogonal to rotation center axis 12 of rotating bodies 2a to 2c.

In three link mechanisms 11, first center axes 15a to 15c of first revolute pair portions 25a to 25c intersect with second center axes 16a to 16c of second revolute pair portions 26a to 26c at a spherical link center point 30. Rotation center axis 12 of three or more rotating bodies 2a to 2c intersects with spherical link center point 30. As long as the relation above is satisfied, the arrangement of first revolute pair portions 25a to 25c and second revolute pair portions 26a to 26c can be changed as desired. As can be seen from FIG. 3, in each of three second link members 6a to 6c, the angle formed between first center axis 15a to 15c and second center axis 16a to 16c is substantially 90° as viewed from distal end-side link hub 3 (hereinafter, two-dimensional view). Furthermore, first center axes 15a to 15c are arranged at regular intervals in a circumferential direction around spherical link center point 30.

The two-dimensional shape of distal end-side link hub 3 is hexagonal but may be any other polygonal shape. The two-dimensional shape may be any shape such as a circular shape or an oval shape.

Three link mechanisms 11 are arranged at regular intervals on a circumference in a two-dimensional view. That is, for first center axes 15a to 15c, the angle formed between adjacent two first center axes is 120° as viewed from spherical link center point 30 in a two-dimensional view. Furthermore, for second center axes 16a to 16c, the angle formed between adjacent two second center axes is 120° as viewed from spherical link center point 30 in a two-dimensional view. Three link mechanisms 11 may be arranged at different intervals on a circumference in a two-dimensional view.

<Operation of Parallel Link Mechanism>

Figure 5:
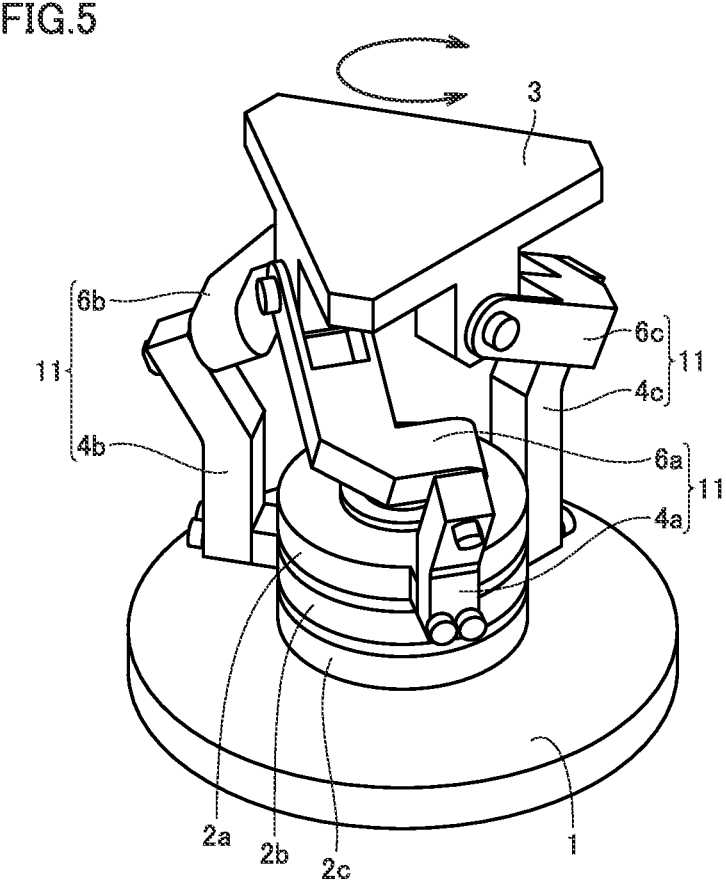
FIG. 5 is a perspective view for explaining operation of the parallel link mechanism illustrated in FIG. 1.
Figure 6:
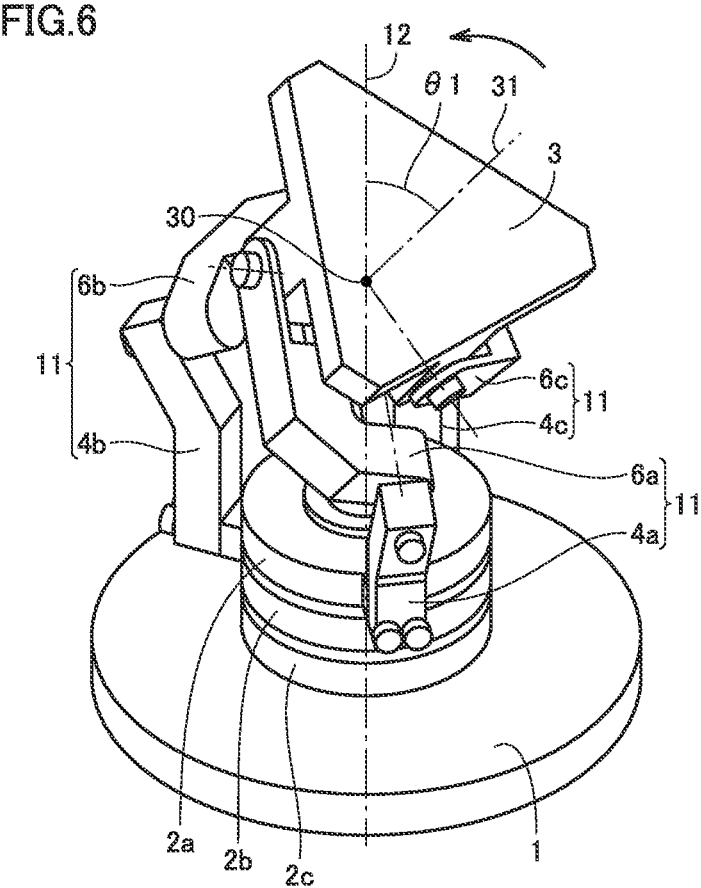
FIG. 6 is a perspective view for explaining operation of the parallel link mechanism illustrated in FIG. 1.
Figure 7:
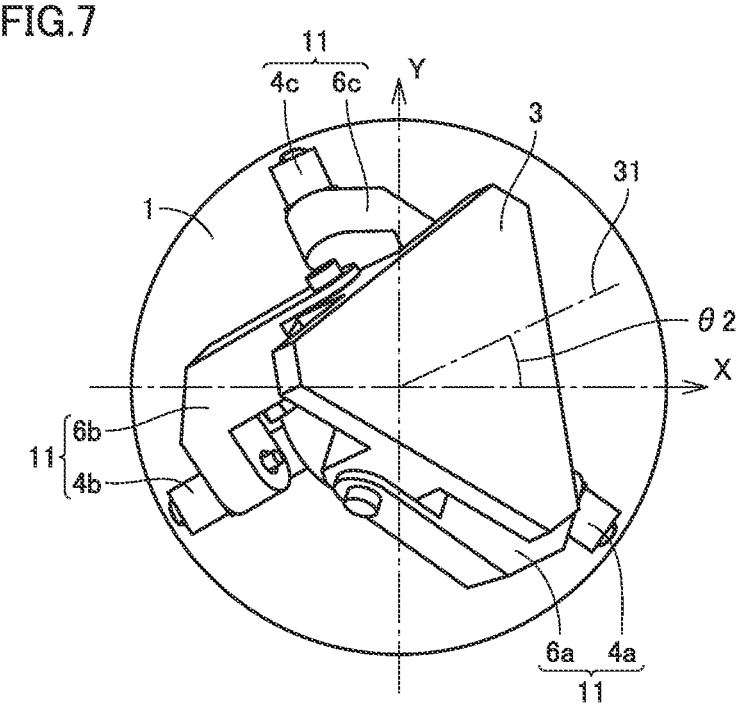
FIG. 7 is a top view of the parallel link mechanism illustrated in FIG. 6.

FIG. 5 is a perspective view for explaining operation of the parallel link mechanism illustrated in FIG. 1. FIG. 6 is a perspective view for explaining operation of the parallel link mechanism illustrated in FIG. 1. FIG. 7 is a top view of the parallel link mechanism illustrated in FIG. 6.

As illustrated in FIG. 5, all rotating bodies 2a to 2c are rotated by the same angle in the same direction as shown by the arrow in FIG. 5 so that distal end-side link hub 3 can be rotated around rotation center axis 12 (see FIG. 2) while the posture of distal end-side link hub 3 is maintained. Here, the relative positional relation between the protrusions of rotating bodies 2a to 2c is maintained.

As illustrated in FIG. 6, the rotation direction or the rotation angle of three rotating bodies 2a to 2c are varied so that the posture of distal end-side link hub 3 relative to proximal end-side link hub 1 can be changed as desired. That is, the rotation angles of three rotating bodies 2a to 2c are controlled so that bend angle θ1, traverse angle θ2, and the rotation angle in the posture of distal end-side link hub 3 as viewed from spherical link center point 30 can be controlled. That is, the posture of distal end-side link hub 3 has three degrees of freedom, namely, bend angle θ1, traverse angle θ2, and rotation angle.

As illustrated in FIG. 6, as used herein bend angle θ1 is the angle formed by a distal end-side link hub center axis 31, which is a straight line vertical to all of second center axes 16a to 16c and passing through spherical link center point 30, and rotation center axis 12 of rotating bodies 2a to 2c. As illustrated in FIG. 7, traverse angle θ2 is the angle formed by a projection line of the distal end-side link hub center axis 31 on a plane (XY plane) passing through spherical link center point 30 and to which rotation center axis 12 intersects vertically, and the X axis set on the XY plane where spherical link center point 30 is the origin. The rotation angle is the rotation angle when distal end-side link hub 3 rotates around rotation center axis 12 relative to proximal end-side link hub 1, as shown by the arrow in FIG. 5.

<Operation and Effect>

The parallel link mechanism according to the present disclosure includes proximal end-side link hub 1, three or more link mechanisms 11, three or more rotating bodies 2a to 2c, and distal end-side link hub 3. Three or more rotating bodies 2a to 2c are connected to the respective three or more link mechanisms 11. Three or more rotating bodies 2a to 2c are rotatably coupled to proximal end-side link hub 1 in a stacked state such that their respective rotation center axes 12 are coincident. Three or more link mechanisms 11 include respective first link members 4a to 4c and respective second link members 6a to 6c. First link members 4a to 4c are each fixed to the corresponding one of three or more rotating bodies 2a to 2c. Second link members 6a to 6c are rotatably connected to first link members 4a to 4c at first revolute pair portions 25a to 25c. Second link members 6a to 6c are rotatably connected to distal end-side link hub 3 at second revolute pair portions 26a to 26c. In three or more link mechanisms 11, first center axes 15a to 15c of first revolute pair portions 25a to 25c intersect with second center axes 16a to 16c of second revolute pair portions 26a to 26c at spherical link center point 30. Rotation center axis 12 of three or more rotating bodies 2a to 2c intersects with spherical link center point 30.

With this configuration, distal end-side link hub 3 can be operated relative to proximal end-side link hub 1 with three degrees of freedom of rotation. That is, three rotating bodies 2a to 2c are rotated, whereby distal end-side link hub 3 can be moved relative to proximal end-side link hub 1 along a sphere around spherical link center point 30, and distal end-side link hub 3 can also be rotated around rotation center axis 12. Furthermore, since the posture of distal end-side link hub 3 is controlled by rotation motion of rotating bodies 2a to 2c, a compact link actuation device including the parallel link mechanism described above can be implemented. In addition, since distal end-side link hub 3 moves along a sphere around spherical link center point 30, the operation of distal end-side link hub 3 is easily imaged.

<Modification>

Figure 8:
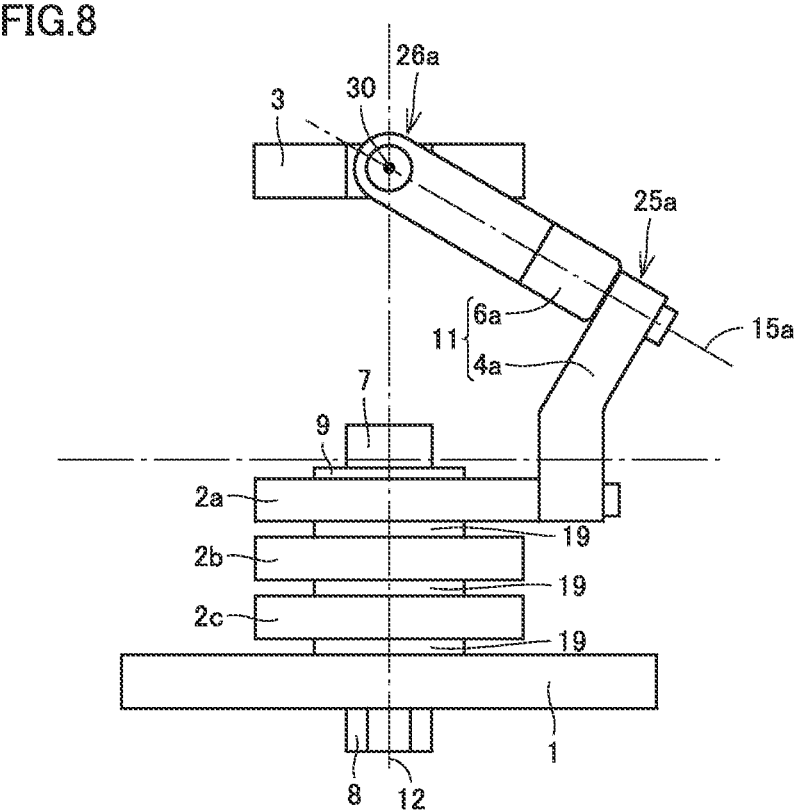
FIG. 8 is a front view illustrating a modification to the parallel link mechanism according to the first embodiment.

FIG. 8 is a front view illustrating a modification to the parallel link mechanism according to the first embodiment. The parallel link mechanism illustrated in FIG. 8 basically includes a configuration similar to the parallel link mechanism illustrated in FIG. 1 to FIG. 4 but differs from the parallel link mechanism illustrated in FIG. 1 to FIG. 4 in the shape of distal end-side link hub 3 and the configuration of second revolute pair portions 26a to 26c. That is, distal end-side link hub 3 has a plate-like shape, and second link members 6a to 6c are directly connected rotatably to the end face of the distal end-side link hub 3. The two-dimensional shape of distal end-side link hub 3 may be the same as the two-dimensional shape of distal end-side link hub 3 in the parallel link mechanism illustrated in FIG. 1 to FIG. 4 or may be any other shape. Furthermore, the connection portions between the end face of distal end-side link hub 3 and second link members 6a to 6c may have any configuration that allows second link member 6a to be rotatably connected to distal end-side link hub 3.

With such a configuration, the dimension in the height direction of the parallel link mechanism can be reduced, compared with the parallel link mechanism illustrated in FIG. 1 to FIG. 4. As a result, the parallel link mechanism can be further downsized.

Second Embodiment

<Configuration of Parallel Link Mechanism>

Figure 9:
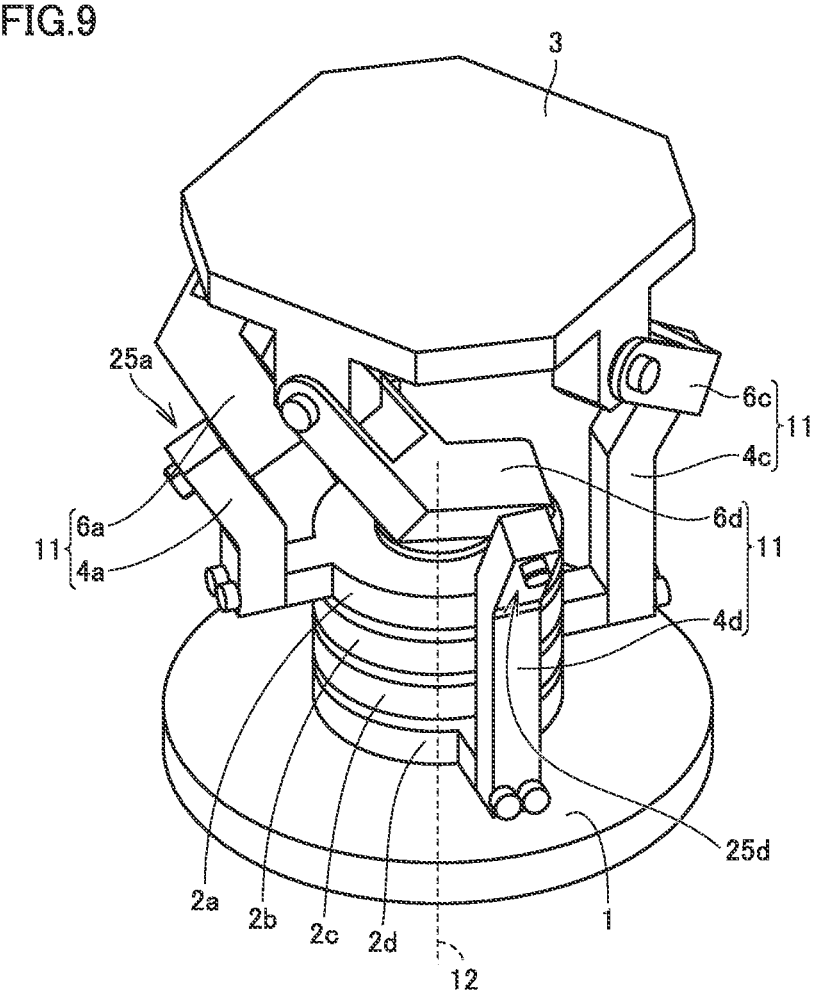
FIG. 9 is a perspective view illustrating a configuration of the parallel link mechanism according to a second embodiment.
Figure 10:
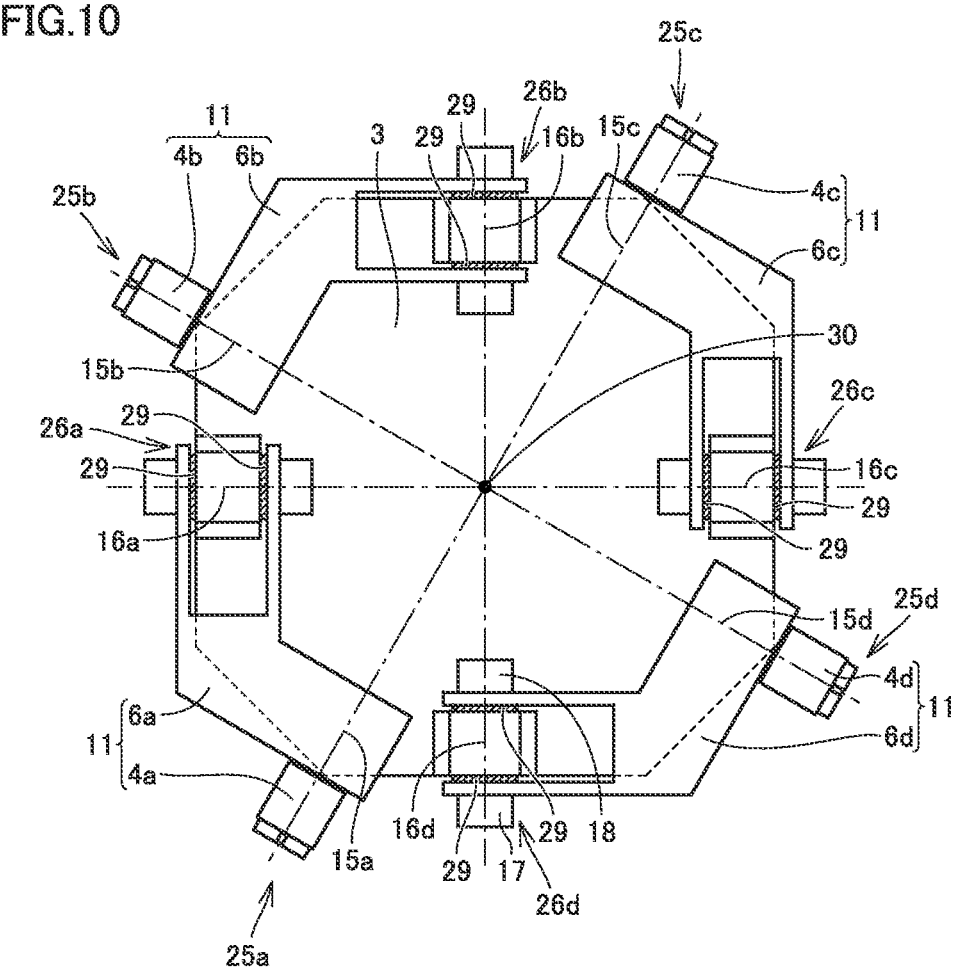
FIG. 10 is a partial view of the distal end-side link hub and the link mechanism of the parallel link mechanism illustrated in FIG. 9.

FIG. 9 is a perspective view illustrating a configuration of the parallel link mechanism according to a second embodiment. FIG. 10 is a partial view of the distal end-side link hub and the link mechanism of the parallel link mechanism illustrated in FIG. 9. The parallel link mechanism illustrated in FIG. 9 and FIG. 10 basically includes a configuration similar to the parallel link mechanism illustrated in FIG. 1 to FIG. 4 but differs from the parallel link mechanism illustrated in FIG. 1 to FIG. 4 in the number of rotating bodies 2a to 2d and link mechanisms 11 and the shape of distal end-side link hub 3. Specifically, the parallel link mechanism illustrated in FIG. 9 and FIG. 10 includes four rotating bodies 2a to 2d Four rotating bodies 2a to 2d are connected to proximal end-side link hub 1 in a stacked state so as to be independently rotatable. Rotating bodies 2a to 2d each have a protrusion on the outer peripheral portion.

Link mechanism 11 is connected to each of rotating bodies 2a to 2d. Four link mechanisms 11 include respective first link members 4a to 4d and respective second link members 6a to 6d. Three first link members 4a to 4c are fixed to the protrusions of rotating bodies 2a to 2c, respectively, similarly to the parallel link mechanism illustrated in FIG. 1 to FIG. 4. First link member 4d in the fourth link mechanism 11 is fixed to the protrusion of the fourth rotating body 2d.

First link members 4a to 4d each have a pillar-like shape having a bending portion, similarly to first link members 4a to 4c in the parallel link mechanism illustrated in FIG. 1 to FIG. 4. The lengths of first link members 4a to 4d are different from each other.

Three second link members 6a to 6c are rotatably connected to three first link members 4a to 4c at first revolute pair portions 25a to 25c, similarly to the parallel link mechanism illustrated in FIG. 1 to FIG. 4. The fourth second link member 6d is rotatably connected to the fourth first link member 4d at a first revolute pair portion 25d. First revolute pair portions 25a to 25d have first center axes 15a to 15d, respectively. First center axes 15a to 15d extend in a direction toward rotation center axis 12 of rotating bodies 2a to 2d. Furthermore, first center axes 15a to 15d are inclined relative to rotation center axis 12 such that the distance from rotating bodies 2a to 2d increases as the distance to rotation center axis 12 decreases.

Second link members 6a to 6d each include a first portion extending in a direction intersecting the direction in which first center axis 15a to 15d extends and a second portion extending from a distal end of the first portion in a direction different from the extending direction of the first portion. The second portion is inclined relative to first center axis 15a to 15d such that the distance from first center axis 15a to 15d increases as the distance from the first portion increases. A base portion on the opposite side to the distal end of the first portion is a portion of first revolute pair portion 25a to 25d rotatably connected to first link member 4a to 4d.

Second link members 6a to 6d are rotatably connected to distal end-side link hub 3 at second revolute pair portions 26a to 26d. Second revolute pair portions 26a to 26d have second center axes 16a to 16d, respectively. The two-dimensional shape of distal end-side link hub 3 is octagonal. On the outer peripheral portion of distal end-side link hub 3, second revolute pair portions 26a to 26d are arranged substantially at regular intervals in a direction along the outer periphery of distal end-side link hub 3. In one second link member 6a, the angle formed between first center axis 15a of first revolute pair portion 25a and second center axis 16a of second revolute pair portion 26a is less than 90°. The other second link members 6b to 6d have a configuration similar to second link member 6a described above.

In four link mechanisms 11, first center axes 15a to 15d of first revolute pair portions 25a to 25d intersect with second center axes 16a to 16d of second revolute pair portions 26a to 26d at spherical link center point 30. Rotation center axis 12 of four rotating bodies 2a to 2d intersects with spherical link center point 30. As long as the relation above is satisfied, the arrangement of first revolute pair portions 25a to 25d and second revolute pair portions 26a to 26d can be changed as desired.

<Operation and Effect>

In the parallel link mechanism having the configuration as illustrated in FIG. 9 and FIG. 10, distal end-side link hub 3 can be moved relative to proximal end-side link hub 1 along a sphere around spherical link center point 30, and distal end-side link hub 3 can be rotated around rotation center axis 12, similarly to the parallel link mechanism illustrated in FIG. 1 to FIG. 4. Furthermore, since distal end-side link hub 3 is supported by four link mechanisms 11, the upper limit of the weight of a device mounted on distal end-side link hub 3 can be increased, and the rigidity of the parallel link mechanism itself can be enhanced, compared with being supported by three link mechanisms 11.

Third Embodiment

<Configuration of Parallel Link Mechanism>

Figure 11:
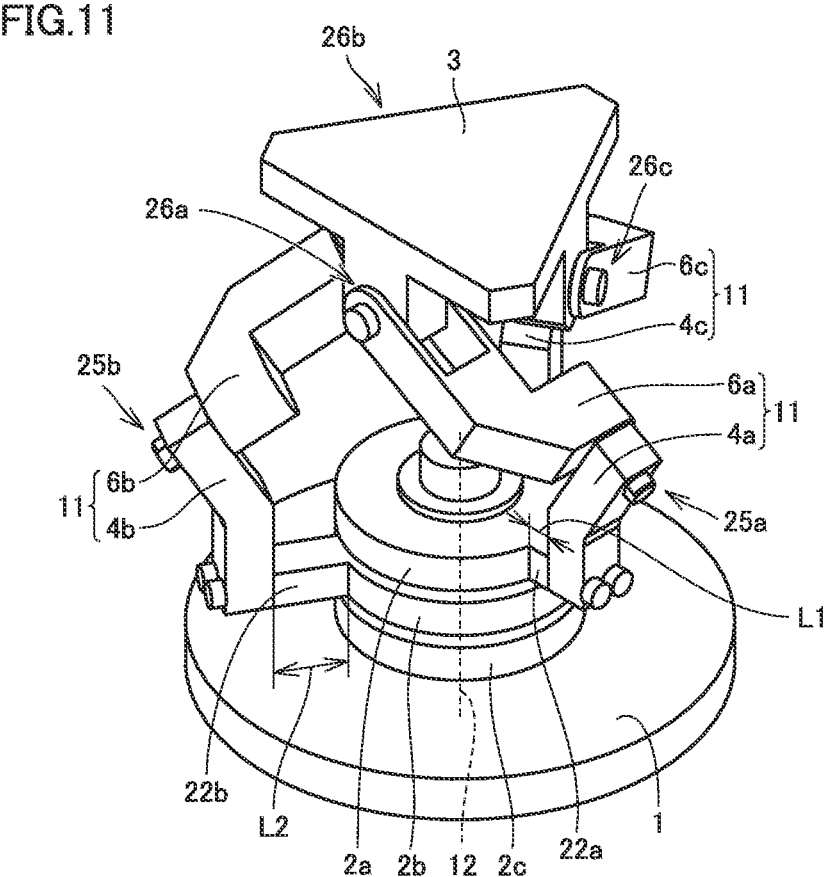
FIG. 11 is a perspective view illustrating a configuration of the parallel link mechanism according to a third embodiment.

FIG. 11 is a perspective view illustrating a configuration of the parallel link mechanism according to a third embodiment. The parallel link mechanism illustrated in FIG. 11 basically includes a configuration similar to the parallel link mechanism illustrated in FIG. 1 to FIG. 4 but differs from the parallel link mechanism illustrated in FIG. 1 to FIG. 4 in the shape of rotating bodies 2a to 2c and the shape of second link members 6a to 6c of link mechanisms 11. Specifically, the lengths of the protrusions of rotating bodies 2a to 2c connected to first link member 4a to 4c are different among rotating bodies 2a to 2c. In the parallel link mechanism illustrated in FIG. 11, the length L2 of protrusion 22b of rotating body 2b located closer to proximal end-side link hub 1 as viewed from rotating body 2a is longer than the length L1 of protrusion 22a of rotating body 2a arranged at a position farthest from proximal end-side link hub 1. Furthermore, although not clearly shown in FIG. 11, the length of the protrusion of rotating body 2c located closer to proximal end-side link hub 1 as viewed from rotating body 2b may be longer than the length L2 of protrusion 22b.

As described above, with the different lengths of the protrusions of three rotating bodies 2a to 2c, the shapes of second link members 6a to 6c of link mechanisms 11 connected to three rotating bodies 2a to 2c are different from each other. Specifically, the distances between first revolute pair portions 25a to 25c and second revolute pair portions 26a to 26c in three link mechanisms 11 are different based on the difference in length of the protrusions described above. Therefore, the lengths of second link members 6a to 6c in three link mechanisms 11 are different from each other. Even when the size of three link mechanisms 11 are different in this way, the relation between first revolute pair portions 25a to 25c, second revolute pair portions 26a to 26c, rotation center axis 12, and spherical link center point 30 is maintained similarly to the parallel link mechanism illustrated in FIG. 1 to FIG. 4. That is, even in the parallel link mechanism illustrated in FIG. 11, first center axes 15a to 15c of first revolute pair portions 25a to 25c intersect with second center axes 16a to 16c of second revolute pair portions 26a to 26c at spherical link center point 30 in three link mechanisms 11. Furthermore, rotation center axis 12 of three rotating bodies 2a to 2c intersects with spherical link center point 30.

<Operation and Effect>

Even in the parallel link mechanism having the configuration as illustrated in FIG. 11, distal end-side link hub 3 can be moved relative to proximal end-side link hub 1 along a sphere around spherical link center point 30, and distal end-side link hub 3 can be rotated around rotation center axis 12, similarly to the parallel link mechanism illustrated in FIG. 1 to FIG. 4.

Fourth Embodiment

<Configuration of Parallel Link Mechanism>

Figure 12:
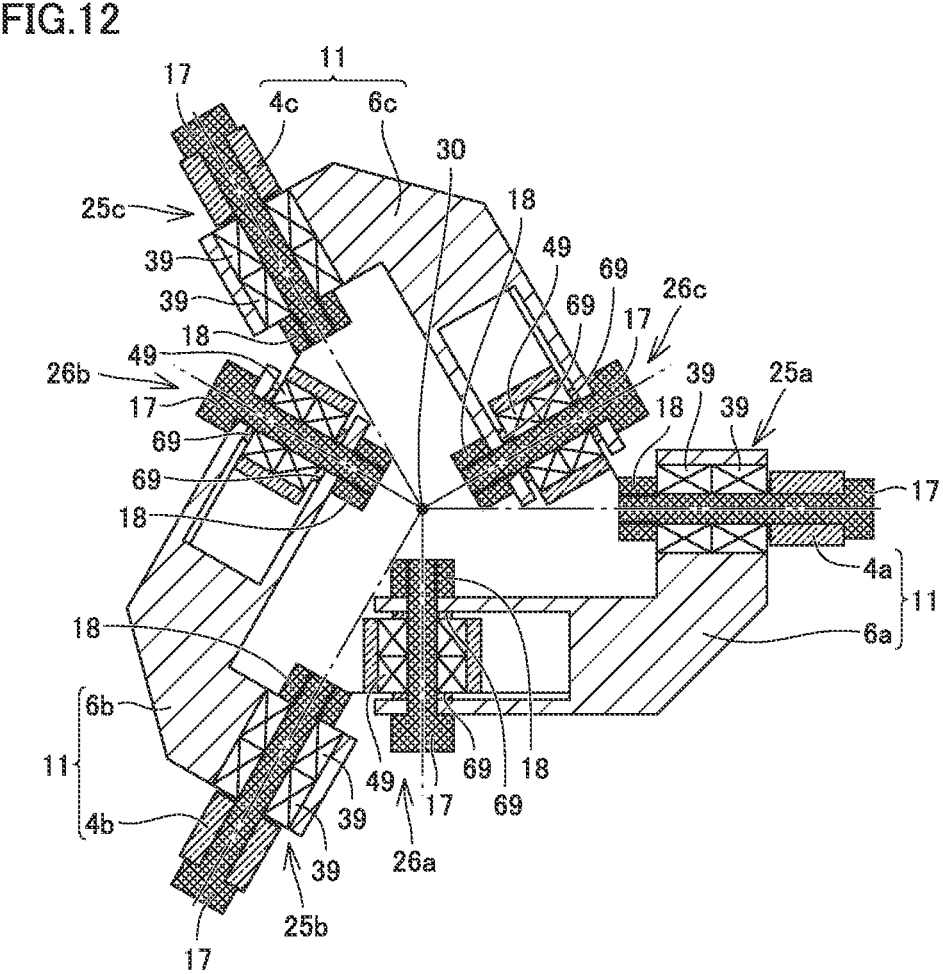
FIG. 12 is a partial cross-sectional view illustrating a configuration of the parallel link mechanism according to a fourth embodiment.

FIG. 12 is a partial cross-sectional view illustrating a configuration of the parallel link mechanism according to a fourth embodiment. FIG. 12 illustrates a partial cross-sectional view from first revolute pair portions 25a to 25c to second revolute pair portions 26a to 26c in link mechanisms 11 of the parallel link mechanism. The parallel link mechanism illustrated in FIG. 12 basically includes a configuration similar to the parallel link mechanism illustrated in FIG. 1 to FIG. 4 but differs from the parallel link mechanism illustrated in FIG. 1 to FIG. 4 in that bearings 39 and 49 as rotation resistance reducing means are provided at first revolute pair portions 25a to 25c and second revolute pair portions 26a to 26c. In FIG. 12, bearings 39 and 49 are installed for all of first revolute pair portions 25a to 25c and second revolute pair portions 26a to 26c. However, a bearing may be installed in at least one of first revolute pair portion 25a to 25c and second revolute pair portion 26a to 26c.

Specifically, in each of first revolute pair portions 25a to 25c, a through hole is formed at a distal end serving as a portion of first revolute pair portion 25a to 25c in first link member 4a to 4c. A through hole is also formed at a base portion serving as a portion of first revolute pair portion 25a to 25c in second link member 6a to 6c.

Bearings 39 are arranged in the inside of the through hole in each of second link members 6a to 6c. Two bearings 39 are arranged in double row in the inside of the through hole. For example, a roller bearing such as a ball bearing can be used as bearing 39. Each bearing 39 includes an outer race, an inner race, and a plurality of rolling elements arranged between the outer race and the inner race. The outer races of bearings 39 are arranged in the inside of the through holes in second link members 6a to 6c. Any method may be used for fixing the outer race. For example, the outer races may be press-fitted in the through holes in second link members 6a to 6c. Furthermore, the outer races inserted in the through holes of second link members 6a to 6c may be fixed by crimping or may be fixed using retaining rings.

First link members 4a to 4c and second link members 6a to 6c are arranged such that the through holes of first link members 4a to 4c are aligned with the through holes of second link members 6a to 6c on the same axis. Bolts 17 are inserted in the through holes of first link members 4a to 4c and the through holes of second link members 6a to 6c. Nuts 18 are fixed to the distal ends of bolts 17. For example, a not-shown washer is arranged between nut 18 and the inner race of bearing 39. Nuts 18 tighten the inner races of bearings 39, whereby the inner races of the bearings 39 are fixed to first link members 4a to 4c through bolts 17 and nuts 18. With the configuration as described above, preload is applied to the inner races of bearings 39.

Here, a washer or a spacer is arranged between bearings 39 arranged in double row to increase the distance between two bearings 39. An angular ball bearing may be used as two bearings 39. By doing so, the rigidity of first revolute pair portions 25a to 25c including bearings 39 can be enhanced.

In each of second revolute pair portions 26a to 26c, a pair of wall portions arranged to sandwich the protrusion of distal end-side link hub 3 is formed at a distal end serving as a portion of second revolute pair portion 26a to 26c in second link member 6a to 6c. Through holes are formed in the wall portions. A through hole is also formed at the protrusion of distal end-side link hub 3 serving as a portion of second revolute pair portion 26a to 26c.

Bearings 49 are arranged inside the through hole formed at the protrusion of distal end-side link hub 3. Two bearings 49 are arranged in double row in the inside of the through hole. A roller bearing such as a ball bearing can be used as bearing 49, similar to bearing 39. Each bearing 49 includes an outer race, an inner race, and a plurality of rolling elements arranged between the outer race and the inner race. The outer race of bearing 49 is fixed to the through hole of distal end-side link hub 3. Any method may be used for fixing the outer race. For example, the outer race may be press-fitted in the through hole of distal end-side link hub 3.

Second link members 6a to 6c and the protrusions of distal end-side link hub 3 are arranged such that the through holes of second link members 6a to 6c are aligned with the through holes of distal end-side link hub 3 on the same axis. Bolts 17 are inserted in the through holes of second link members 6a to 6c and the through holes of the protrusions of distal end-side link hub 3. Nuts 18 are fixed to the distal ends of bolts 17. Washers 69 are arranged between the wall portions of second link members 6a to 6c and the inner races of bearings 49. Nuts 18 tighten the inner races of bearings 49 through the wall portions of second link members 6a to 6c and washers 69, whereby the inner races of the bearings 49 are fixed to second link members 6a to 6c.

<Operation and Effect>

In the parallel link mechanism described above, at least one of first revolute pair portions 25a to 25c and second revolute pair portions 26a to 26c may include bearings 39, 49. In this case, the operation of first revolute pair portions 25a to 25c or second revolute pair portions 26a to 26c provided with bearings 39, 49 can be made smooth, and the positioning accuracy of the distal end-side link hub 3 can be enhanced. The installation of bearings 39, 49 reduces the friction torque of the first revolute pair portions 25a to 25c or second revolute pair portions 26a to 26c provided with bearings 39, 49, thereby suppressing heat generation at the revolute pair portions. As a result, the lifetime of the revolute pair portions can be prolonged. Furthermore, the installation of bearings 39 and 49 can suppress rattling in operation of the revolute pair portions, compared with when bearings 39 and 49 are not used.

Fifth Embodiment

<Configuration of Parallel Link Mechanism>

Figure 13:
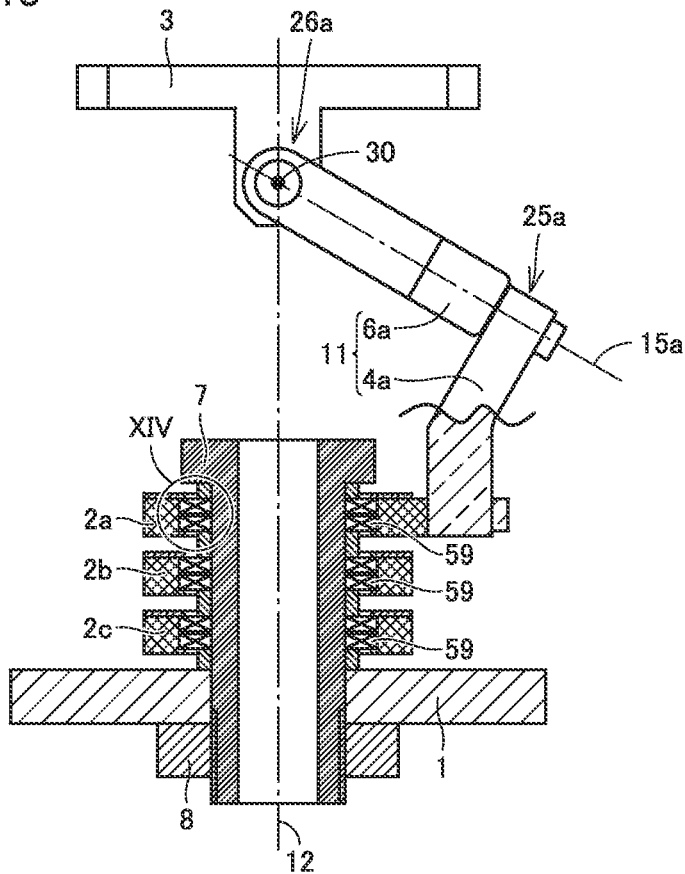
FIG. 13 is a diagram illustrating a configuration of the parallel link mechanism according to a fifth embodiment.
Figure 14:
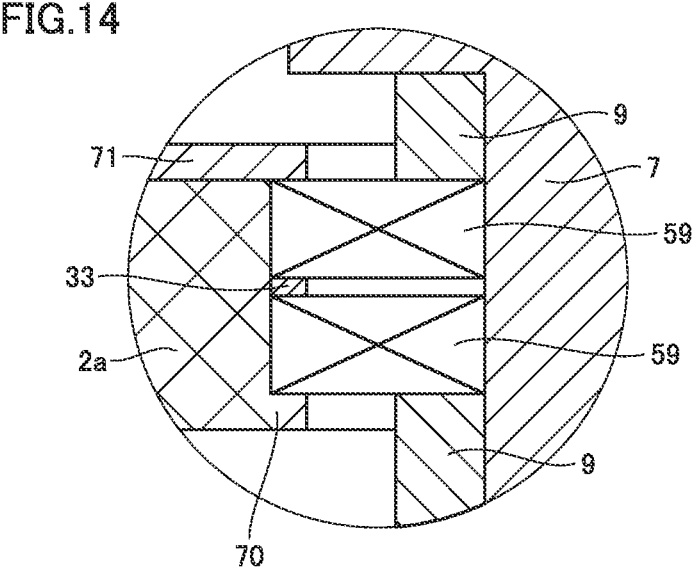
FIG. 14 is an enlarged cross-sectional view of region XIV in FIG. 13.

FIG. 13 is a diagram illustrating a configuration of the parallel link mechanism according to a fifth embodiment. FIG. 14 is an enlarged cross-sectional view of region XIV in FIG. 13.

The parallel link mechanism illustrated in FIG. 13 and FIG. 14 basically includes a configuration similar to the parallel link mechanism illustrated in FIG. 1 to FIG. 4 but differs from the parallel link mechanism illustrated in FIG. 1 to FIG. 4 in that bearings 59 serving as rotation resistance reducing means are provided at each of rotating bodies 2a to 2c and in that bolts 7 for fixing rotating bodies 2a to 2c are hollow. Two bearings 59 are installed for each of rotating bodies 2a to 2c. In FIG. 13 and FIG. 14, bearings 59 are installed in all of rotating bodies 2a to 2c. However, bearings 59 may be installed in at least one of a plurality of rotating bodies 2a to 2c. One bearing 59 may be installed in each of rotating bodies 2a to 2c.

Each bearing 59 includes an outer race, an inner race, and a plurality of rolling elements arranged between the outer race and the inner race. The outer race of bearing 59 is arranged in contact with the inner peripheral surface of rotating body 2a to 2c. An end portion on the side closer to proximal end-side link hub 1 in the inner peripheral surface of rotating body 2a to 2c has a projection 70 for supporting the outer race of bearing 59. The outer races of two bearings 59 are stacked with a shim 33 interposed therebetween along the direction of rotation center axis 12 in contact with the inner peripheral surface of rotating body 2a to 2c. A retaining member 71 is arranged on an upper surface of rotating body 2a to 2c on the opposite side to the side facing proximal end-side link hub 1. Retaining member 71 is in contact with the outer race of bearing 59. Retaining member 71 is fixed to rotating body 2a to 2c so as to push the outer race of bearing 59 toward the projection 70.

The inner peripheral surface of the inner race of bearing 59 is arranged in contact with the side surface of bolt 7. That is, bolt 7 is inserted in the opening defined by the inner peripheral surface of the inner race. Washers 9 are arranged so as to be sandwich the inner races of two bearings 59 in the direction along rotation center axis 12. As illustrated in FIG. 13, nut 8 is fixed to the distal end of bolt 7 from the lower side of proximal end-side link hub 1. Nut 8 is tightened to push proximal end-side link hub 1 toward distal end-side link hub 3. As a result, the inner races of bearings 59 are fixed between the head of bolt 7 and proximal end-side link hub 1 through washers 9. That is, the inner races of bearings 59 are fixed to bolt 7. Preload thus can be applied to bearings 59.

<Operation and Effect>

In the parallel link mechanism described above, at least one of rotating bodies 2a to 2c includes bearing 59. In this case, the operation of rotating bodies 2a to 2c provided with bearings 59 can be made smooth, and the positioning accuracy of the distal end-side link hub 3 can be enhanced. The installation of bearings 59 reduces the friction torque of rotating bodies 2a to 2c provided with bearings 59, thereby suppressing heat generation at the rotating bodies 2a to 2c.

Furthermore, in the parallel link mechanism illustrated in FIG. 13 and FIG. 14, since bolt 7 is hollow, for example, a member such as a connection cable to a device installed on distal end-side link hub 3 can be arranged in the hollow part of the bolt 7.

Sixth Embodiment

<Configuration of Parallel Link Mechanism>

Figure 15:
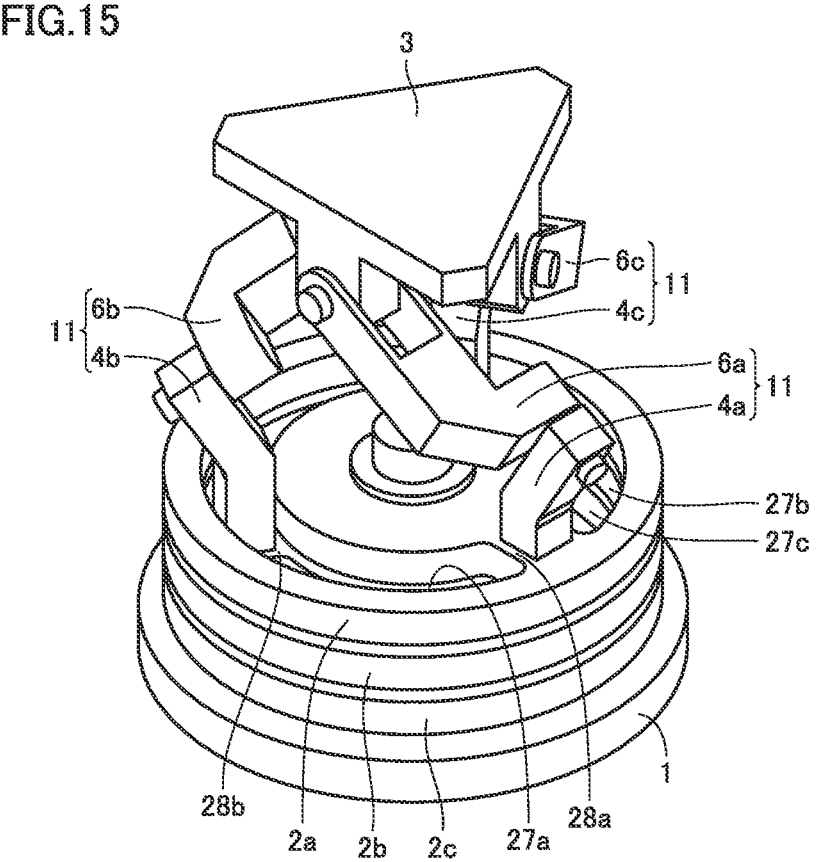
FIG. 15 is a perspective view illustrating a configuration of the parallel link mechanism according to a sixth embodiment.
Figure 16:
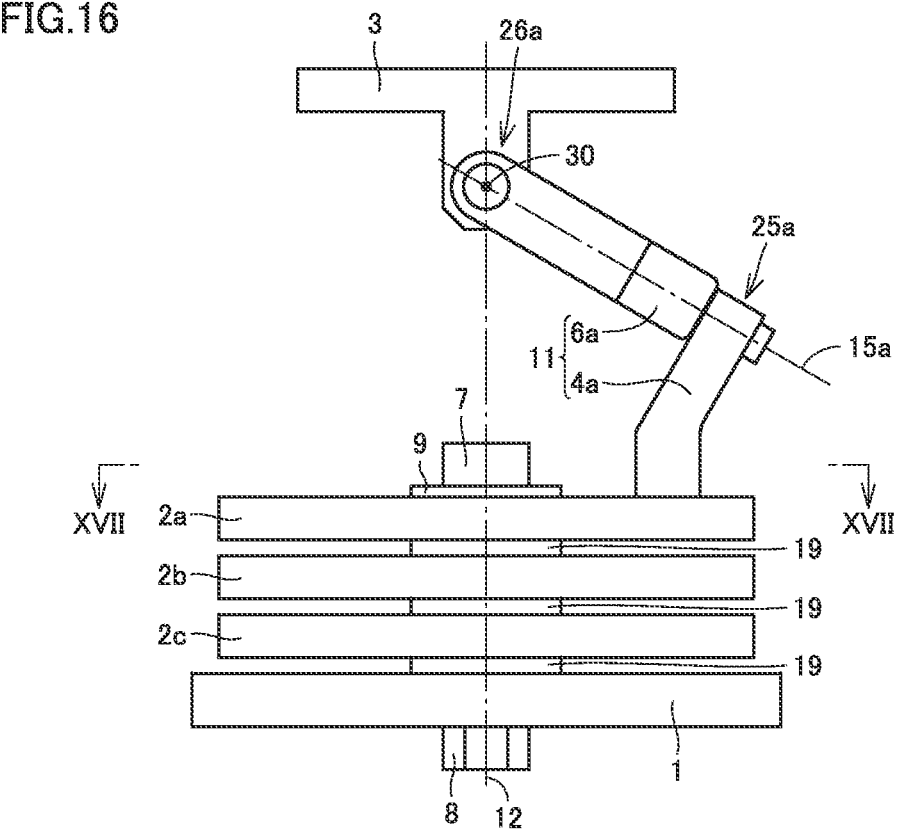
FIG. 16 is a front view of the parallel link mechanism illustrated in FIG. 15.
Figure 17:
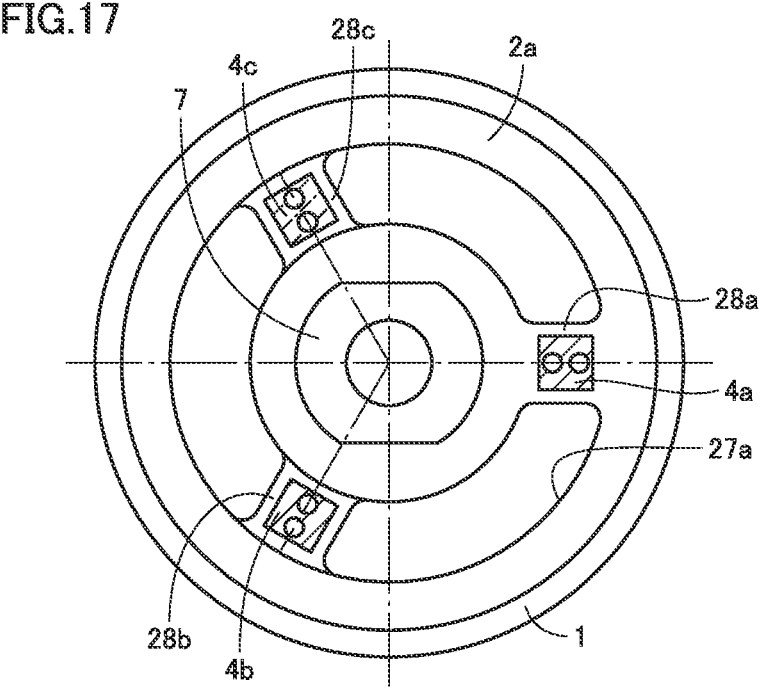
FIG. 17 is a cross-sectional view along line XVII-XVII in FIG. 16.
Figure 18:
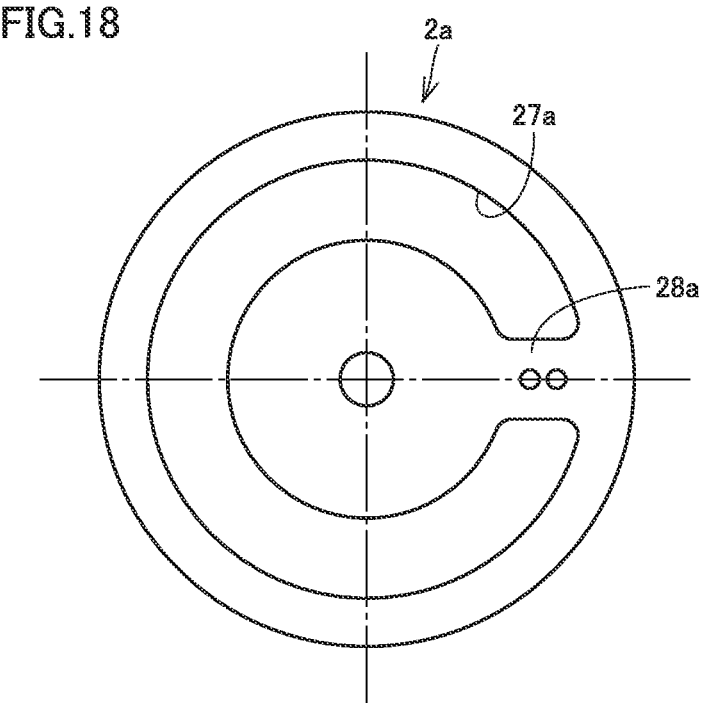
FIG. 18 is a top view of a rotating body of the parallel link mechanism illustrated in FIG. 15.

FIG. 15 is a perspective view illustrating a configuration of the parallel link mechanism according to a sixth embodiment. FIG. 16 is a front view of the parallel link mechanism illustrated in FIG. 15. FIG. 17 is a cross-sectional view along line XVII-XVII in FIG. 16. FIG. 18 is a top view of the rotating body of the parallel link mechanism illustrated in FIG. 15.

The parallel link mechanism illustrated in FIG. 15 to FIG. 18 basically includes a configuration similar to the parallel link mechanism illustrated in FIG. 1 to FIG. 4 but differs from the parallel link mechanism illustrated in FIG. 1 to FIG. 4 in the shape of rotating bodies 2a to 2c and the configuration of the connection portions between first link members 4a to 4c and rotating bodies 2a to 2c. Specifically, in the parallel link mechanism illustrated in FIG. 15 to FIG. 18, rotating bodies 2a to 2c have through holes 27a to 27c each shaped in the letter C in a two-dimensional view. Rotating bodies 2a to 2c include connection portions 28a to 28c connecting the inner peripheral side and the outer peripheral side of through holes 27a to 27c. Rotating bodies 2a to 2c basically have a similar two-dimensional shape.

First link members 4a to 4c of three link mechanisms 11 are respectively fixed to connection portions 28a to 28c of rotating bodies 2a to 2c. That is, first link members 4a to 4c are connected to rotating bodies 2a to 2c on the inside of the outer peripheral portions of rotating bodies 2a to 2c. Any method can be used to fix first link members 4a to 4c to connection portions 28a to 28c of rotating bodies 2a to 2c. For example, first link members 4a to 4c may be fixed to connection portions 28a to 28c using fastening members such as screws.

First link member 4b fixed to connection portion 28b of rotating body 2b passes through the inside of through hole 27a of rotating body 2a and extends toward distal end-side link hub 3. First link member 4c fixed to connection portion 28c of rotating body 2c passes through the inside of through hole 27a of rotating body 2a and through hole 27b of rotating body 2b and extends toward distal end-side link hub 3.

<Operation and Effect>

In the parallel link mechanism described above, three or more rotating bodies 2a to 2c have annular through holes 27a to 27c that surround rotation center axis 12. Three or more rotating bodies 2a to 2c include the first rotating body 2a and the second rotating body 2b arranged on a side closer to proximal end-side link hub 1 as viewed from the first rotating body 2a. First link member 4b fixed to second rotating body 2b passes through the inside of through hole 27a of first rotating body 2a and extends toward distal end-side link hub 3.

In this case, the parallel link mechanism can be downsized, compared with a configuration in which first link member 4b is arranged outside rotating bodies 2a to 2c. Furthermore, since first link member 4b is arranged so as to pass through the through hole 27a formed in an annular shape, first link member 4b does not interfere with rotating body 2a even when rotating body 2b rotates relative to rotating body 2a. Furthermore, since first link member 4c is arranged so as to pass through the respective through holes 27a and 27b of rotating bodies 2a and 2b, first link member 4c does not interfere with the two rotating bodies 2a and 2b even when rotating body 2c rotates relative to rotating bodies 2a and 2b.

Seventh Embodiment

<Configuration of Link Actuation Device>

Figure 19:
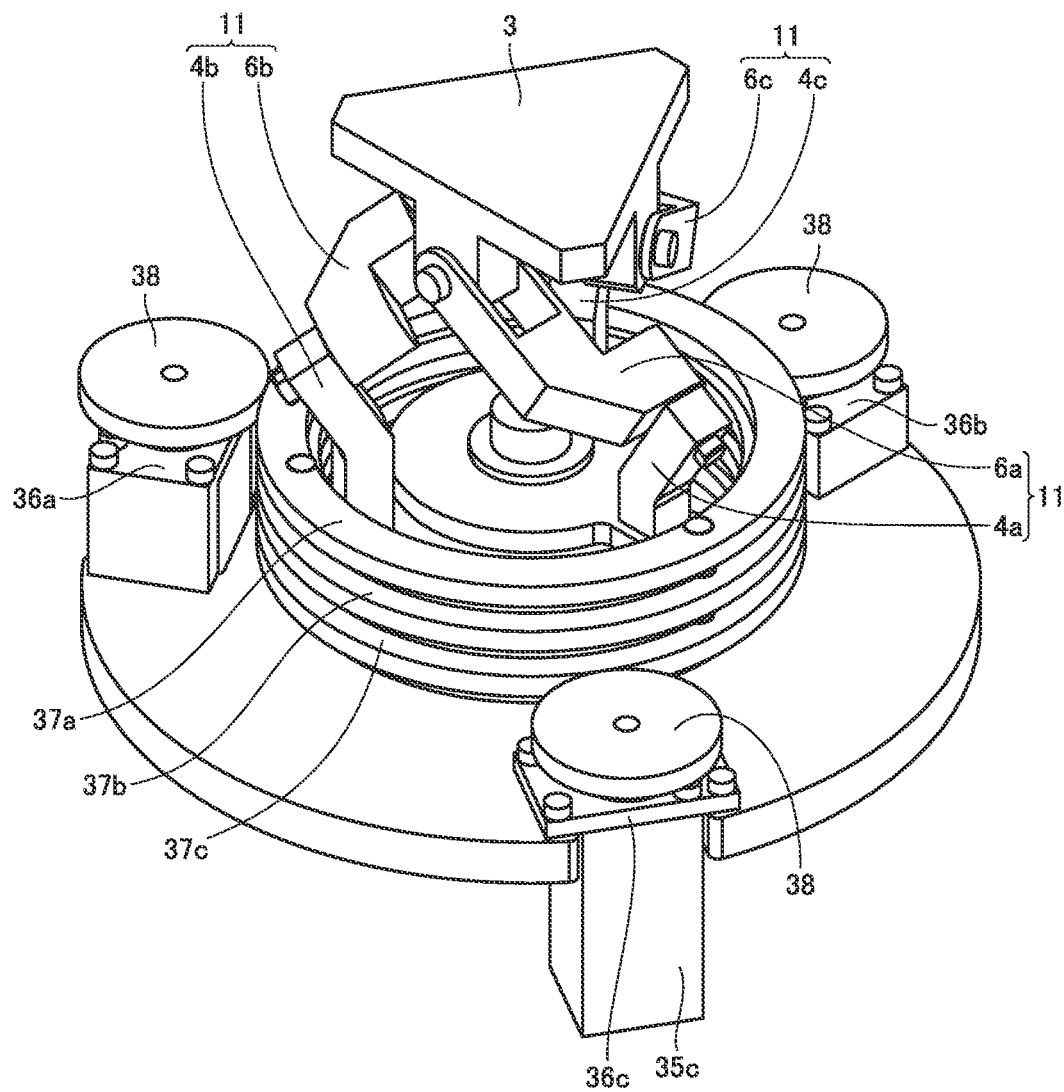
FIG. 19 is a perspective view illustrating a configuration of the link actuation device according to a seventh embodiment.
Figure 20:
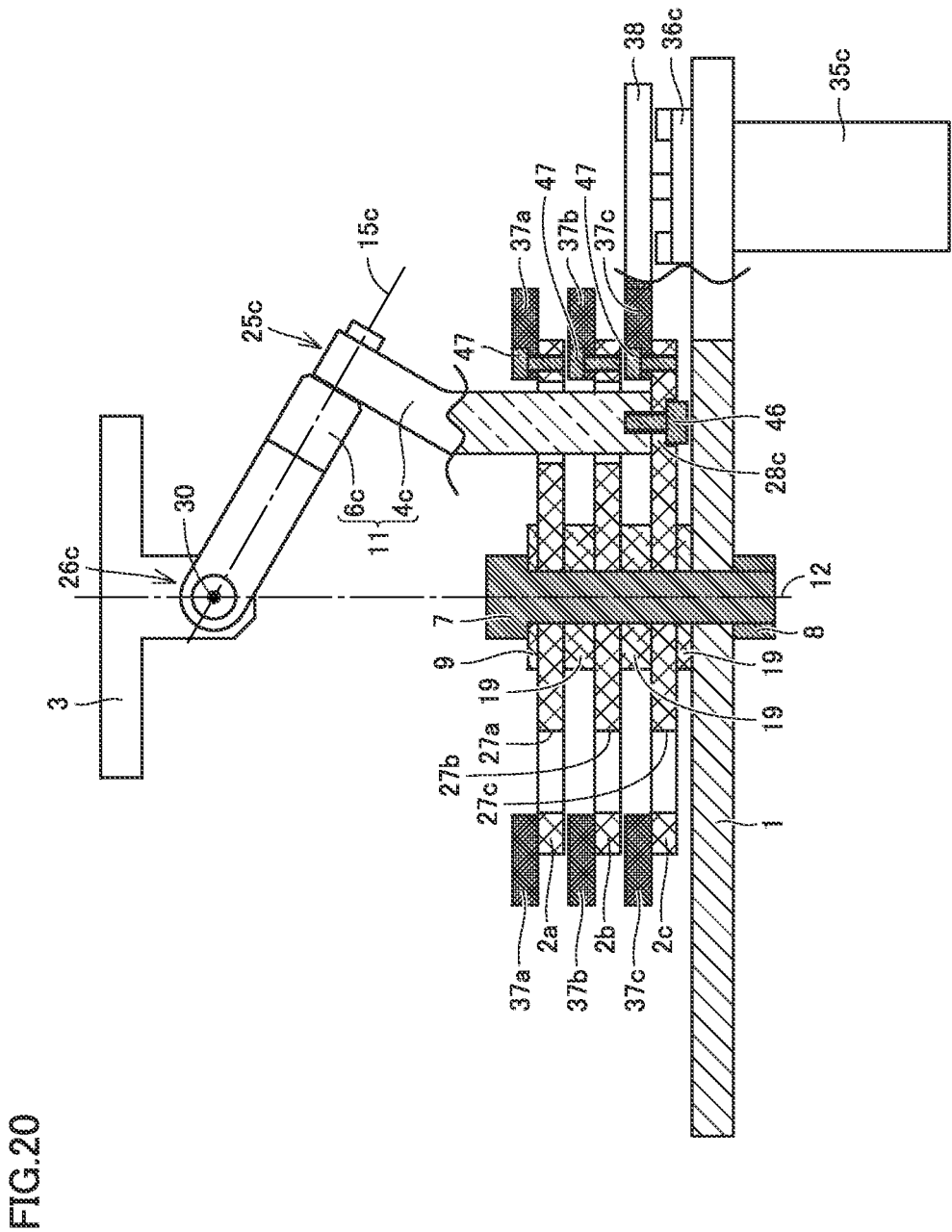
FIG. 20 is a diagram illustrating a configuration of a link actuation device illustrated in FIG. 19.

FIG. 19 is a perspective view illustrating a configuration of a link actuation device according to a seventh embodiment. FIG. 20 is a diagram illustrating a configuration of the link actuation device illustrated in FIG. 19. The link actuation device illustrated in FIG. 19 and FIG. 20 is basically a link actuation device including the parallel link mechanism illustrated in FIG. 15 to FIG. 18. The link actuation device illustrated in FIG. 19 and FIG. 20 mainly includes a parallel link mechanism and posture control drive sources 35a to 35c for driving the parallel link mechanism.

In the link actuation device illustrated in FIG. 19 and FIG. 20, proximal end-side link hub 1 is formed so as to extend to the outside of the outer periphery of rotating bodies 2a to 2c. That is, the size of proximal end-side link hub 1 in a two-dimensional view is larger than the size of rotating bodies 2a to 2c in a two-dimensional view. The two-dimensional shape of proximal end-side link hub 1 may be circular as illustrated in FIG. 7 or may be any other shape, for example, a polygonal shape such as a quadrangular shape or a triangular shape or may be an oval shape. Three posture control drive sources 35a to 35c are fixed to proximal end-side link hub 1 through fastening parts 36a to 36c. For example, electric motors can be used as posture control drive sources 35a to 35c.

Posture control drive sources 35a to 35c are respectively connected to rotating bodies 2a to 2c such that drive force can be transmitted through gears 38 and rotation transmitting members 37a to 37c. Posture control drive sources 35a to 35c are arranged substantially at regular intervals in the circumferential direction around rotation center axis 12 in a two-dimensional view. Posture control drive sources 35a to 35c may be arranged at different intervals in the circumferential direction.

Specifically, posture control drive sources 35a to 35c each include a rotation shaft, and gear 38 is connected to an end of the rotation axis. Furthermore, rotation transmitting members 37a to 37c are fixed to the outer peripheral portions of rotating bodies 2a to 2c by fastening members 47 such as screws. Rotation transmitting members 37a to 37c are annular members each having a gear portion on the outer peripheral portion. Any method other than the method using fastening members 47 described above can be employed to fix rotation transmitting members 37a to 37c to rotating bodies 2a to 2c as long as necessary strength and precision is ensured. For example, rotation transmitting members 37a to 37c may be fixed to rotating bodies 2a to 2c by bonding, press-fitting, crimping, or the like.

The gear portions of rotation transmitting members 37a to 37c are meshed with gears 38 connected to the rotation shafts of posture control drive sources 35a to 35c. The rotation shafts of posture control drive sources 35a to 35c rotate to cause gears 38 and rotation transmitting members 37a to 37c to rotate and consequently drive the rotation of rotating bodies 2a to 2c.

First link members 4a to 4c of link mechanisms 11 are fixed to rotating bodies 2a to 2c by screws serving as fastening members 46. Rotating bodies 2a to 2c are rotated by posture control drive sources 35a to 35c to change the positions of link mechanisms 11 around rotation center axis 12. As a result, the posture of distal end-side link hub 3 can be changed.

<Operation and Effect>

The link actuation device according to the present disclosure includes the parallel link mechanism described above and posture control drive sources 35a to 35c. Posture control drive sources 35a to 35c rotate at least three rotating bodies 2a to 2c among three or more rotating bodies 2a to 2c and change the posture of distal end-side link hub 3 as desired relative to proximal end-side link hub 1.

In this case, posture control drive sources 35a to 35c individually control a plurality of link mechanisms 11 to enable distal end-side link hub 3 to operate in a wide range and precisely. Furthermore, the parallel link mechanism as described above can be used to implement a lightweight and compact link actuation device.

The link actuation device described above includes rotation transmitting members 37a to 37c connected to at least three rotating bodies 2a to 2c. Posture control drive sources 35a to 35c rotate at least three rotating bodies 2a to 2c through rotation transmitting members 37a to 37c. In this case, since rotation transmitting members 37a to 37c are installed as separate members on rotating bodies 2a to 2c, the material of rotation transmitting members 37a to 37c can be selected independently of the material of rotating bodies 2a to 2c.

<Configuration and Operation and Effect of Modifications>

Figure 21:
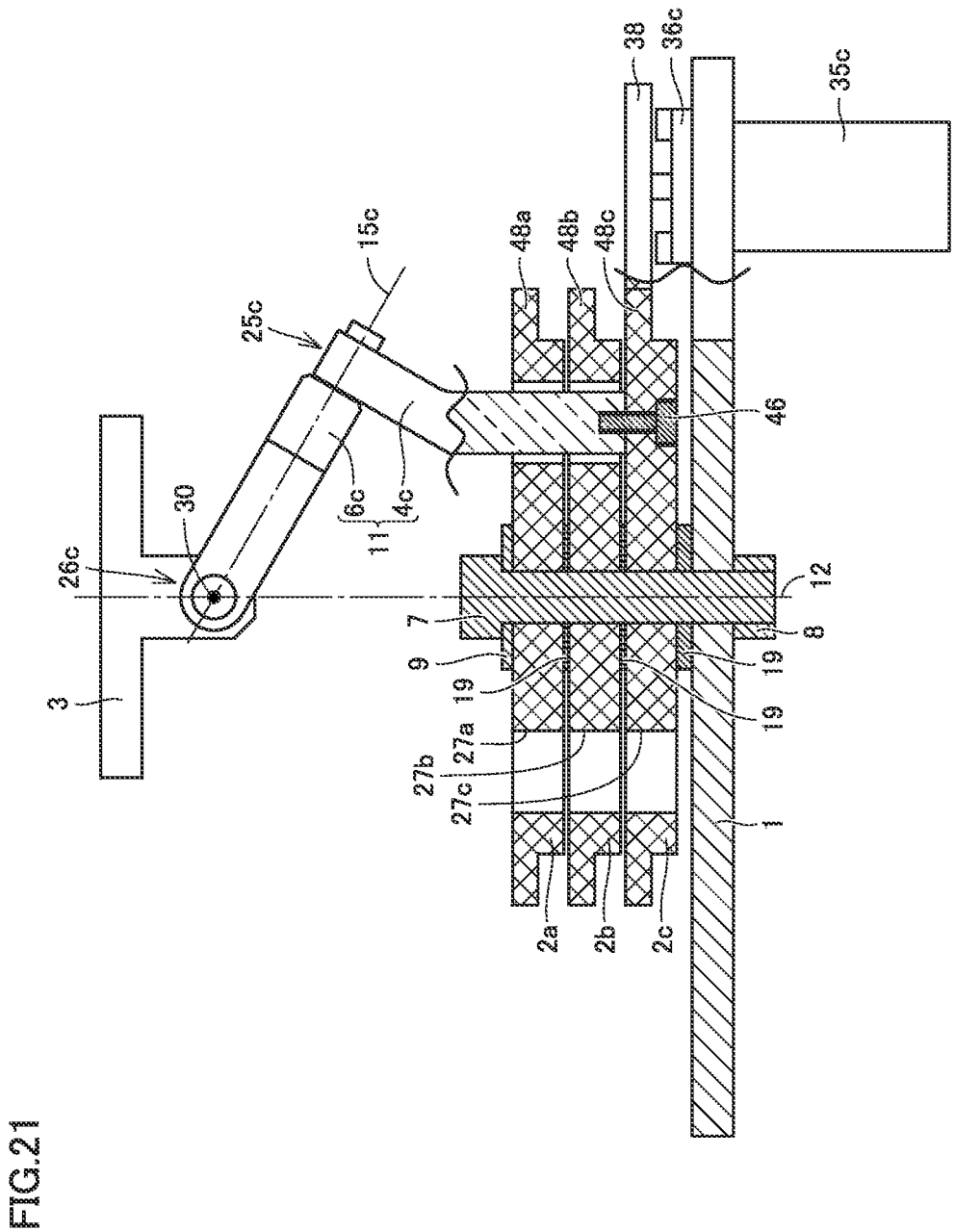
FIG. 21 is a diagram illustrating a first modification to the link actuation device according to the seventh embodiment.
Figure 22:
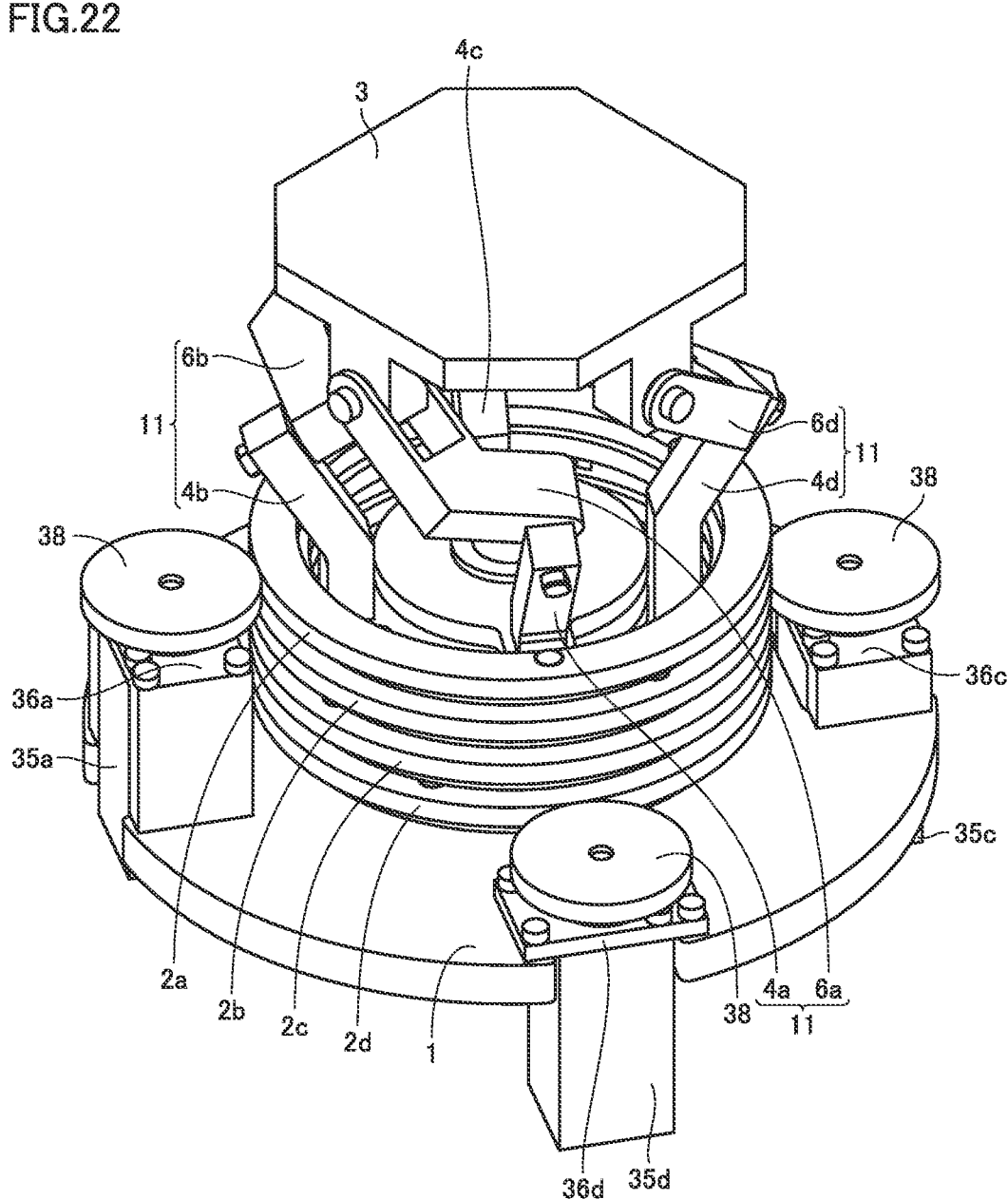
FIG. 22 is a perspective view illustrating a second modification to the link actuation device according to the seventh embodiment.
Figure 23:
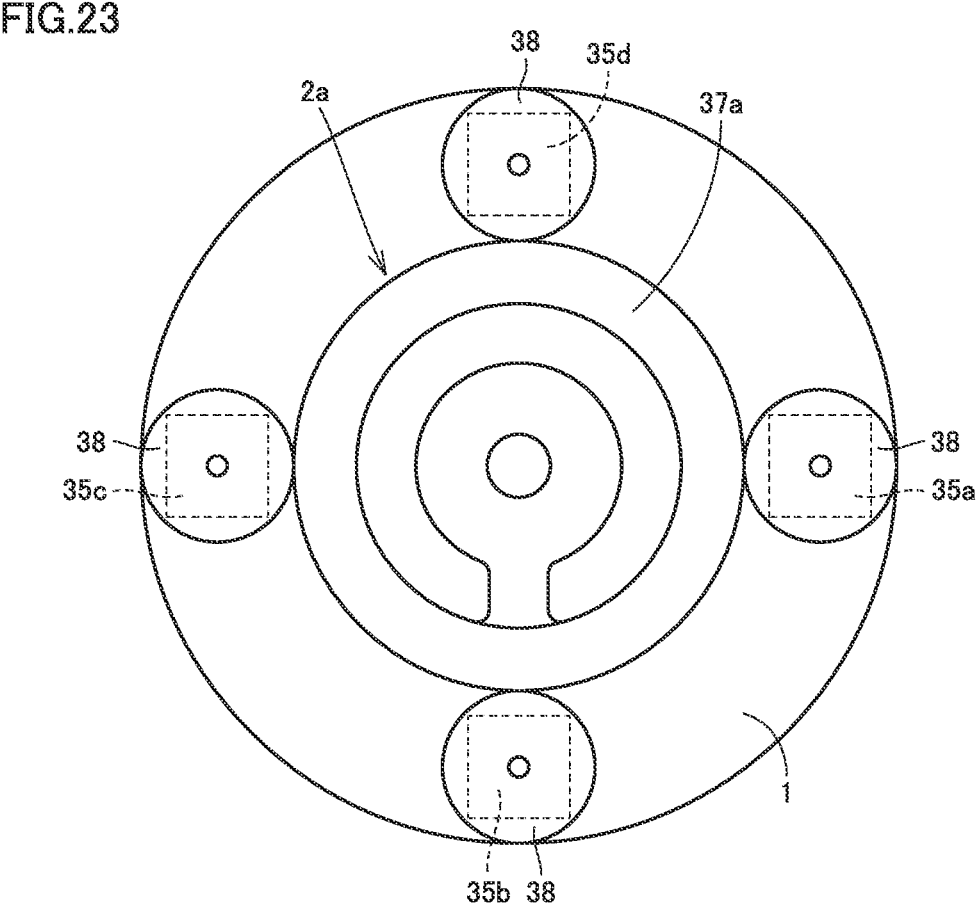
FIG. 23 is a partial view illustrating a configuration of the link actuation device illustrated in FIG. 22.
Figure 24:
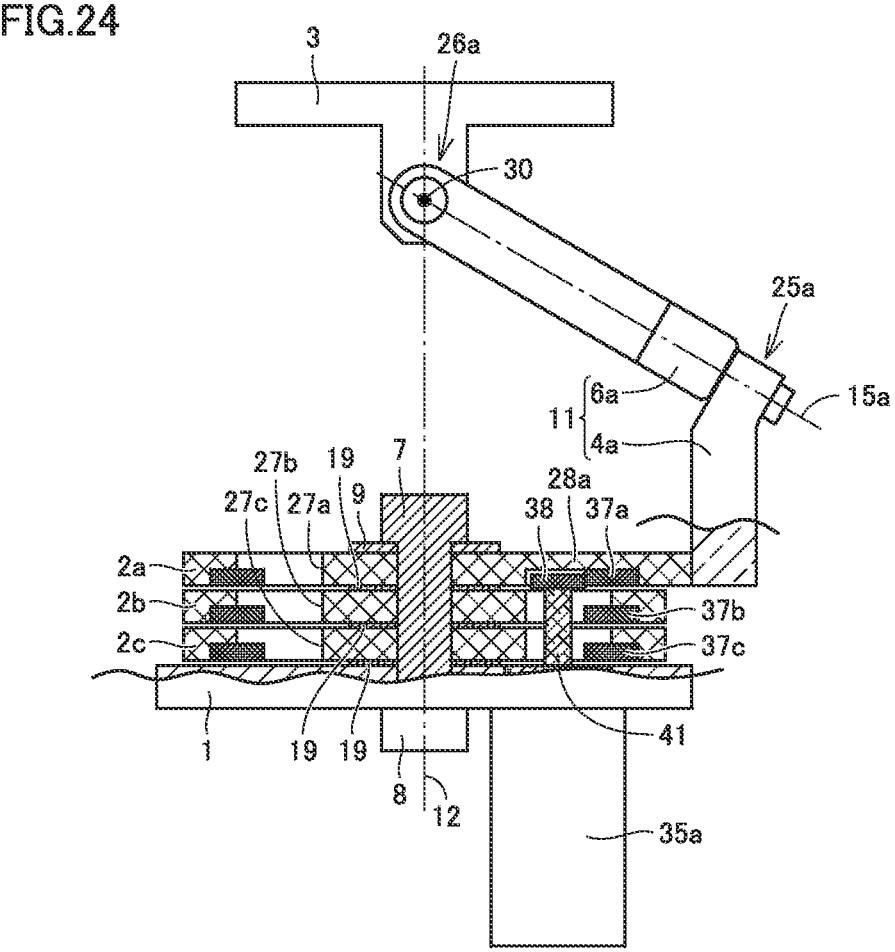
FIG. 24 is a diagram illustrating a third modification to the link actuation device according to the seventh embodiment.
Figure 25:
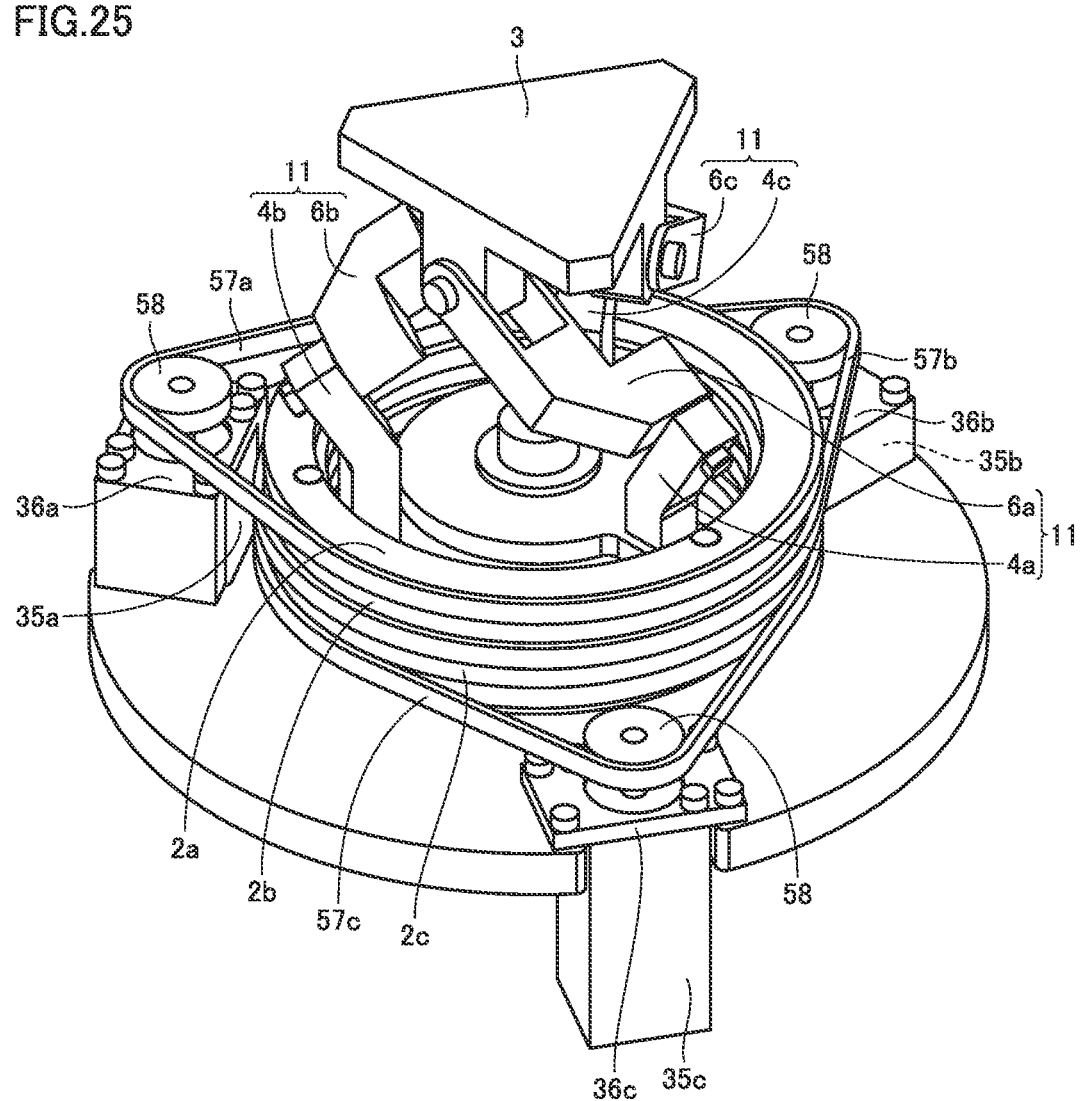
FIG. 25 is a perspective view illustrating a fourth modification to the link actuation device according to the seventh embodiment.

FIG. 21 is a diagram illustrating a first modification to the link actuation device according to the seventh embodiment. FIG. 22 is a perspective view illustrating a second modification to the link actuation device according to the seventh embodiment. FIG. 23 is a partial view illustrating the configuration of the link actuation device illustrated in FIG. 22. FIG. 24 is a diagram illustrating a third modification to the link actuation device according to the seventh embodiment. FIG. 25 is a perspective view illustrating a fourth modification to the link actuation device according to the seventh embodiment.

The link actuation device illustrated in FIG. 21 basically includes a configuration similar to the link actuation device illustrated in FIG. 19 and FIG. 20 but differs from the link actuation device illustrated in FIG. 19 and FIG. 20 in that rotating bodies 2a to 2c are formed integrally with the rotation transmitting members. In the link actuation device illustrated in FIG. 21, the outer peripheral portions of rotating bodies 2a to 2c partially protrude to form rotation transmitting portions 48a to 48c. The outer peripheral portions of rotation transmitting portions 48a to 48c are gear portions meshed with gears 38.

That is, in the link actuation device illustrated in FIG. 21, at least three rotating bodies 2a to 2c include rotation transmitting portions 48a to 48c. Posture control drive sources 35a to 35c rotate at least three rotating bodies 2a to 2c through rotation transmitting portions 48a to 48c.

To sum up the characteristic configuration of the link actuation device described above, since portions of rotating bodies 2a to 2c are rotation transmitting portions 48a to 48c, the number of components of the link actuation device can be reduced and the manufacturing process can be simplified, compared with when rotation transmitting member 37a to 37c that are members separate from rotating bodies 2a to 2c are connected to rotating bodies 2a to 2c.

The link actuation device illustrated in FIG. 22 and FIG. 23 basically includes a configuration similar to the link actuation device illustrated in FIG. 19 and FIG. 20 but differs from the link actuation device illustrated in FIG. 19 and FIG. 20 in that it includes four rotating bodies 2a to 2d and four posture control drive sources 35a to 35d. Four rotating bodies 2a to 2d are stacked in the order of rotating body 2d, rotating body 2c, rotating body 2b, and rotating body 2a from proximal end-side link hub 1. Posture control drive sources 35a to 35d are respectively connected to rotating bodies 2a to 2d through gears 38 and rotation transmitting members. As illustrated in FIG. 23, four posture control drive sources 35a to 35d are arranged substantially at regular intervals in a circumferential direction around rotating bodies 2a to 2d. Posture control drive sources 35a to 35d may be arranged at different intervals in the circumferential direction.

To sum up the characteristic configuration of the link actuation device described above, at least three rotating bodies are four rotating bodies 2a to 2c as illustrated in FIG. 22 in the link actuation device described above. Posture control drive sources 35a to 35d rotate four rotating bodies 2a to 2d. In this case, compared with when the posture of distal end-side link hub 3 is controlled using only three rotating bodies 2a to 2c, preload can be applied to link mechanisms 11 by the cooperative operation of four posture control drive sources 35a to 35d, thereby suppressing rattling of link mechanism 11. Therefore, the rigidity of the link actuation device and the positioning accuracy of distal end-side link hub 3 can be enhanced.

The link actuation device illustrated in FIG. 24 basically includes a configuration similar to the link actuation device illustrated in FIG. 19 and FIG. 20 but differs from the link actuation device illustrated in FIG. 19 and FIG. 20 in the shape of rotating bodies 2a to 2c, the shape of rotation transmitting members 37a to 37c, the arrangement of posture control drive sources 35a to 35c, the shape of proximal end-side link hub 1, and the configuration of the connection portions of first link members 4a to 4c to rotating bodies 2a to 2c.

Rotating bodies 2a to 2c of the link actuation device illustrated in FIG. 24 have through holes 27a to 27c each shaped in the letter C in a two-dimensional view, and rotation transmitting members 37a to 37c having internal gears are fixed to the inner peripheral surfaces of the through holes 27a to 27c. Any method can be used to fix rotation transmitting members 37a to 37c to rotating bodies 2a to 2c. For example, such a method as press-fitting is used.

Rotation transmitting members 37a to 37c have an annular shape. The inner peripheral surfaces of rotation transmitting members 37a to 37c have gear portions serving as inner gears. Gears 38 connected to the rotation shafts of posture control drive sources 35a to 35c are arranged on the inner peripheral side of rotation transmitting members 37a to 37c. Gears 38 are meshed with the gear portions of rotation transmitting members 37a to 37c. The rotation shafts of posture control drive sources 35a to 35c rotate to cause rotating bodies 2a to 2c to rotate through gears 38 and rotation transmitting members 37a to 37c.

Rotation transmitting members 37a to 37c are fixed to the side walls on the outer peripheral side of through holes 27a to 27c in rotating bodies 2a to 2c. Specifically, recessed portions are formed in the sidewalls on the outer peripheral side of through holes 27a to 27c in rotating bodies 2a to 2c, at end portions closer to proximal end-side link hub 1. With the outer peripheral portions of rotation transmitting members 37a to 37c fitted in this recessed portions, rotation transmitting members 37a to 37c are fixed to rotating bodies 2a to 2c. Portions of rotation transmitting members 37a to 37c are arranged on the side closer to proximal end-side link hub 1 of connection portions 28a to 28c connecting the inner peripheral portions and the outer peripheral portions of through holes 27a to 27c in rotating bodies 2a to 2c. Furthermore, recessed portions are formed on the side closer to proximal end-side link hub 1 of connection portions 28a to 28c in rotating bodies 2a to 2c to allow gears 38 to be arranged on the inner peripheral side of rotation transmitting members 37a to 37c.

In the link actuation device illustrated in FIG. 24, posture control drive sources 35a to 35c are installed on the back surface (the surface on the opposite side to the front surface facing rotating bodies 2a to 2c) of proximal end-side link hub 1. Posture control drive sources 35a to 35c are arranged at positions overlapping rotating bodies 2a to 2c in a two-dimensional view. Rotation shaft 41 of posture control drive source 35a is inserted in a first through hole formed in proximal end-side link hub 1 and through holes 27a to 27c of rotating bodies 2a to 2c. Although not shown, the rotation shaft of posture control drive source 35b is inserted in a second through hole formed in proximal end-side link hub 1 and through holes 27b and 27c of rotating bodies 2b and 2c. Furthermore, the rotation shaft of posture control drive source 35c is inserted in a third through hole formed in proximal end-side link hub 1 and through hole 27c of rotating body 2c. Gears 38 are connected to the end portions of the respective rotation shafts of posture control drive sources 35a to 35c.

As described above, since posture control drive sources 35a to 35c are arranged at positions overlapping rotating bodies 2a to 2c in a two-dimensional view, proximal end-side link hub 1 does not include the portion protruding outward from the outer periphery of rotating bodies 2a to 2c as illustrated in FIG. 19. Furthermore, first link members 4a to 4c are connected to the outer periphery of rotating bodies 2a to 2c, similarly to the parallel link mechanism illustrated in FIG. 1.

The link actuation device illustrated in FIG. 24 achieves an effect similar to that of the link actuation device illustrated in FIG. 19 and FIG. 20. In addition, since the size of proximal end-side link hub 1 is smaller than the size of proximal end-side link hub 1 of the link actuation device illustrated in FIG. 19 and FIG. 20, the occupied volume of the entire link actuation device can be relatively reduced. The link actuation device illustrated in FIG. 24 may include four rotating bodies 2a to 2d, four posture control drive sources 35a to 35d, and four link mechanisms 11, as in the link actuation device illustrated in FIG. 22 and FIG. 23.

The link actuation device illustrated in FIG. 25 basically includes a configuration similar to the link actuation device illustrated in FIG. 19 and FIG. 20 but differs from the link actuation device illustrated in FIG. 19 and FIG. 20 in the configuration for transmitting rotation drive force from posture control drive sources 35a to 35c to rotating bodies 2a to 2c. Specifically, in the link actuation device illustrated in FIG. 25, pulleys 58 are fixed to the rotation shafts of posture control drive sources 35a to 35c. Belts 57a to 57c are stretched between three pulleys 58 and rotating bodies 2a to 2c. That is, the inner peripheral surfaces of belts 57a to 57c are in contact with the respective outer peripheries of pulleys 58 fixed to the rotation shafts of posture control drive sources 35a to 35c and also in contact with the outer peripheries of rotating bodies 2a to 2c. The rotation shafts of posture control drive sources 35a to 35c rotate, whereby pulleys 58 rotate to allow rotating bodies 2a to 2c to rotate through belts 57a to 57c.

The link actuation device illustrated in FIG. 25 also achieves an effect similar to that of the link actuation device illustrated in FIG. 19 and FIG. 20. Furthermore, in the link actuation device described above, any other configuration can be employed to transmit drive force from posture control drive sources 35a to 35c to rotating bodies 2a to 2c. For example, bevel gears or worm gears may be used such that the direction of the rotation shafts of posture control drive sources 35a to 35c intersects with the direction of rotation center axis 12 of rotating bodies 2a to 2c.

Eighth Embodiment

<Configuration of Link Actuation Device>

Figure 26:
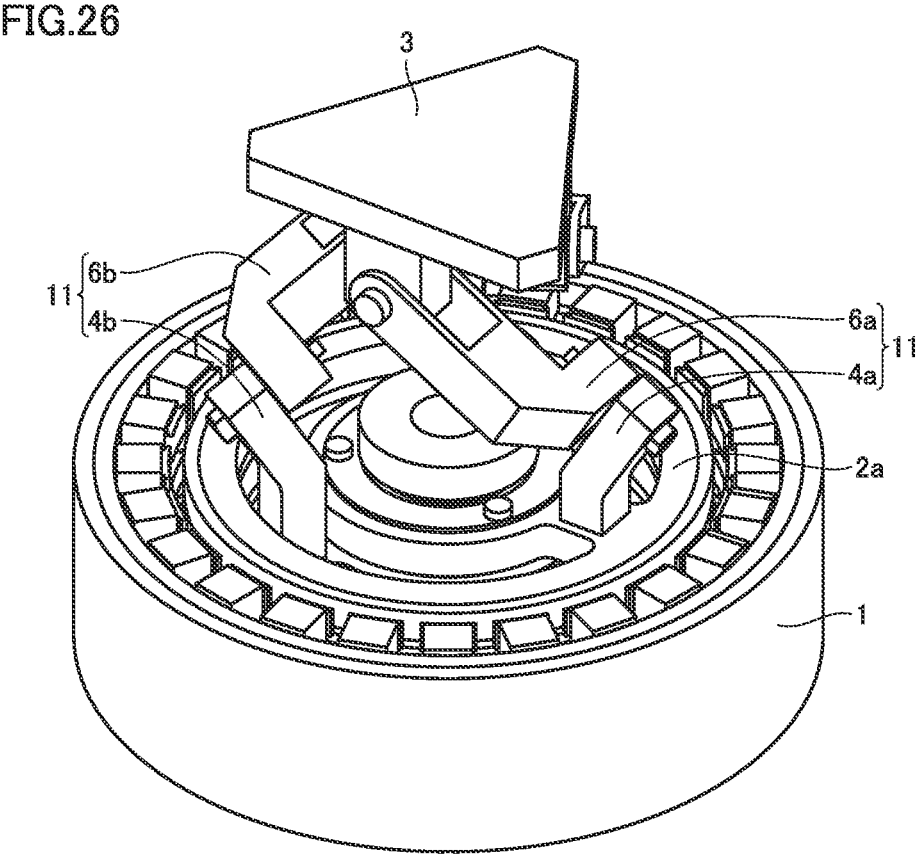
FIG. 26 is a perspective view illustrating a configuration of the link actuation device according to an eighth embodiment.
Figure 27:
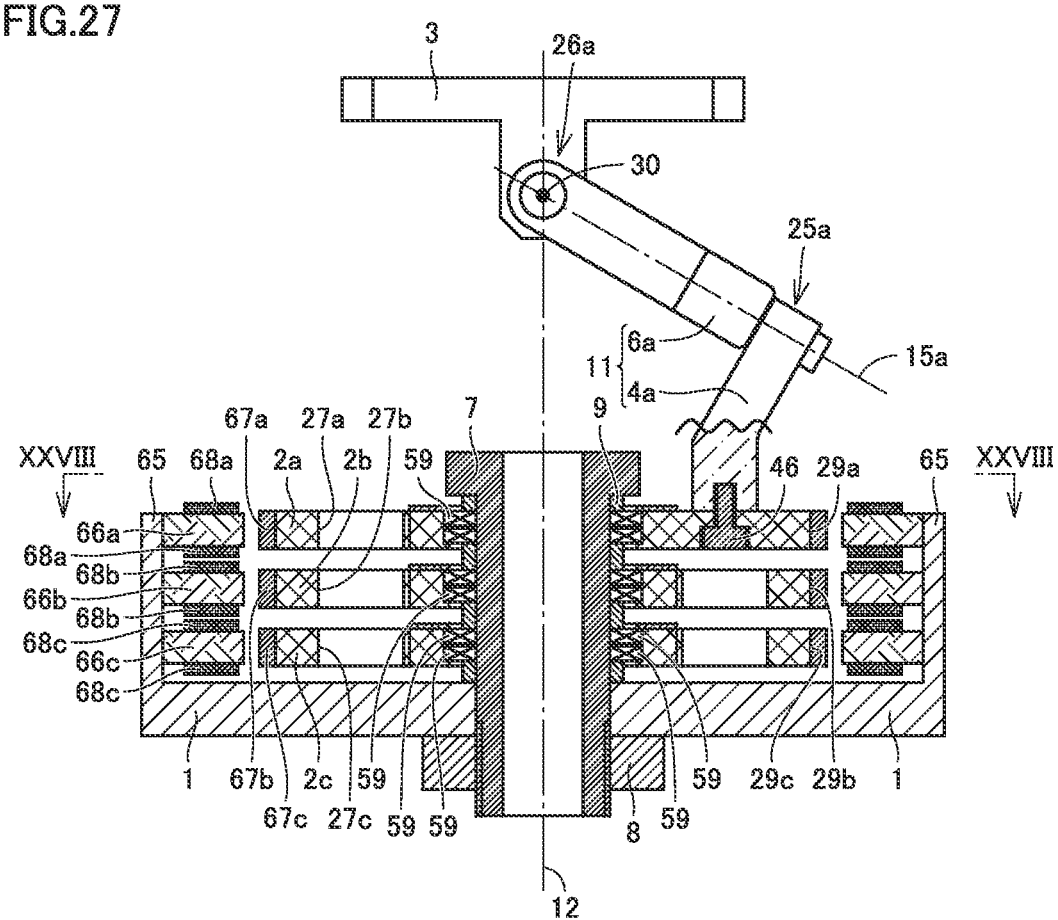
FIG. 27 is a diagram illustrating a configuration of the link actuation device illustrated in FIG. 26.
Figure 28:
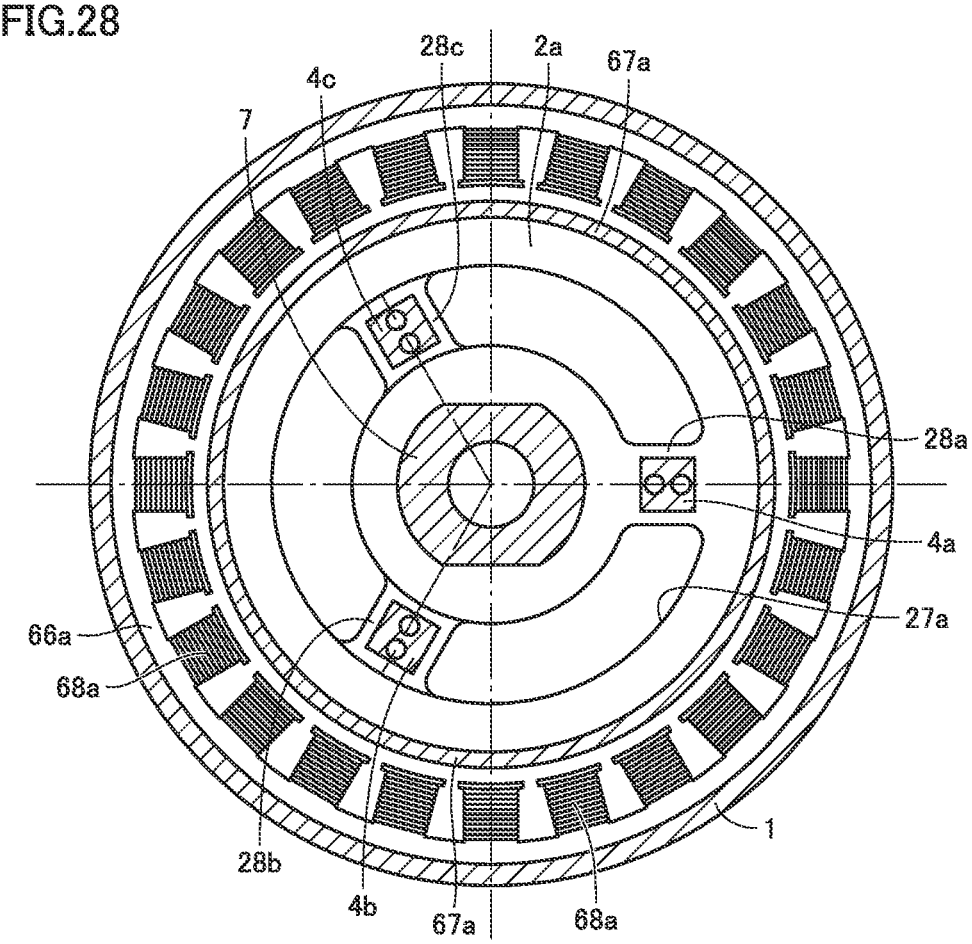
FIG. 28 is a cross-sectional view along line XXVIII-XXVIII in FIG. 27.
Figure 29:
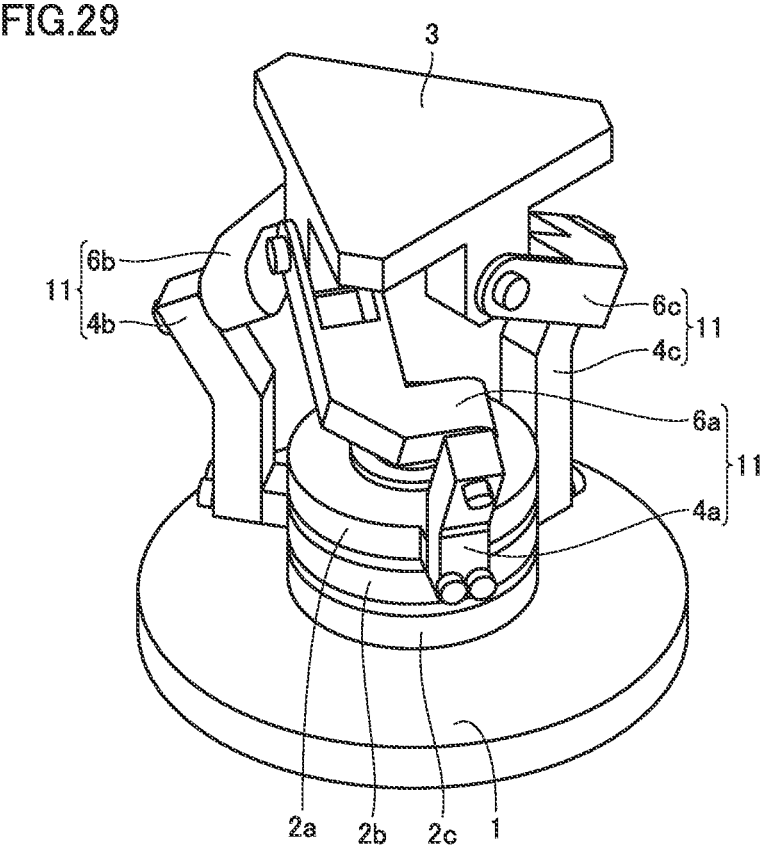
FIG. 29 is a diagram illustrating a first modification to the link actuation device according to the eighth embodiment.

FIG. 26 is a perspective view illustrating a configuration of the link actuation device according to an eighth embodiment. FIG. 27 is a diagram illustrating a configuration of the link actuation device illustrated in FIG. 26. FIG. 28 is a cross-sectional view along line XXVIII-XXVIII in FIG. 27.

The link actuation device illustrated in FIG. 26 to FIG. 28 basically includes a configuration similar to the link actuation device illustrated in FIG. 19 and FIG. 20 but differs from the link device illustrated in FIG. 19 and FIG. 20 in the configuration of a mechanism that transmits drive force from the posture control drive source to the parallel link mechanism.

In the link actuation device illustrated in FIG. 26 to FIG. 28, drive force is transmitted such that the parallel link mechanism and the posture control drive source are not in contact. Specifically, the parallel link mechanism and the posture control drive source are magnetically coupled.

A magnet 67a is fixed to an outer peripheral surface 29a of rotating body 2a. A magnet 67b is fixed to an outer peripheral surface 29b of rotating body 2b. A magnet 67c is fixed to an outer peripheral surface 29c of rotating body 2c. Any method other than the method using fastening members 47 described above can be employed to fix magnets 67a to 67c to rotating bodies 2a to 2c as long as necessary strength and precision is ensured. For example, magnets 67a to 67c may be fixed to rotating bodies 2a to 2c by bonding, press-fitting, crimping, or the like.

The posture control drive source includes a yoke 65, a plurality of teeth 66a to 66c, stator coils 68a to 68c, and a not-shown controller that controls a value of current flowing through each of stator coils 68a to 68c.

As illustrated in FIG. 27, yoke 65 is fixed to an outer peripheral end of proximal end-side link hub 1 and protrudes toward the distal end from the outer peripheral end. Yoke 65 is provided to face magnets 67a to 67c in the radial direction around rotation center axis 12. Yoke 65 is arranged on the outer peripheral side of magnets 67a to 67c in the radial direction.

As illustrated in FIG. 27 and FIG. 28, a plurality of teeth 66a to 66c are fixed to the inner peripheral surface of yoke 65 and protrude inward in the radial direction.

A plurality of teeth 66a are spaced apart from each other in the circumferential direction. Stator coil 68a is wound around each tooth 66a. A plurality of teeth 66a and stator coils 68a are provided to face magnet 67a in the radial direction. A plurality of teeth 66a and stator coils 68a are arranged on the outer peripheral side of magnet 67a in the radial direction.

A plurality of teeth 66b are spaced apart from each other in the circumferential direction. Stator coil 68b is wound around each tooth 66b. A plurality of teeth 66b and stator coils 68b are provided to face magnet 67b in the radial direction. A plurality of teeth 66b and stator coils 68b are arranged on the outer peripheral side of magnet 67b in the radial direction.

A plurality of teeth 66c are spaced apart from each other in the circumferential direction. Stator coil 68c is wound around each tooth 66c. A plurality of teeth 66c and stator coils 68c are provided to face magnet 67c in the radial direction. A plurality of teeth 66c and stator coils 68c are arranged on the outer peripheral side of magnet 67c in the radial direction.

The distances between adjacent two teeth 66a to 66c in the circumferential direction are, for example, equal. In a two-dimensional view, a plurality of teeth 66a and stator coils 68a, a plurality of teeth 66b and stator coils 68b, and a plurality of teeth 66c and stator coils 68c are arranged, for example, so as to overlap each other.

The controller is provided to individually control values of current flowing through stators coil 68a to 68c.

In the link actuation device illustrated in FIG. 26 to FIG. 28, magnets 67a to 67c fixed to rotating bodies 2a to 2c and the posture control drive source constitute an inner rotor-type motor. Current is supplied from the controller of the posture control drive source to stator coils 68a to 68c to cause magnets 67a to 67c to rotate and consequently drive the rotation of rotating bodies 2a to 2c. Rotating bodies 2a to 2c rotate to change the positions of link mechanisms 11 around rotation center axis 12. As a result, the posture of distal end-side link hub 3 can be changed.

The parallel link mechanism of the link actuation device illustrated in FIG. 26 to FIG. 28 basically includes a configuration similar to the parallel link mechanism illustrated in FIG. 15 to FIG. 18 but differs in that rotating bodies 2a to 2c are connected to bolt 7 through bearings 59 serving as rotation resistance reducing means and in that bolt 7 is hollow. The parallel link mechanism of the link actuation device according to the present embodiment may include the same configuration as the parallel link mechanism illustrated in FIG. 15 to FIG. 18.

<Operation and Effect>

The link actuation device according to the present embodiment basically includes a configuration similar to the link actuation device according to the seventh embodiment and therefore achieves an effect similar to that of the link actuation device according to the seventh embodiment.

Furthermore, in the link actuation device according to the present embodiment, the parallel link mechanism and the posture control drive source are magnetically coupled. In the link actuation device according to the present embodiment, therefore, loss of drive force between the parallel link mechanism and the posture control drive source is suppressed, compared with the link actuation device according to the seventh embodiment in which the parallel link mechanism and the posture control drive source are mechanically connected. As a result, the link actuation device according to the present embodiment has high operation efficiency and saves energy, compared with the link actuation device according to the seventh embodiment.

In addition, the link actuation device according to the present embodiment can operate at higher speed and at higher precision, compared with the link actuation device according to the seventh embodiment, because it is not necessary to provide backlash in the mechanism for transmitting drive force.

<Configuration and Operation and Effect of Modifications>

Figure 30:
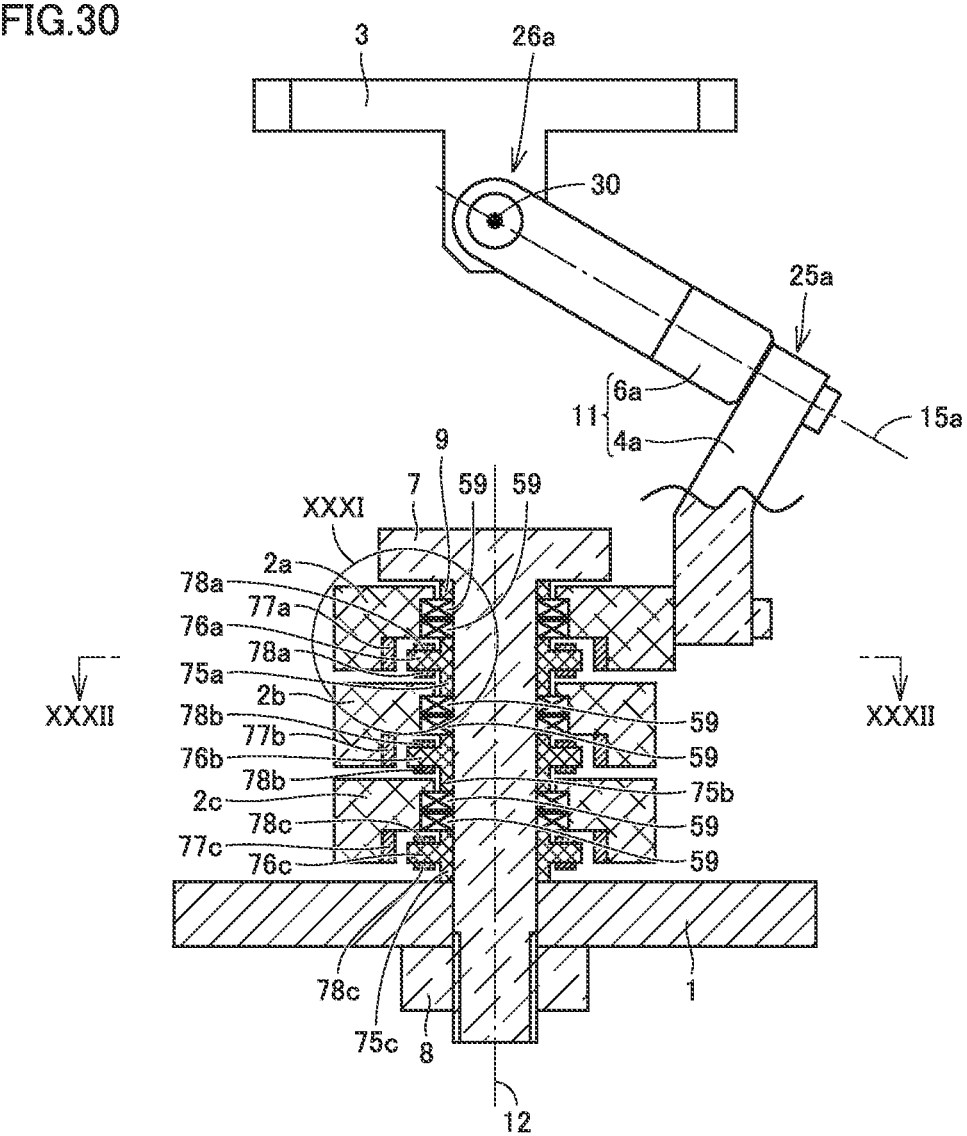
FIG. 30 is a diagram illustrating a configuration of the link actuation device illustrated in FIG. 29.
Figure 31:
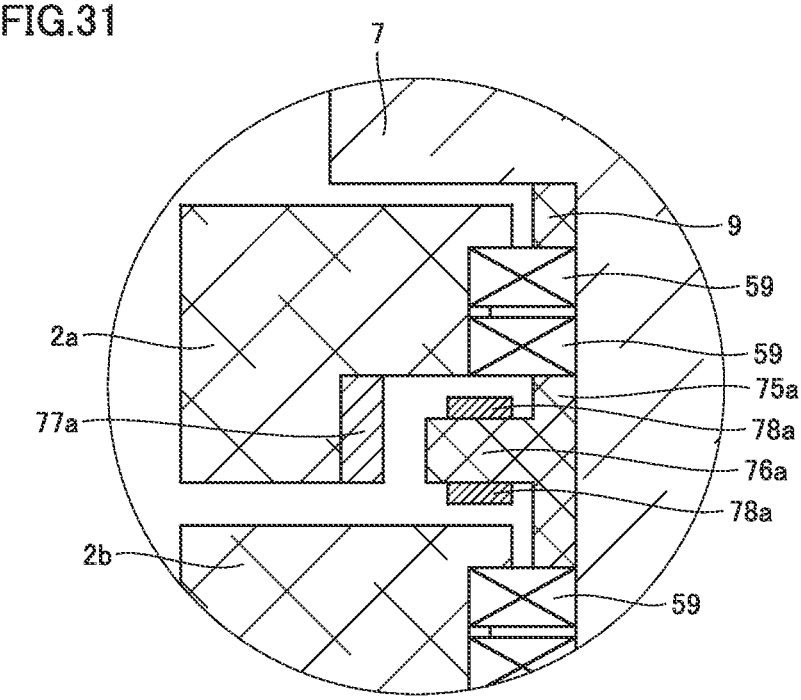
FIG. 31 is an enlarged cross-sectional view of region XXXI in FIG. 30.
Figure 32:
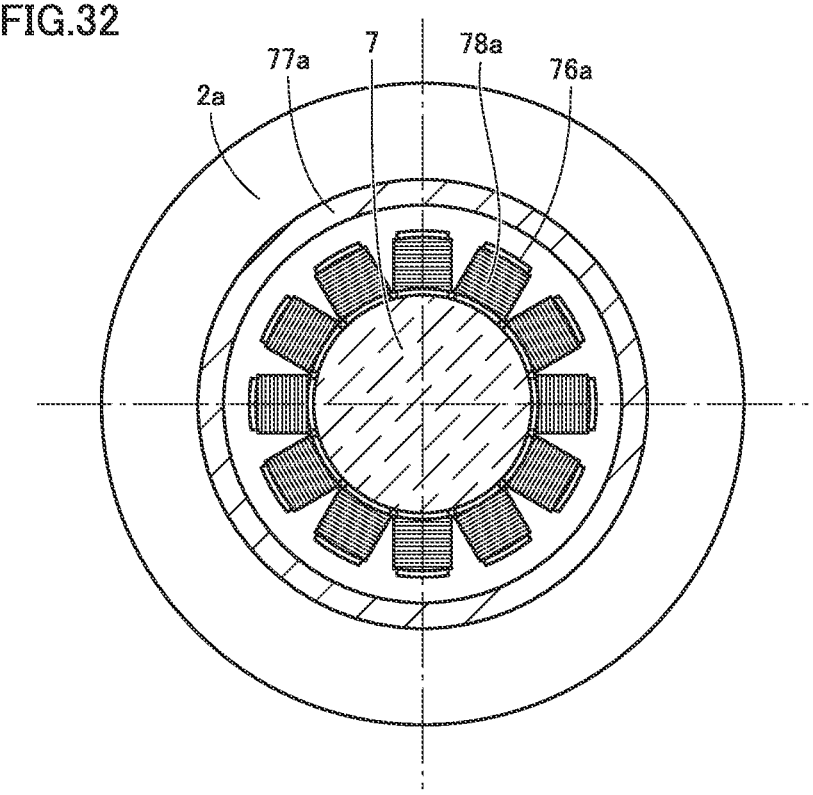
FIG. 32 is a cross-sectional view along line XXXII-XXXII in FIG. 30.
Figure 33:
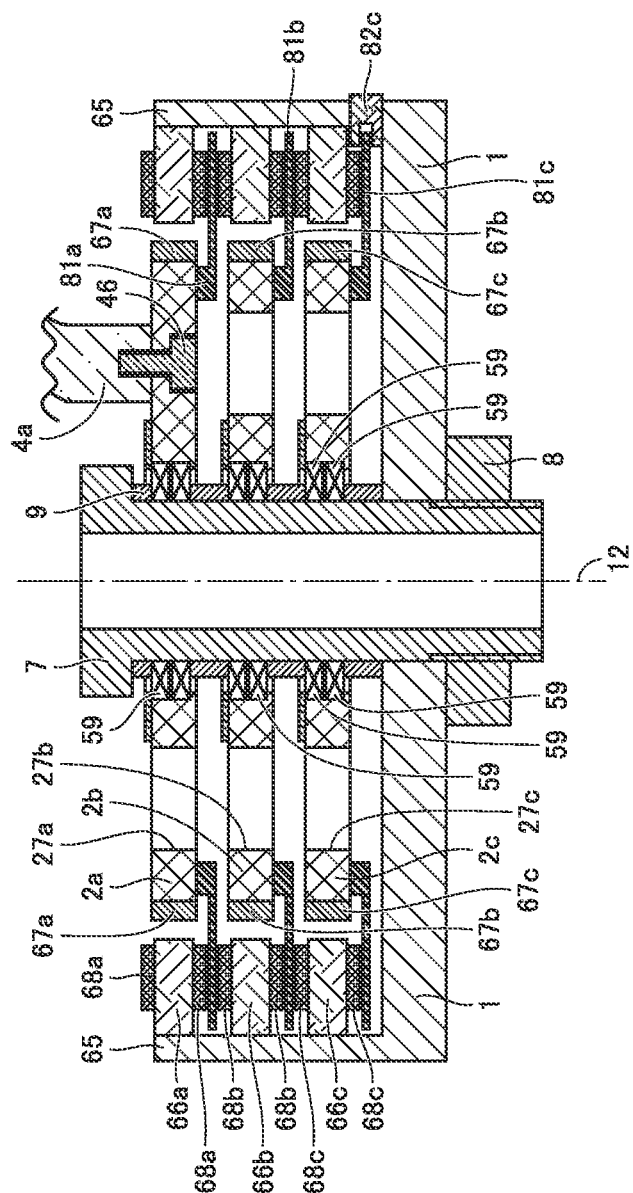
FIG. 33 is a perspective view illustrating a second modification to the link actuation device according to the eighth embodiment.
Figure 34:
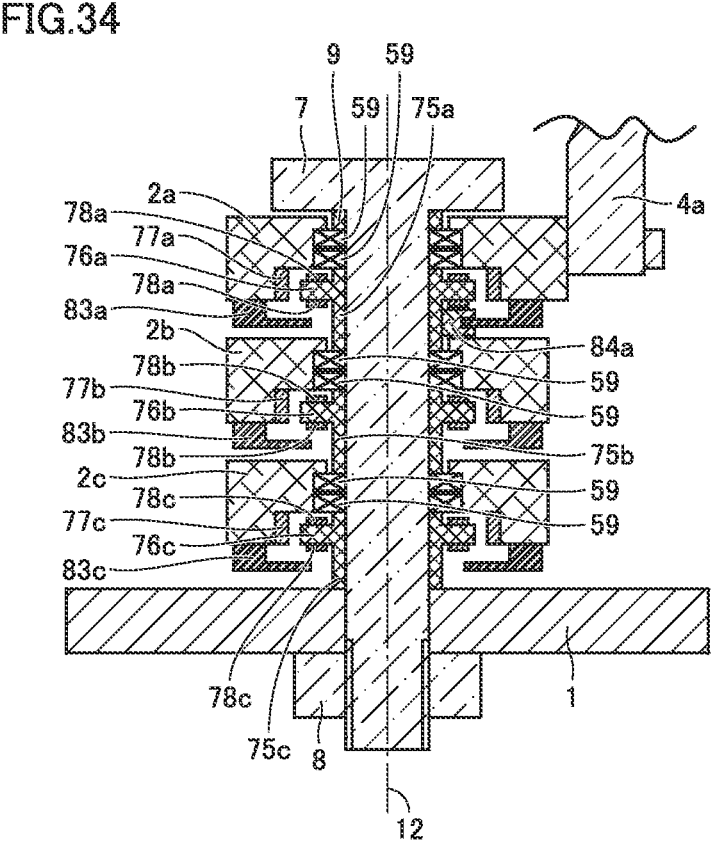
FIG. 34 is a diagram illustrating a third modification to the link actuation device according to the eighth embodiment.

FIG. 29 to FIG. 32 are diagrams illustrating a first modification to the link actuation device according to the eighth embodiment. FIG. 30 is a diagram illustrating a configuration of the link actuation device illustrated in FIG. 29. FIG. 31 is an enlarged cross-sectional view of region XXXI in FIG. 30. FIG. 32 is a cross-sectional view along line XXXII-XXXII in FIG. 30. FIG. 33 is a perspective view illustrating a second modification to the link actuation device according to the eighth embodiment. FIG. 34 is a diagram illustrating a third modification to the link actuation device according to the eighth embodiment.

The link actuation device illustrated in FIG. 29 to FIG. 32 basically includes a configuration similar to the link actuation device illustrated in FIG. 26 to FIG. 28 but differs from the link actuation device illustrated in FIG. 26 to FIG. 28 in that magnets 77a to 77c fixed to rotating bodies 2a to 2c and the posture control drive source described above constitute an outer rotor-type motor.

Rotating bodies 2a to 2c each have an inner peripheral surface that is positioned on the proximal end side with respect to a surface connected to bolt 7 through bearings 59 and is oriented to the inside in the radial direction. Magnets 77a to 77c are fixed to the respective inner peripheral surfaces of rotating bodies 2a to 2c. In other words, recessed portions that are depressed with respect to the surface positioned closer to proximal end-side link hub 1 are formed on the inner peripheral side in the radial direction of rotating bodies 2a to 2c. The inner peripheral surfaces are each formed with a wall surface of the recessed portion. Magnets 77a to 77c are arranged in the recessed portions.

The posture control drive source includes yokes 75a to 75c, a plurality of teeth 76a to 76c, stator coils 78a to 78c, and a not-shown controller that control a value of current flowing through each of stator coils 78a to 78c.

Yokes 75a to 75c each have an inner peripheral surface connected to the outer peripheral surface of bolt 7. Yoke 75a is arranged between bearing 59 connecting rotating body 2a to bolt 7 and bearing 59 connecting rotating body 2b to bolt 7. Yoke 75a is provided to face magnet 67a in the radial direction. Yoke 75a is arranged on the outer peripheral side of magnet 67a in the radial direction.

Yoke 75b is arranged between bearing 59 connecting rotating body 2b to bolt 7 and bearing 59 connecting rotating body 2c to bolt 7. Yoke 75b is provided to face magnet 67b in the radial direction. Yoke 75b is arranged on the outer peripheral side of magnet 67b in the radial direction.

Yoke 75c is arranged between bearing 59 connecting rotating body 2c to bolt 7 and proximal end-side link hub 1. Yoke 75c is provided to face magnet 67c in the radial direction. Yoke 75c is arranged on the outer peripheral side of magnet 67c in the radial direction.

As illustrated in FIG. 30, a plurality of teeth 76a to 76c are fixed to the outer peripheral surfaces of yokes 75a to 75c and protrude outward in the radial direction. A plurality of teeth 76a to 76c are arranged in the respective recessed portions of rotating bodies 2a to 2c.

A plurality of teeth 76a are spaced apart from each other in the circumferential direction. Stator coil 78a is wound around each tooth 76a. A plurality of teeth 76a and stator coils 78a are provided to face magnet 77a in the radial direction. A plurality of teeth 76a and stator coils 78a are arranged on the inner peripheral side of magnet 77a in the radial direction.

A plurality of teeth 76b are spaced apart from each other in the circumferential direction. Stator coil 78b is wound around each tooth 76b. A plurality of teeth 766b and stator coils 78b are provided to face magnet 77b in the radial direction. A plurality of teeth 76b and stator coils 78b are arranged on the inner peripheral side of magnet 77b in the radial direction.

A plurality of teeth 76c are spaced apart from each other in the circumferential direction. Stator coil 78c is wound around each tooth 76c. A plurality of teeth 76c and stator coils 78c are provided to face magnet 77c in the radial direction. A plurality of teeth 76c and stator coils 78c are arranged on the outer peripheral side of magnet 77c in the radial direction.

The distances between adjacent two teeth 76a to 76c in the circumferential direction are, for example, equal. In a two-dimensional view, a plurality of teeth 76a and stator coils 78a, a plurality of teeth 76b and stator coils 78b, and a plurality of teeth 76c and stator coils 78c are arranged, for example, so as to overlap each other.

The controller is provided to individually control values of current flowing through stators coil 78a to 78c.

In the link actuation device illustrated in FIG. 29 to FIG. 32, magnets 77a to 77c fixed to rotating bodies 2a to 2c and the posture control drive source described above constitute an outer rotor-type motor. Current is supplied from the controller of the posture control drive source to stator coils 78a to 78c to cause magnets 77a to 77c to rotate and consequently drive the rotation of rotating bodies 2a to 2c. Rotating bodies 2a to 2c rotate to change the positions of link mechanisms 11 around rotation center axis 12. As a result, the posture of distal end-side link hub 3 can be changed.

The link actuation device illustrated in FIG. 33 basically includes a configuration similar to the link actuation device illustrated in FIG. 26 to FIG. 28 but differs from the link actuation device illustrated in FIG. 26 to FIG. 28 in that it further includes a rotation amount detecting mechanism for detecting the amounts of rotation of rotating bodies 2a to 2c.

The rotation amount detecting mechanism may have any configuration that can detect the amounts of rotation of rotating bodies 2a to 2c and, for example, is configured as an optical encoder.

The rotation amount detecting mechanism for detecting the amount of rotation of rotating body 2a includes a detection target 81a fixed to rotating body 2a and a not-shown detector that detects the amount of movement of detection target 81a. The rotation amount detecting mechanism for detecting the amount of rotation of rotating body 2*b* includes a detection target 81*b* fixed to rotating body 2*b* and a not-shown detector that detects the amount of movement of detection target 81*b*. The rotation amount detecting mechanism for detecting the amount of rotation of rotating body 2*c* includes a detection target 81*c* fixed to rotating body 2*c* and a detector 82*c* that detects the amount of movement of detection target 81*c*.

Detection target 81*a* is fixed to the outer peripheral portion of rotating body 2*a* positioned on the outer peripheral side of through hole 27*a* and protrudes toward the outer peripheral side of magnet 67*a*. Detection target 81*a* is fixed, for example, to a surface oriented to the proximal end side of rotating body 2*a*. Detection target 81*a* is arranged, for example, between stator coils 68*a* and 68*b*. The outer peripheral end of detection target 81*a* is arranged, for example, on the outer peripheral side of stator coils 68*a* and 68*b* and on the inner peripheral side of yoke 65. The detector that detects the amount of movement of detection target 81*a* is fixed, for example, to yoke 65.

Detection target 81*b* is fixed to the outer peripheral portion of rotating body 2*b* positioned on the outer peripheral side of through hole 27*b* and protrudes toward the outer peripheral side of magnet 67*b*. Detection target 81*b* is fixed, for example, to a surface oriented to the proximal end side of rotating body 2*b*. Detection target 81*b* is arranged, for example, between stator coils 68*b* and 68*c*. The outer peripheral end of detection target 81*b* is arranged, for example, on the outer peripheral side of stator coils 68*b* and 68*c* and on the inner peripheral side of yoke 65. The detector that detects the amount of movement of detection target 81*b* is fixed, for example, to yoke 65.

Detection target 81*c* is fixed to the outer peripheral portion of rotating body 2*c* positioned on the outer peripheral side of through hole 27*c* and protrudes toward the outer peripheral side of magnet 67*c*. Detection target 81*c* is fixed, for example, to a surface oriented to the proximal end side of rotating body 2*c*. Detection target 81*c* is arranged, for example, between stator coil 68*c* and proximal end-side link hub 1. The outer peripheral end of detection target 81*c* is arranged, for example, on the outer peripheral side of stator coils 68*c* and on the inner peripheral side of yoke 65. The detector that detects the amount of movement of detection target 81*c* is fixed, for example, to proximal end-side link hub 1 and yoke 65.

Each detector has, for example, opposing portions arranged to face each other such that the outer peripheral end of the corresponding one of detection targets 81*a* to 81*c* is sandwiched therebetween in the direction along rotation center axis 12. Of the opposing portions, one of the portion positioned on the proximal end side relative to detection target 81*a* to 81*c* and the portion positioned on the distal end side relative to detection target 81*a* to 81*c* is formed as a light-emitting portion, and the other is formed as a light-receiving portion. The optical axis from the light-emitting portion to the light-receiving portion is, for example, parallel to the direction along rotation center axis 12. The detectors are, for example, spaced apart from each other in the circumferential direction in a two-dimensional view.

In the link actuation device illustrated in FIG. 33, since the rotation amount detecting mechanism detects the amounts of rotation of rotating bodies 2*a* to 2*c* from the amounts of movement of detection targets 81*a* to 81*c* detected by the detectors, the operation of distal end-side link hub 3 can be controlled more precisely based on the amount of rotation, compared with the link actuation device illustrated in FIG. 26 to FIG. 28.

The link actuation device illustrated in FIG. 34 basically includes a configuration similar to the link actuation device illustrated in FIG. 29 to FIG. 32 but differs from the link actuation device illustrated in FIG. 29 to FIG. 32 in that it further includes a rotation amount detecting mechanism for detecting the amounts of rotation of rotating bodies 2*a* to 2*c*.

The rotation amount detecting mechanism of the link actuation device illustrated in FIG. 34 basically includes a configuration similar to the rotation amount detecting mechanism of the link actuation device illustrated in FIG. 33 but differs from the link actuation device illustrated in FIG. 29 to FIG. 32 in that it includes detection targets 83*a* to 83*c* protruding toward the inner peripheral side of magnets 77*a* to 77*c*, and detectors fixed to bolt 7.

Detection target 83*a* is fixed to the outer peripheral portion of rotating body 2*a* positioned on the outer peripheral side of magnet 77*a* and protrudes toward the inner peripheral side of magnet 77*a*. Detection target 83*a* is fixed, for example, to a surface oriented to the proximal end side of rotating body 2*a*. The outer peripheral end of detection target 83*a* is arranged, for example, so as to overlap stator coil 68*a* in a two-dimensional view. The outer peripheral end of detection target 83*a* is arranged on the outer peripheral side of yoke 75*a*. Detector 84*a* that detects the amount of movement of detection target 83*a* is fixed, for example, to yoke 75*a*.

Detection target 83*b* is fixed to the outer peripheral portion of rotating body 2*b* positioned on the outer peripheral side of magnet 77*b* and protrudes toward the inner peripheral side of magnet 77*b*. Detection target 83*b* is fixed, for example, to a surface oriented to the proximal end side of rotating body 2*b*. The outer peripheral end of detection target 83*b* is arranged, for example, so as to overlap stator coil 68*b* in a two-dimensional view. The outer peripheral end of detection target 83*b* is arranged on the outer peripheral side of yoke 75*b* The not-shown detector that detects the amount of movement of detection target 83*b* is fixed, for example, to yoke 75*b*.

Detection target 83*c* is fixed to the outer peripheral portion of rotating body 2*c* positioned on the outer peripheral side of magnet 77*c* and protrudes toward the outer peripheral side of magnet 77*c* Detection target 83*c* is fixed, for example, to a surface oriented to the proximal end side of rotating body 2*c*. The outer peripheral end of detection target 83*c* is arranged, for example, so as to overlap stator coil 68*c* in a two-dimensional view. The outer peripheral end of detection target 83*c* is arranged on the outer peripheral side of yoke 75*c*. The not-shown detector that detects the amount of movement of detection target 83*c* is fixed, for example, to yoke 75*c*.

Each detector has, for example, opposing portions arranged to face each other such that the inner peripheral end of the corresponding one of detection targets 83*a* to 83*c* is sandwiched therebetween in the direction along rotation center axis 12. Of the opposing portions, one of the portion positioned on the proximal end side relative to detection target 83*a* to 83*c* and the portion positioned on the distal end side relative to detection target 83*a* to 83*c* is formed as a light-emitting portion, and the other is formed as a light-receiving portion. The detectors are, for example, spaced apart from each other in the circumferential direction in a two-dimensional view.

In the link actuation device illustrated in FIG. 34, since the amounts of rotation of rotating bodies 2*a* to 2*c* are detected by the rotation amount detectors, the operation of distal end-side link hub 3 can be controlled more precisely based on the amount of rotation, compared with the link actuation device illustrated in FIG. 29 to FIG. 32.

The parallel link mechanism of the link actuation device according to the eighth embodiment may include four rotating bodies 2a to 2d, similarly to the parallel link mechanism of the link actuation device illustrated in FIG. 22 and FIG. 23. In this case, rotating body 2d and a posture control drive source for driving rotating body 2d are magnetically connected, similarly to rotating bodies 2a to 2c and the posture control drive source for driving them illustrated in FIG. 26 to FIG. 28.

The link actuation devices described above, for example, the link actuation device illustrated in FIG. 19 to FIG. 21, the link actuation device illustrated in FIG. 22 and FIG. 23, and the link actuation device illustrated in FIG. 25 may also include the rotation amount detecting mechanism illustrated in FIG. 33 or FIG. 34. For example, each detector is fixed to a support member fixed to proximal end-side link hub 1 and protruding toward the distal end side on the outer peripheral side of rotating bodies 2a to 2c. The detectors are, for example, spaced apart from the posture control drive sources in the circumferential direction in a two-dimensional view.

Ninth Embodiment

<Configuration of Parallel Link Mechanism>

Figure 35:
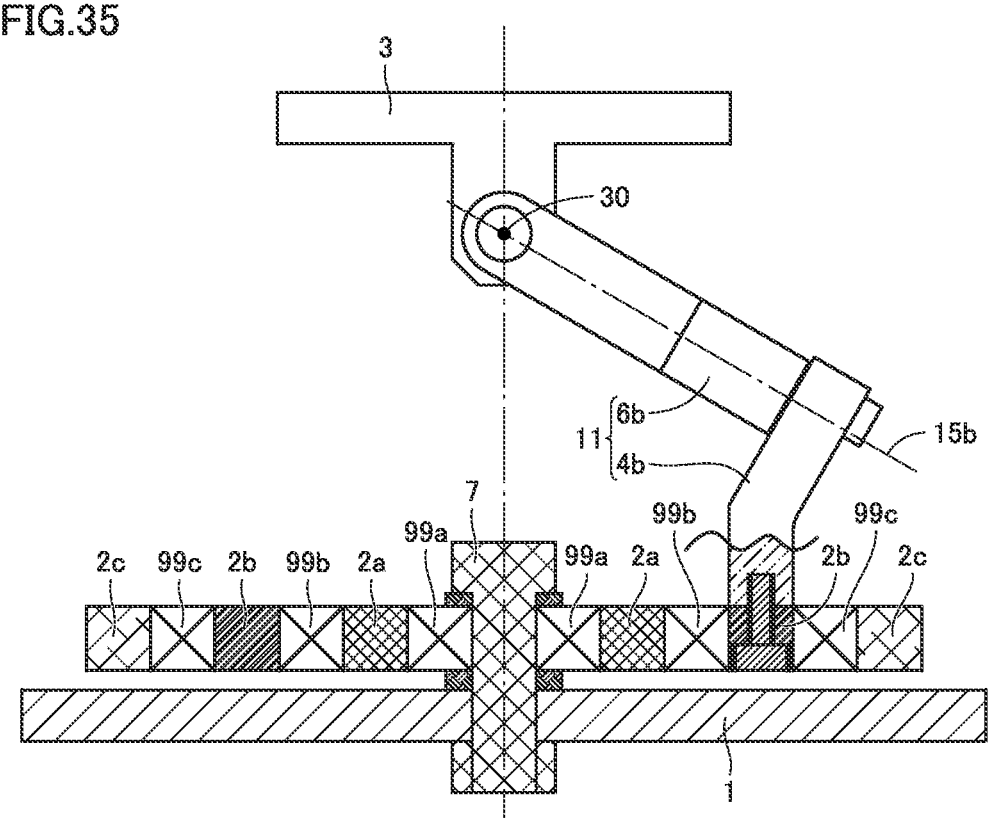
FIG. 35 is a diagram illustrating a configuration of the parallel link mechanism according to a ninth embodiment.

FIG. 35 is a diagram illustrating a configuration of the parallel link mechanism according to a ninth embodiment. The parallel link mechanism illustrated in FIG. 35 basically includes a configuration similar to the parallel link mechanism illustrated in FIG. 1 to FIG. 4 but differs from the parallel link mechanism illustrated in FIG. 1 to FIG. 4 in the shape and arrangement of rotating bodies 2a to 2c.

In the parallel link mechanism illustrated in FIG. 35, rotating bodies 2a to 2c are provided annularly. Rotating bodies 2a to 2c are aligned in the radial direction such that their respective rotation center axes 12 are coincident.

The dimensions of rotating bodies 2a to 2c are different from each other. The inner diameter of rotating body 2a is longer than the outer diameter of bolt 7. The outer diameter of rotating body 2a is shorter than the inner diameter of rotating body 2b. The outer diameter of rotating body 2b is shorter than the inner diameter of rotating body 2c. Rotating body 2a is arranged on a first circumference around rotation center axis 12 in a two-dimensional view. Rotating body 2b is arranged on a second circumference around rotation center axis 12 in a two-dimensional view with a radius longer than that of the first circumference. Rotating body 2c is arranged on a third circumference around rotation center axis 12 in a two-dimensional view with a radius longer than that of the second circumference.

Rotating body 2a is arranged in a space surrounded by the inner peripheral surface of rotating body 2b. Rotating body 2a is connected to bolt 7 with a bearing 99a interposed. The inner race of bearing 99a is fixed to bolt 7. The outer race of bearing 99a is fixed to rotating body 2a.

Rotating body 2b is arranged in a space surrounded by the inner peripheral surface of rotating body 2c. Rotating body 2b is connected to rotating body 2a with a bearing 99b interposed. The inner race of bearing 99b is fixed to rotating body 2a. The outer race of bearing 99b is fixed to rotating body 2b.

Rotating body 2c is connected to rotating body 2b with a bearing 99c interposed. The inner race of bearing 99c is fixed to rotating body 2b. The outer race of bearing 99c is fixed to rotating body 2c.

For example, roller bearings such as ball bearings can be used as bearings 99a to 99c.

In the parallel link mechanism illustrated in FIG. 35, the distances from rotating bodies 2a to 2c to proximal end-side link hub 1 are equal to each other. In the parallel link mechanism illustrated in FIG. 35, the lengths of first link members 4a to 4c are equal to each other.

In the parallel link mechanism illustrated in FIG. 35, since rotating bodies 2a to 2c are not stacked in the direction along rotation center axis 12 but are aligned in the radial direction such that their respective rotation center axes 12 are coincident, the size can be reduced in the direction along rotation center axis 12, compared with the parallel link mechanism illustrated in FIG. 1 to FIG. 4.

The parallel link mechanism according to the ninth embodiment may include four rotating bodies 2a to 2d. Not-shown rotating body 2d is provided annularly. Rotating body 2d is arranged on a fourth circumference around rotation center axis 12 in a two-dimensional view with a radius longer than that of the third circumference. Rotating body 2d is connected to rotating body 2c with a not-shown bearing 99d interposed. The inner race of bearing 99d is fixed to rotating body 2c. The outer race of bearing 99d is fixed to rotating body 2d.

Tenth Embodiment

<Configuration of Link Actuation Device>

Figure 36:
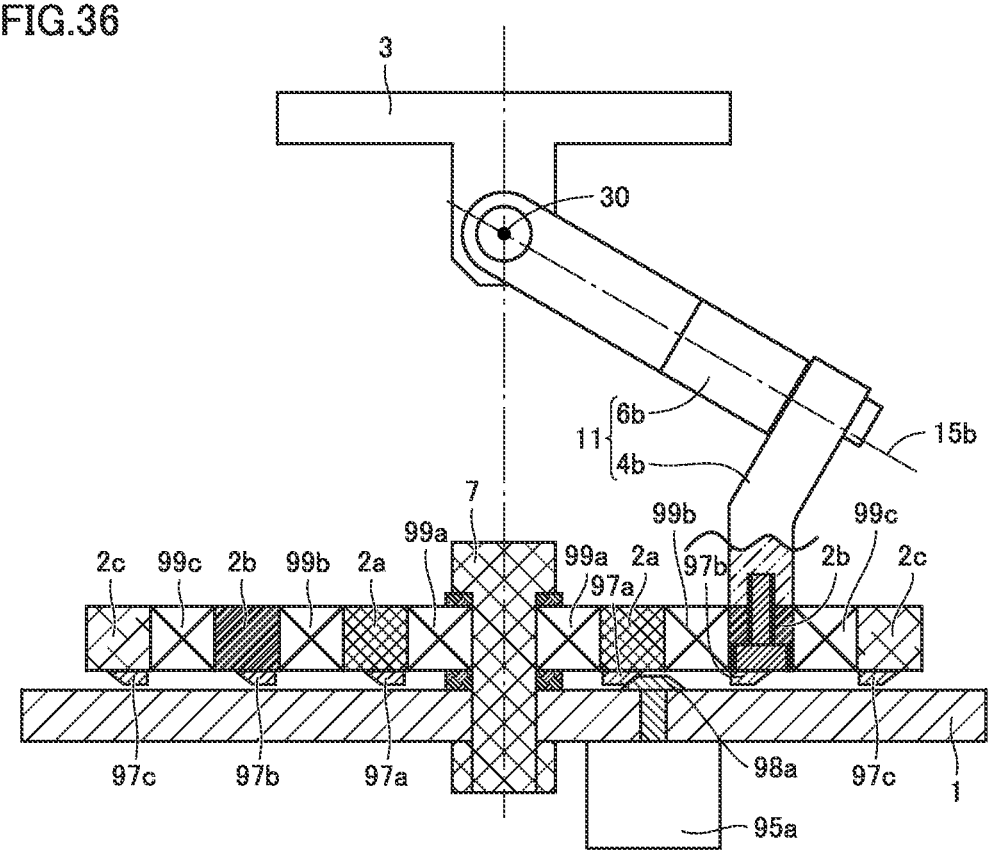
FIG. 36 is a diagram illustrating a configuration of the link actuation device according to a tenth embodiment.

FIG. 36 is a diagram illustrating a configuration of the link actuation device according to a tenth embodiment. The link actuation device illustrated in FIG. 36 is basically a link actuation device including the parallel link mechanism illustrated in FIG. 35. The link actuation device illustrated in FIG. 36 mainly includes a parallel link mechanism and a posture control drive source for driving the parallel link mechanism.

In the link actuation device illustrated in FIG. 36, the parallel link mechanism is mechanically connected to posture control drive sources in the direction along rotation center axis 12.

Three posture control drive sources 95a to 95c are fixed to proximal end-side link hub L Posture control drive sources 95a to 95c are respectively connected to rotating bodies 2a to 2c through rotation transmitting members 97a to 97c and bevel gears 98a to 98c such that drive force can be transmitted. In FIG. 36, posture control drive sources 95b and 95 c are not illustrated.

Posture control drive source 95a is arranged on a first circumference around rotation center axis 12 in a two-dimensional view. Posture control drive source 95b is arranged on a second circumference around rotation center axis 12 in a two-dimensional view with a radius longer than that of the first circumference. Posture control drive source 95c is arranged on a third circumference around rotation center axis 12 in a two-dimensional view with a radius longer than that of the second circumference.

Posture control drive sources 95a to 95c include respective rotation shafts, and bevel gears 98a to 98c are connected to the end portions of the respective rotation shafts. Rotation transmitting members 97a to 97c are fixed to the surfaces oriented to the proximal end side of rotating bodies 2a to 2c. Rotation transmitting members 97a to 97c each are an annular member and have a bevel gear portion on one surface in the axial direction thereof. Any method that ensures necessary strength and precision can be employed to fix rotation transmitting members 97a to 97c to rotating bodies 2a to 2c. For example, rotation transmitting members 97a to 97c may be fixed to rotating bodies 2a to 2c by bonding, press-fitting, crimping, or the like.

The bevel gear portions of rotation transmitting members 97a to 97c are meshed with bevel gears 98a to 98c connected to the rotation shafts of posture control drive sources 95a to 95c. The rotation shafts of posture control drive sources 95a to 95c rotate to cause bevel gears 98a to 98c and rotation transmitting members 97a to 97c to rotate and consequently drive the rotation of rotating bodies 2a to 2c.

Rotating bodies 2a to 2c are rotated by posture control drive sources 95a to 95c to change the positions of link mechanisms 11 around rotation center axis 12. As a result, the posture of distal end-side link hub 3 can be changed.

In the link actuation device according to the tenth embodiment, the parallel link mechanism and the posture control drive source may be magnetically connected in the direction along rotation center axis 12. That is, in the link actuation device according to the tenth embodiment, the transmission mechanism for transmitting drive force from the posture control drive source to the parallel link mechanism may include a configuration basically similar to that of the link actuation device according to the eighth embodiment. The link actuation device according to the tenth embodiment may differ from the link actuation device according to the eighth embodiment in that not-shown magnets fixed to rotating bodies 2a to 2c and not-shown stator coils fixed to proximal end-side link hub 1 are arranged to face each other in the direction along rotation center axis 12.

The link actuation device according to the tenth embodiment may further include a not-shown rotation amount detecting mechanism for detecting the amounts of rotation of rotating bodies 2a to 2c. Such a rotation amount detecting mechanism may basically include a configuration similar to the rotation amount detecting mechanism of the link actuation device illustrated in FIG. 33. The detectors are fixed to the surfaces oriented to the proximal end side of rotating bodies 2a to 2c. Furthermore, the detectors may be fixed to, for example, a surface oriented to the proximal end side of the outer race of bearing 99a, the inner race or the outer race of bearings 99b and 99c. For example, each detector is fixed to proximal end-side link hub 1 and has opposing portions arranged to face each other such that an end portion positioned on the proximal end side of each detection target is sandwiched therebetween in the radial direction.

In the parallel link mechanism according to the first to tenth embodiments, each of three or more link mechanisms 11 is connected to one rotating body among three or more rotating bodies 2a to 2d. However, the present invention is not limited thereto. From a different point of view, in the parallel link mechanism according to the first to tenth embodiments, rotating bodies 2a to 2d as many as link mechanisms 11 are provided, and each of three or more link mechanisms 11 is provided so as to independently rotate relative to proximal end-side link hub 1. However, the present invention is not limited thereto. In the link actuation device according to the seventh to tenth embodiments, posture control drive sources 35a to 35c rotate rotating bodies 2a to 2c to change the posture of distal end-side link hub 3 as desired relative to proximal end-side link hub 1. However, the present invention is not limited thereto.

In the parallel link mechanism according to the first to tenth embodiments, the first link member of at least one link mechanism 11 may be fixed to proximal end-side link hub 1. For example, first link member 1a of one link mechanism 11 may be fixed to proximal end-side link hub 1, and first link members 1b and 1c of the other link mechanisms 11 may be connected to rotating bodies 2b and 2c to rotate relative to proximal end-side link hub 1. Furthermore, first link members 1a and 1b of two link mechanisms 11 may be fixed to proximal end-side link hub 1, and only first link member 1c of one link mechanism 11 may be connected to rotating body 2c to rotate relative to proximal end-side link hub 1. For example, the link actuation device including the latter parallel link mechanism may include only one posture control drive source 35c as a posture control drive source.

Furthermore, in the parallel link mechanism according to the first to tenth embodiments, first link members 1a and 1b of two or more link mechanisms 11 may be connected to one rotating body 2a so as to integrally rotate relative to proximal end-side link hub 1. In this case, first link member 1c of the other link mechanism 11 may be fixed to the other rotating body 2c or proximal end-side link hub 1. For example, the link actuation device including the former parallel link mechanism may include only two posture control drive sources 35a and 35c as posture control drive sources.

Even when the parallel link mechanism according to the first to tenth embodiment has the configuration as described above, first center axes 15a to 15c of first revolute pair portions 25a to 25c intersect with second center axes 16a to 16c of second revolute pair portions 26a to 26c at spherical link center point 30, and rotation center axis 12 of three or more rotating bodies 2a to 2c intersects with spherical link center point 30, so that distal end-side link hub 3 can move along a sphere around spherical link center point 30.

Eleventh Embodiment

<Configuration of Parallel Link Mechanism>

Figure 37:
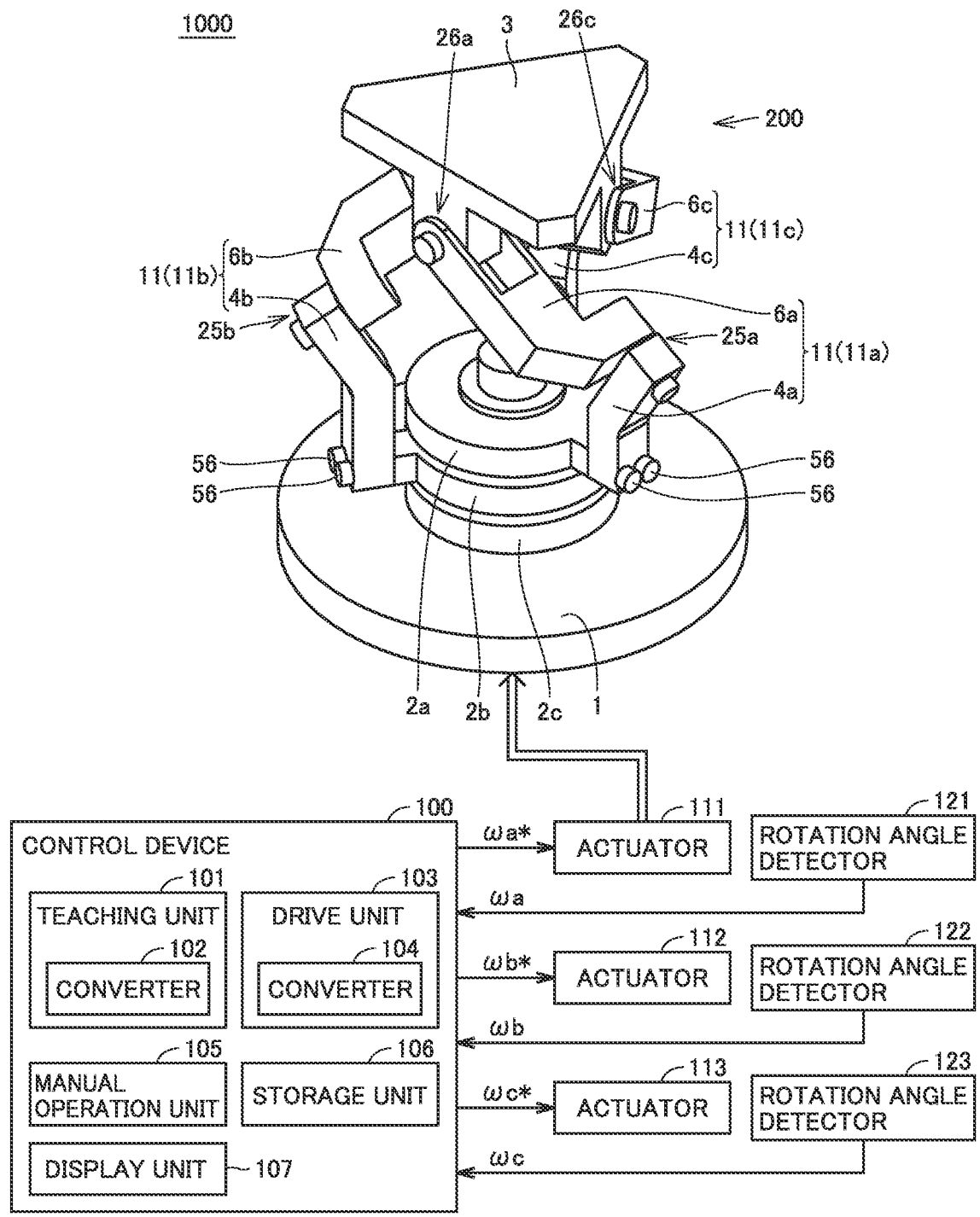
FIG. 37 is a diagram illustrating a configuration of the link actuation device according to an eleventh embodiment.

FIG. 37 is a diagram illustrating a configuration of the link actuation device according to an eleventh embodiment. A link actuation device 1000 illustrated in FIG. 37 includes a parallel link mechanism 200, a control device 100, actuators 111 to 113, and rotation angle detectors 121 to 123.

Control device 100 can receive rotation angles ωa to ωc respectively detected by rotation angle detectors 121 to 123 and teach the posture of parallel link mechanism 200. Furthermore, control device 100 can output target rotation angles ωa* to ωc* to actuators 111 to 113 and control the posture of parallel link mechanism 200.

Control device 100 includes a teaching unit 101, a drive unit 103, a manual operation unit 105, a storage unit 106, and a display unit 107. Teaching unit 101 and drive unit 103 include converters 102 and 104, respectively.

A central processing unit (CPU) can be used as teaching unit 101 and drive unit 103. A memory, a hard disk, or the like can be used as storage unit 106. A program and data stored in storage unit 106 is read by the CPU, whereby the CPU operates as teaching unit 101 or drive unit 103.

Teaching unit 101 acquires angles ωa, ωb, and ωc from rotation angle detectors 121 to 123, converts the acquired angles into data indicating the posture of parallel link mechanism 200 by converter 102, and performs teaching operation including outputting the data to display unit 107.

Drive unit 103 converts data indicating a target posture of parallel link mechanism 200 provided from manual operation unit 105 or a high-level processor into target angles ωa*, ωb*, and ωc* by converter 104 and drives actuators 111 to 113 to achieve the target angles.

Figure 38:
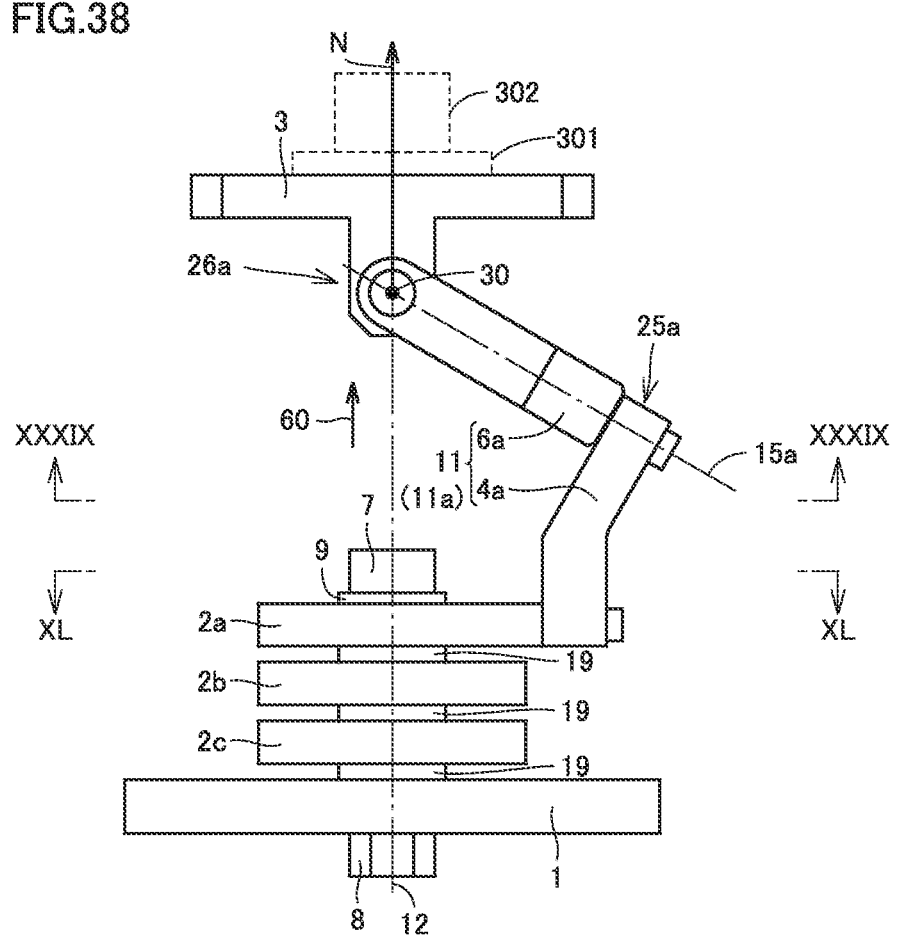
FIG. 38 is a front view of the parallel link mechanism of the link actuation device illustrated in FIG. 37.
Figure 39:
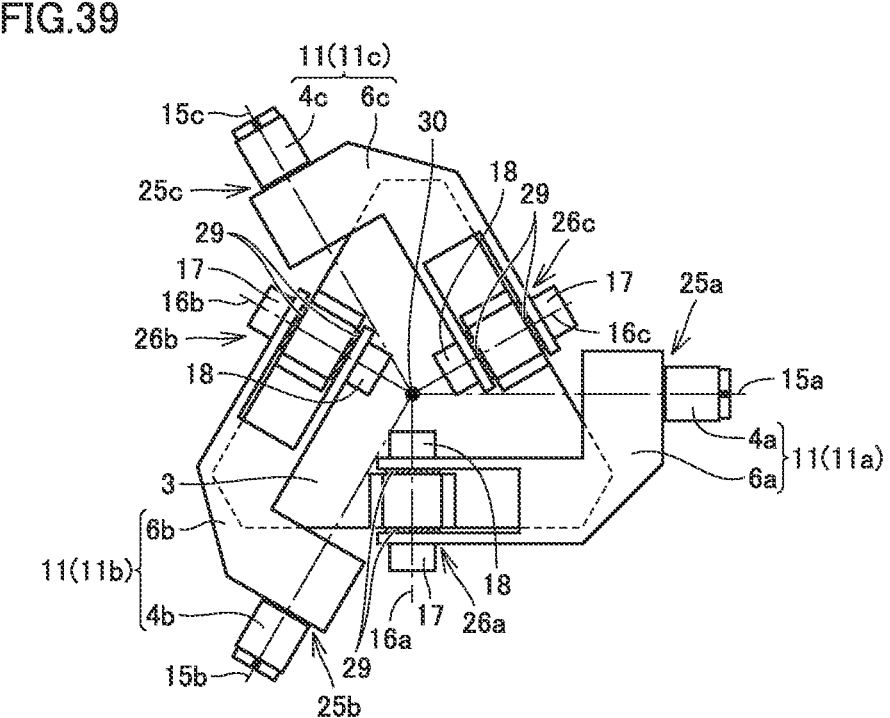
FIG. 39 is a partial view of the distal end-side link hub and the link mechanism as viewed from a cross section along line XXXIX-XXXIX in FIG. 38.
Figure 40:
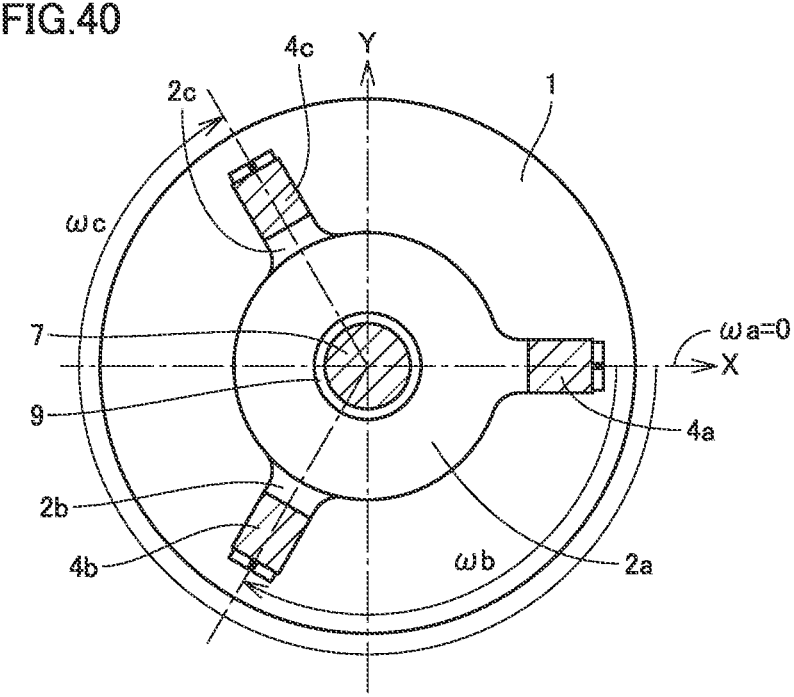
FIG. 40 is a cross-sectional view along line XL-XL in FIG. 38.

FIG. 38 is a front view of the parallel link mechanism of the link actuation device illustrated in FIG. 37. FIG. 39 is a partial view of the distal end-side link hub and the link mechanism as viewed from a cross section along line XXXIX-XXXIX in FIG. 38. FIG. 40 is a cross-sectional view along line XL-XL in FIG. 38.

Parallel link mechanism 200 illustrated in FIG. 37 to FIG. 40 includes a proximal end-side first link hub (proximal end-side link hub) 1, three link mechanisms 11, three rotating bodies 2a to 2c, and a distal end-side second link hub (distal end-side link hub) 3. Proximal end-side first link hub 1 is a disc-shaped member. Although the two-dimensional shape of proximal end-side first link hub 1 illustrated in FIG. 37 is circular, the two-dimensional shape may be a polygonal shape such as a quadrangular shape or a triangular shape or any other shape such as an oval shape or a semi-circular shape. Furthermore, proximal end-side first link hub 1 may be a plate-like body as illustrated in FIG. 37 or may have any other shape or may be a part of another mechanical device. The number of link mechanisms 11 is three or more, for example, may be four or five.

Three rotating bodies 2a to 2c are rotatably coupled to proximal end-side first link hub 1 in a stacked state such that the respective rotation center axes 12 are coincident. Three rotating bodies 2a to 2c are connected to proximal end-side first link hub 1 by bolt 7 and nut 8 serving as fastening members. Three rotating bodies 2a to 2c each have a hole at the center to allow the bolt 7 to pass through. A washer 9 is arranged between the head at an end of bolt 7 and rotating body 2a. Rotation friction reducing members 19 are disposed between the stacked three rotating bodies 2a to 2c. Rotation friction reducing member 19 is also arranged between proximal end-side first link hub 1 and rotating body 2c located closest to proximal end-side first link hub 1 among the stacked three rotating bodies 2a to 2c.

The two-dimensional shape of three rotating bodies 2a to 2c is substantially circular. Three rotating bodies 2a to 2c have protrusions for connecting link mechanisms 11 at the respective outer peripheral portions. The protrusions are convex portions protruding from the outer peripheral surfaces of rotating bodies 2a to 2c to the outside. Three rotating bodies 2a to 2c are each connected to the corresponding one of the three link mechanisms 11 at the protrusion.

Three link mechanisms 11 include respective first link members 4a to 4c and respective second link members 6a to 6c. The first first link member 4a is fixed to the protrusion of rotating body 2a. The second first link member 4b is fixed to the protrusion of rotating body 2b. The third first link member 4c is fixed to the protrusion of rotating body 2c. Any method can be used to fix the first link members 4a to 4c to the protrusions of rotating bodies 2a to 2c. For example, first link members 4a to 4c may be fixed to rotating bodies 2a to 2c by screws 56 serving as fastening members. Alternatively, first link members 4a to 4c may be fixed to the protrusions of rotating bodies 2a to 2c by welding or may be fixed through an adhesive layer.

First link members 4a to 4c each have a pillar-like shape having a bending portion. The lengths of first link members 4a to 4c are different from each other. First link member 4c connected to rotating body 2c arranged at a position closest to proximal end-side first link hub 1 is longest. First link member 4a connected to rotating body 2a arranged farthest from proximal end-side first link hub 1 is shortest. First link members 4a to 4c each have a first portion extending vertically to a surface of the corresponding one of rotating bodies 2a to 2c, a second portion extending diagonally to the direction in which the first portion extends, and the bending portion that is a connection portion between the first portion and the second portion. As illustrated in FIG. 38, one end of the first portion of each of first link members 4a to 4c is fixed to the corresponding one of rotating bodies 2a to 2c. The other end on the opposite side to one end of the first portion is connected to one end of the second portion. The other end on the opposite side to one end of the second portion is rotatably connected to the corresponding one of second link members 6a to 6c. The second portion is formed such that the distance from rotation center axis 12 of rotating bodies 2a to 2c gradually increases from one end toward the other end. That is, the direction in which the second portions of first link members 4a to 4c extend is inclined relative to rotation center axis 12.

The first second link member 6a is rotatably connected to first link member 4a at a first revolute pair portion 25a. The second second link member 6b is rotatably connected to first link member 4b at a first revolute pair portion 25b. The third second link member 6c is rotatably connected to first link member 4c at a first revolute pair portion 25c. First revolute pair portions 25a to 25c have first center axes 15a to 15c, respectively. First center axes 15a to 15c extend in a direction toward rotation center axis 12 of rotating bodies 2a to 2c. Furthermore, first center axes 15a to 15c are inclined relative to rotation center axis 12 such that the distance from rotating bodies 2a to 2c increases as the distance to rotation center axis 12 decreases.

First revolute pair portions 25a to 25c may have any structure. For example, first revolute pair portions 25a to 25c each may be formed with a shaft portion extending along first center axis 15a to 15c, a portion of first link member 4a to 4c having a through hole into which the shaft portion is inserted, and a portion of second link member 6a to 6b having a through hole into which the shaft portion is inserted. In this case, first link members 4a to 4c and second link members 6a to 6c are rotatable around the respective shaft portions. For example, nuts serving as positioning members may be fixed to both ends of each shaft portion in order to prevent the shaft portions from dropping off from the through holes of first link members 4a to 4c and second link members 6a to 6c.

Alternatively, the shaft portion may be connected to one of first link member 4a to 4c and second link member 6a to 6c, and the shaft portion may be inserted into the through hole formed in the other of first link member 4a to 4c and second link member 6a to 6c. The other of first link member 4a to 4c and second link member 6a to 6c may be rotatable on the shaft portion. For example, nuts serving as positioning members may be fixed to a distal end of the shaft portion in order to prevent the shaft portion from dropping off from the through hole.

Second link members 6a to 6c each include a first portion extending in a direction intersecting the direction in which first center axis 15a to 15c extends and a second portion extending from a distal end of the first portion along first center axis 15a to 15c. A base portion on the opposite side to the distal end of the first portion is a portion of first revolute pair portion 25a to 25c rotatably connected to first link member 4a to 4c.

Second link members 6a to 6c are rotatably connected to distal end-side second link hub 3 at second revolute pair portions 26a to 26c. Second revolute pair portions 26a to 26c have second center axes 16a to 16c, respectively. Specifically, second revolute pair portions 26a to 26c each include a shaft portion extending along second center axis 16a to 16c, a protrusion of distal end-side second link hub 3 having a through hole into which the shaft portion is inserted, and a pair of wall portions arranged to sandwich the protrusion and having through holes into which the shaft portion is inserted. A pair of wall portions are formed at a distal end of the second portion of each of second link members 6a to 6c. The shaft portion is formed with bolt 17 and nut 18. The protrusion of distal end-side second link hub 3 and each of second link members 6a to 6c are rotatable around the shaft portion. As illustrated in FIG. 39, rotation resistance reducing members 29 are arranged between a pair of wall portions and the protrusion of distal end-side second link hub 3. Any member that can reduce the friction coefficient between the pair of wall portions and the protrusion can be used as rotation friction reducing member 29. For example, a resin shim washer with a lower friction coefficient can be used as rotation friction reducing member 29.

Second center axes 16a to 16c extend in a direction different from first center axes 15a to 15c and extend in a direction toward rotation center axis 12 of rotating bodies 2a to 2c. Second center axes 16a to 16c extend, for example, in a direction orthogonal to rotation center axis 12 of rotating bodies 2a to 2c.

In three link mechanisms 11, first center axes 15a to 15c of first revolute pair portions 25a to 25c intersect with second center axes 16a to 16c of second revolute pair portions 26a to 26c at a spherical link center point 30. Rotation center axis 12 of three or more rotating bodies 2a to 2c intersects with spherical link center point 30. As long as the relation above is satisfied, the arrangement of first revolute pair portions 25a to 25c and second revolute pair portions 26a to 26c can be changed as desired. As can be seen from FIG. 39, in each of three second link members 6a to 6c, the angle formed between first center axis 15a to 15c and second center axis 16a to 16c is substantially 90° as viewed from distal end-side second link hub 3 (hereinafter, two-dimensional view). Furthermore, first center axes 15a to 15c are arranged at regular intervals in a circumferential direction around spherical link center point 30.

The two-dimensional shape of distal end-side second link hub 3 is hexagonal or may be any other polygonal shape. The two-dimensional shape may be any shape such as a circular shape or an oval shape.

Three link mechanisms 11 are arranged at regular intervals on a circumference in a two-dimensional view. That is, for first center axes 15a to 15c, the angle formed between adjacent two first center axes is 120° as viewed from spherical link center point 30 in a two-dimensional view. Furthermore, for second center axes 16a to 16c, the angle formed between adjacent two second center axes is 120° as viewed from spherical link center point 30 in a two-dimensional view. Three link mechanisms 11 may be arranged at different intervals on a circumference in a two-dimensional view.

<Operation of Parallel Link Mechanism>

Figure 41:
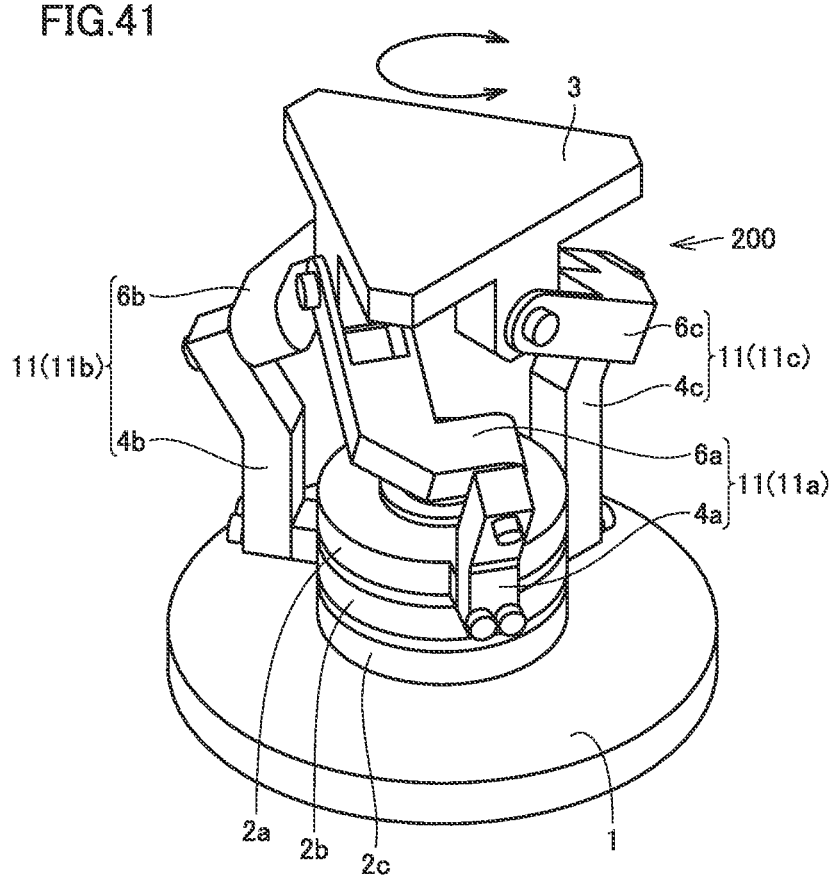
FIG. 41 is a perspective view for explaining a basic posture of the parallel link mechanism illustrated in FIG. 37.
Figure 42:
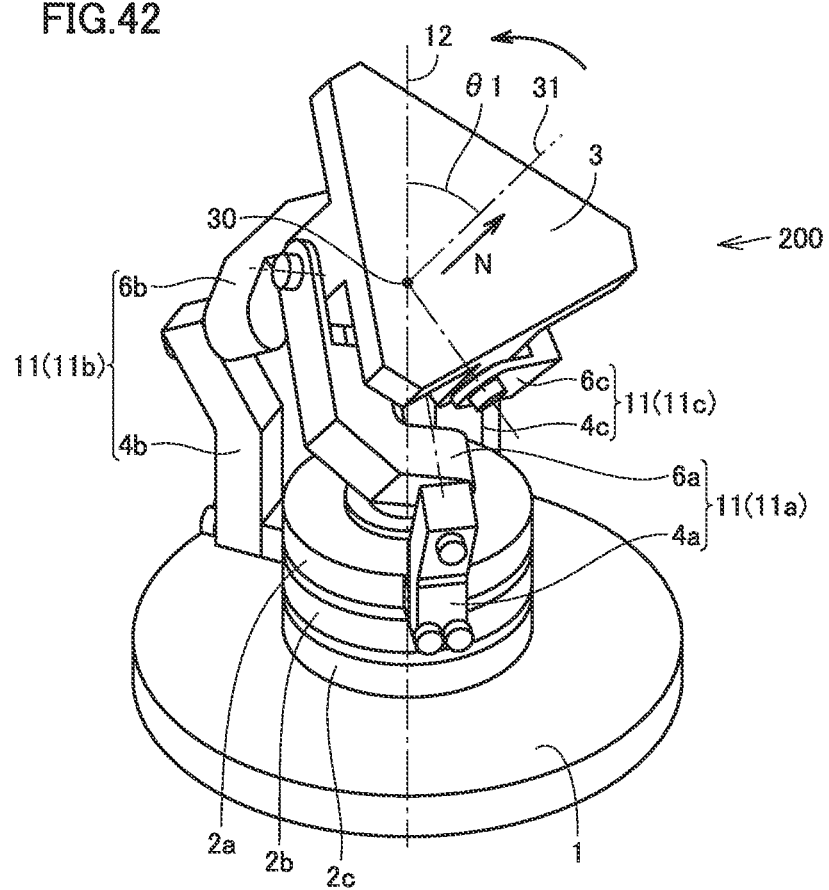
FIG. 42 is a perspective view for explaining operation at the time of posture change of the parallel link mechanism illustrated in FIG. 37.
Figure 43:
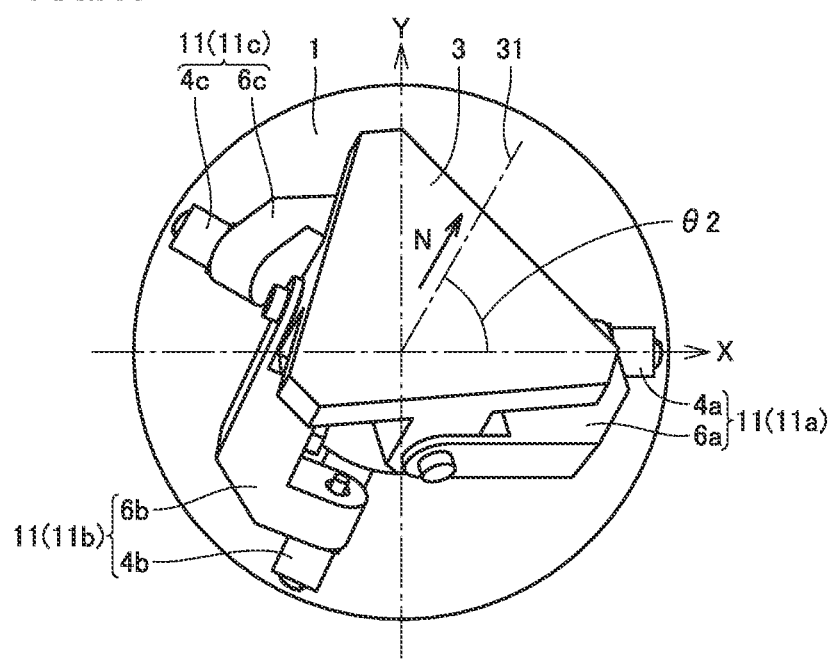
FIG. 43 is a top view of the parallel link mechanism illustrated in FIG. 42.

FIG. 41 is a perspective view for explaining a basic posture of the parallel link mechanism illustrated in FIG. 37. FIG. 42 is a perspective view for explaining operation at the time of posture change of the parallel link mechanism illustrated in FIG. 37 is changed. FIG. 43 is a top view of the parallel link mechanism illustrated in FIG. 42.

As illustrated in FIG. 40 and FIG. 41, when the proximal ends of three first link members 4a to 4c are arranged at equiangular intervals, a normal vector representing the posture of distal end-side second link hub 3 matches with the rotation axis of rotating bodies 2a to 2c.

On the other hand, as illustrated in FIG. 42, when three rotating bodies 2a to 2c are rotated such that the angular intervals of three first link members 4a to 4c are varied, the posture of distal end-side second link hub 3 relative to proximal end-side first link hub 1 can be changed as desired. That is, three rotation angles of three rotating bodies 2a to 2c are controlled so that bend angle θ1 and traverse angle θ2 in the posture of distal end-side second link hub 3 as viewed from spherical link center point 30 can be controlled. That is, the posture of distal end-side second link hub 3 has two degrees of freedom, namely, bend angle θ1 and traverse angle θ2.

As illustrated in FIG. 42, as used herein bend angle θ1 is the angle formed by distal end-side link hub center axis 31 (the direction of the normal vector of the distal end-side second link hub), which is a straight line vertical to all of second center axes 16a to 16c and passing through spherical link center point 30, and rotation center axis 12 of rotating bodies 2a to 2c. As illustrated in FIG. 43, traverse angle θ2 is the angle formed by a projection line of the distal end-side link hub center axis 31 (corresponding to the normal vector) on a plane (XY plane) passing through spherical link center point 30 and to which rotation center axis 12 intersect vertically, and the X axis set on the XY plane where spherical link center point 30 is the origin.

<Control of Parallel Link Mechanism>

Figure 44:
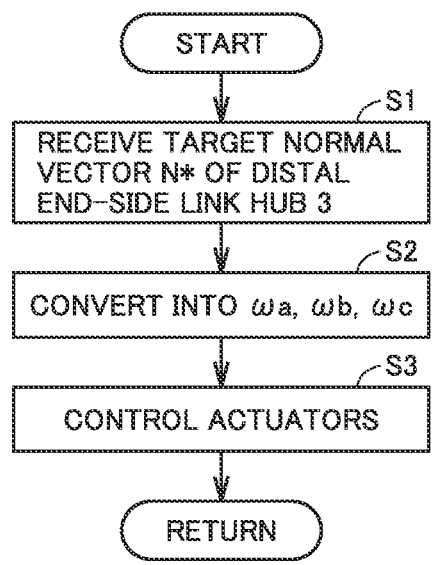
FIG. 44 is a flowchart for explaining control of the parallel link mechanism executed by a control device 100.

FIG. 44 is a flowchart for explaining control of the parallel link mechanism executed by control device 100. Referring to FIG. 37 and FIG. 44, first of all, at step S1, control device 100 receives information corresponding to a target normal vector of distal end-side second link hub 3. This information is, for example, input from manual operation unit 105, transmitted from a high-level control device, or stored in advance in storage unit 106.

Subsequently, at step S2, control device 100 converts the received information into corresponding ωa, ωb, and ωc in converter 104.

The conversion in converter 104 may be conversion by computation using mathematical expressions or may use a conversion table in which bend angle θ1 and traverse angle θ2 are inputs and angles ωb and ωc are outputs. For example, such a conversion table may be created by incrementing or decrementing angles ωb and ωc of parallel link mechanism 200 by a certain angle and measuring the corresponding normal vector (x, y, z) in advance. Instead of the normal vector (x, y, z), bend angle θ1 and traverse angle θ2 may be measured in advance. An example of this conversion table is shown in Table 1. Such a conversion table is stored in storage unit 106 in advance. Converter 104 refers to such a conversion table stored in storage unit 106 to perform conversion. In the eleventh embodiment, ωa=0 is fixed, and the conversion table at least includes data for angles ωb and ωc.

TABLE 1

| ωb | ωc | Nx | Ny | Nz | θ1 | θ2 |
|---|---|---|---|---|---|---|
| β + 0 | γ + 0 | x00 | y00 | z00 | ■ | ■ |
| β + 0 | γ + 1 | x01 | y01 | z01 | ■ | ■ |
| β + 0 | γ + 2 | x02 | y02 | z02 | ■ | ■ |
| β + 0 | ■ | ■ | ■ | ■ | ■ | ■ |
| β + 0 | ■ | ■ | ■ | ■ | ■ | ■ |
| β + 0 | γ + n | x0n | y0n | z0n | ■ | ■ |
| β + 1 | γ + 1 | x11 | y11 | z11 | ■ | ■ |
| β + 1 | γ + 2 | x12 | y12 | z13 | ■ | ■ |
| β + 1 | ■ | ■ | ■ | ■ | ■ | ■ |
| β + 1 | ■ | ■ | ■ | ■ | ■ | ■ |
| β + 1 | γ + n | x1n | y1n | z1n | ■ | ■ |
| β + 2 | γ + 2 | x22 | y22 | z23 | ■ | ■ |
| β + 2 | ■ | ■ | ■ | ■ | ■ | ■ |
| β + 2 | ■ | ■ | ■ | ■ | ■ | ■ |
| ■ | ■ | ■ | ■ | ■ | ■ | ■ |
| ■ | ■ | ■ | ■ | ■ | ■ | ■ |

In Table 1 above, β and γ are initial values in an operable angle range determined by, for example, the dimensions of each member of parallel link mechanism 200. In Table 1, the angle is incremented by 1° from the initial values β and γ, and data of the corresponding normal vector N (Nx, Ny, Nz) is registered. Bend angle θ1 and traverse angle θ2 corresponding to normal vector N may be registered as data. The increment of the angle is 1° but the present invention is not limited thereto. When the increments of ωb and ωc in the conversion table are slightly larger increments, data may be interpolated and input of finer data may be used for conversion.

Subsequently, at step S3, control device 100 determines target angles ωa*, ωb*, and ωc* corresponding to the obtained angles and drives actuator 111 to 113 by drive unit 103 such that the positions of the proximal ends of first link members 4a to 4c are matched with target angles ωa*, ωb*, and ωc*.

In the link actuation device 1000 in the eleventh embodiment, control device 100 drives the actuators as explained with reference to FIG. 44 so that the posture of distal end-side second link hub 3 of parallel link mechanism 200 is matched with the designated posture.

By contrast, for example, at the time of execution of direct teaching, or at start-up from a state in which the current position is unknown, for example, after recovery from abnormality, control device 100 measures angles ωa, ωb, and ωc to teach the posture of second link hub 3 at that moment.

Figure 45:
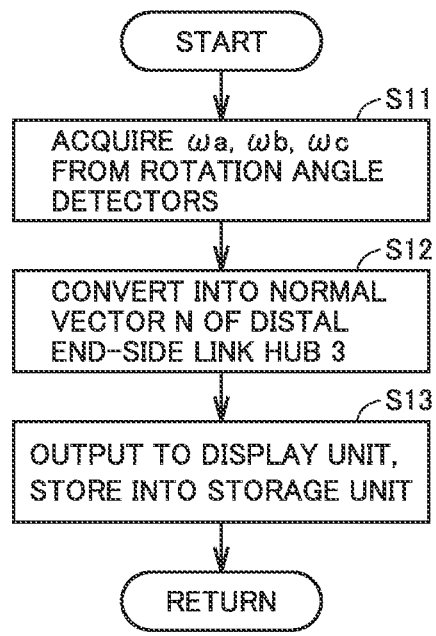
FIG. 45 is a flowchart for explaining teaching operation executed by control device 100.

FIG. 45 is a flowchart for explaining teaching operation executed by control device 100. Referring to FIG. 37 and FIG. 45, first of all, at step S11, control device 100 acquires angles ωa, ωb, and ωc using rotation angle detectors 121 to 123.

Then, at step S12, control device 100 convers angles ωa, ωb, and ωc into a normal vector N (x, y, z) of distal end-side second link hub 3, in converter 102 of teaching unit 101. Since ωa=0 in the eleventh embodiment, the conversion table shown in Table 1 as previously mentioned can be used for the conversion. Converter 102 refers to the conversion table such as Table 1 stored in advance in storage unit 106 to perform conversion.

Subsequently, at step S13, teaching unit 101 displays information indicating the normal vector corresponding to the posture at present on display unit 107 and stores the obtained normal vector into storage unit 106 as initial information on posture or information on direct teaching.

As explained above, link actuation device 1000 described in the eleventh embodiment includes parallel link mechanism 200 and control device 100. Parallel link mechanism 200 includes proximal end-side first link hub 1, at least three link mechanisms 11, first rotating body 2b and second rotating body 2c respectively connected to first link mechanism 11b and second link mechanism 11c among at least three link mechanisms 11, and distal end-side second link hub 3. Each of first rotating body 2b and second rotating body 2c is rotatably coupled to first link hub 1. At least three link mechanisms 11 include respective first link members 4a to 4c and respective second link members 6a to 6c rotatably connected to first link members 4a to 4c at first revolute pair portions 25a to 25c. Second link members 6a to 6c are rotatably connected to second link hub 3 at second revolute pair portions 26a to 26c. First link member 4b of first link mechanism 11b is fixed to first rotating body 4b, and first link member 4c of second link mechanism 11c is fixed to second rotating body 2c. In at least three link mechanisms 11, the first center axes of first revolute pair portions 25a to 25c intersect with the second center axes of second revolute pair portions 26a to 26c at the spherical link center point. The rotation center axis of first rotating body 2b and second rotating body 2c intersects with the spherical link center point. Control device 100 determines rotation angles ωb and we of first rotating body 2b and second rotating body 2c when receiving information representing the normal vector corresponding to the posture of second link hub 3 relative to the spherical link center point.

In this way, distal end-side second link hub 3 can be operated with two degrees of freedom relative to proximal end-side first link hub 1. That is, two rotating bodies 2b to 2c are rotated, whereby distal end-side second link hub 3 can be moved relative to proximal end-side first link hub 1 along a sphere around spherical link center point 30. Furthermore, since the posture of distal end-side second link hub 3 is controlled by rotation motion of rotating bodies 2b to 2c, a compact link actuation device including parallel link mechanism 200 described above can be implemented. In addition, since distal end-side second link hub 3 moves along a sphere around spherical link center point 30, the operation of distal end-side second link hub 3 is easily imagined.

When one of the rotating bodies is fixed and used as in the eleventh embodiment, one of the rotating bodies may be omitted and one first link member may be fixed to proximal end-side first link hub 1.

Twelfth Embodiment

In the eleventh embodiment, control is performed while one first link member 4a among three link mechanisms 11 is fixed. However, such control may impose a limitation on the bend angle with some traverse angles.

Figure 46:
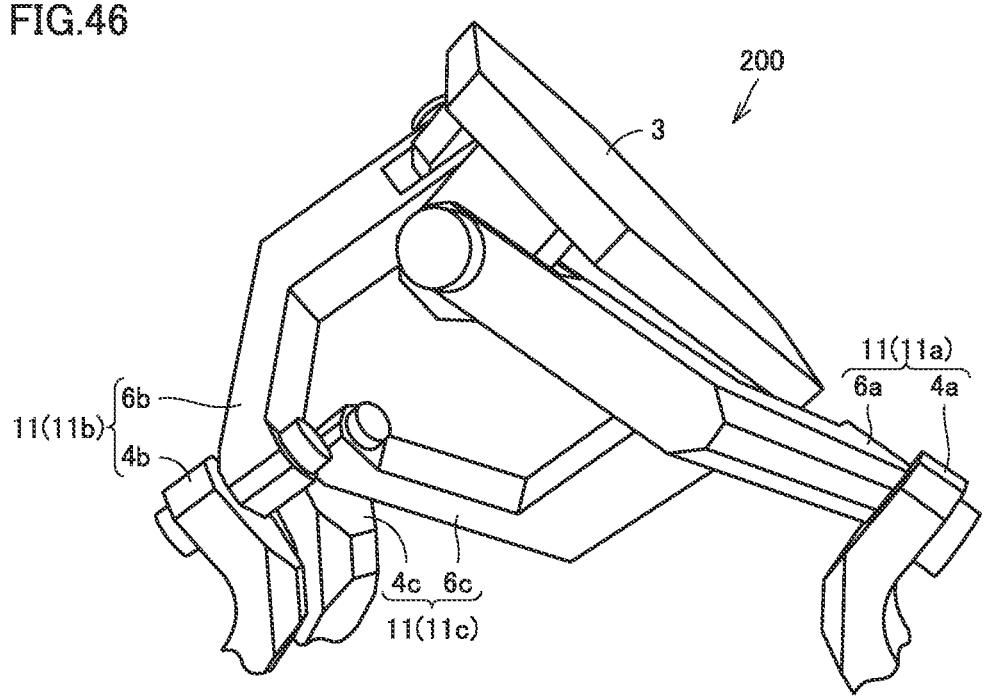
FIG. 46 is a perspective view illustrating a posture of the parallel link mechanism when bend angle θ1 has a large limitation.
Figure 47:
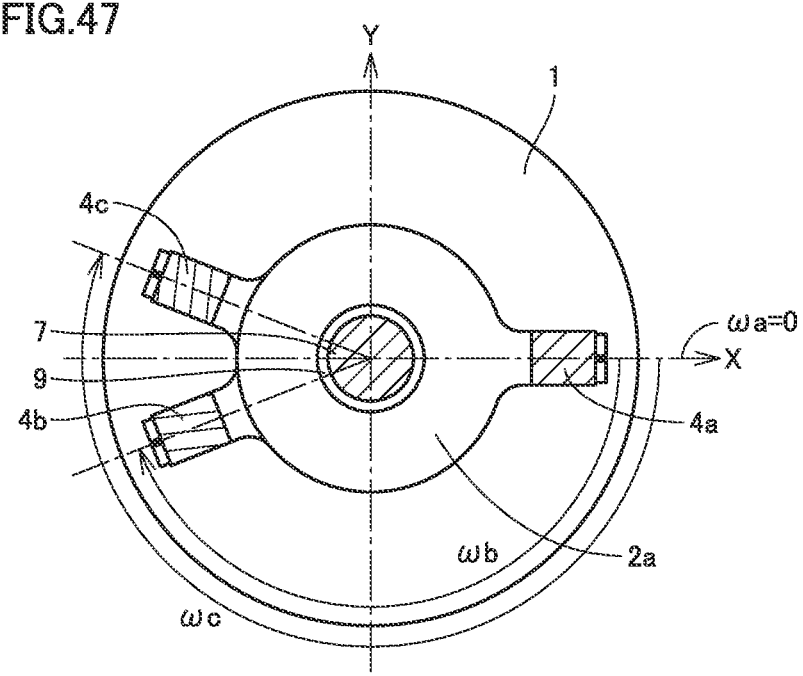
FIG. 47 is a diagram illustrating arrangement of the proximal ends of first link members 4a to 4c corresponding to the posture illustrated in FIG. 46.

FIG. 46 is a perspective view illustrating a posture of the parallel link mechanism when bend angle θ1 has a large limitation. FIG. 47 is a diagram illustrating arrangement of the proximal ends of first link members 4a to 4c corresponding to the posture illustrated in FIG. 46.

In the posture in FIG. 46, traverse angle θ2 is in the direction of the proximal end of first link member 4a. In such a case, second link member 6a interferes with distal end-side second link hub 3, and as illustrated in FIG. 46, the upper limit of bend angle θ1 is about 45°.

Figure 48:
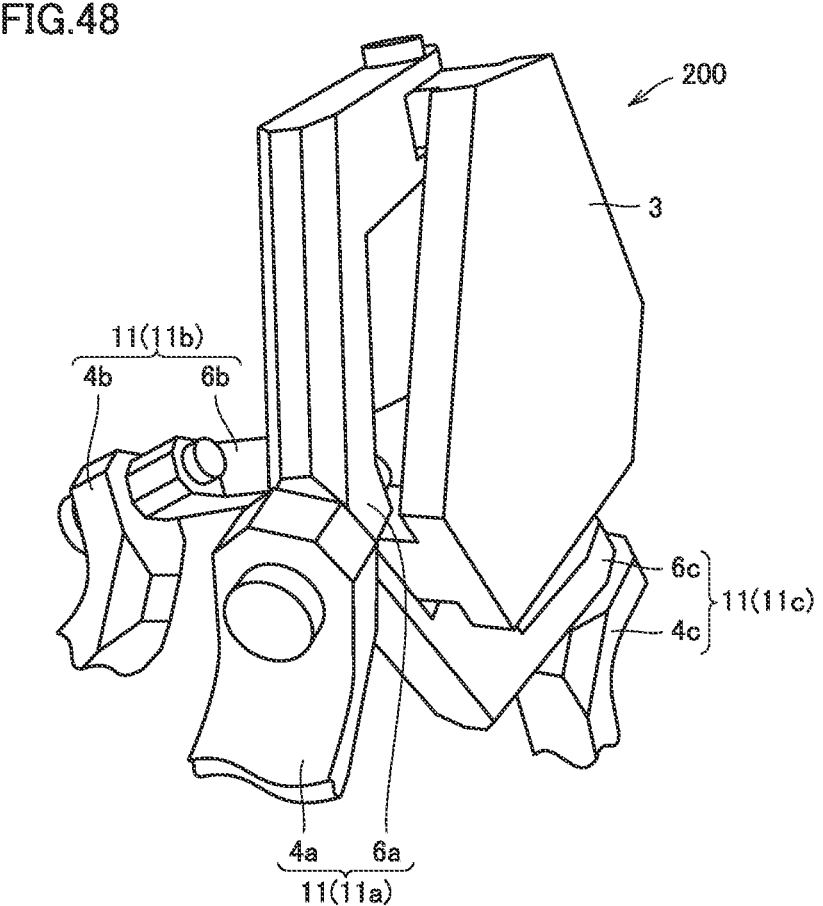
FIG. 48 is a perspective view illustrating a posture of the parallel link mechanism when bend angle θ1 has a small limitation.
Figure 49:
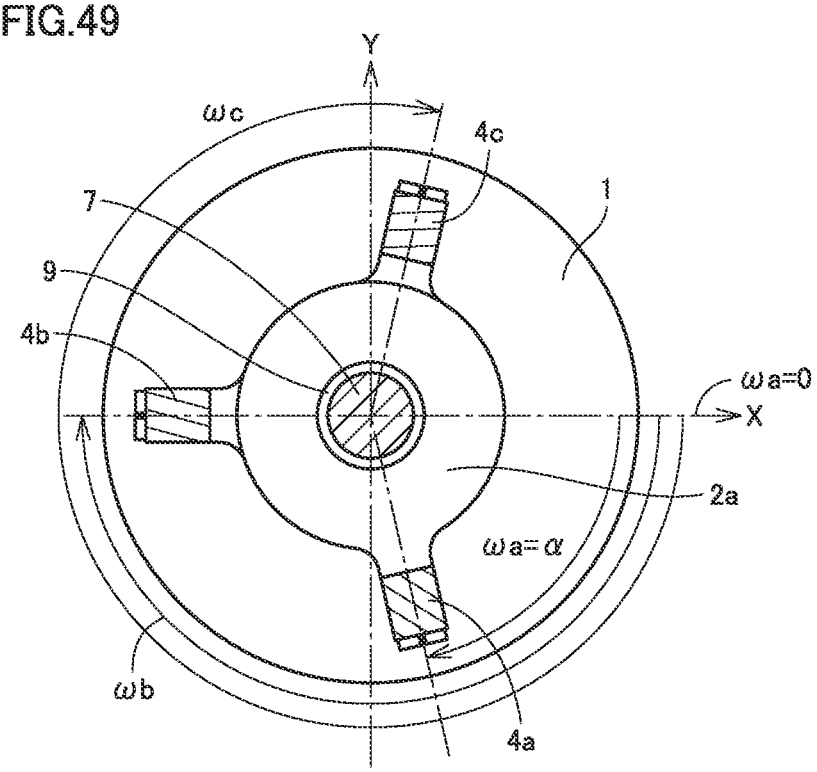
FIG. 49 is a diagram illustrating arrangement of the proximal ends of first link members 4a to 4c corresponding to the posture illustrated in FIG. 48.

FIG. 48 is a perspective view illustrating a posture of the parallel link mechanism when bend angle θ1 has a small limitation. FIG. 49 is a diagram illustrating arrangement of the proximal ends of first link members 4a to 4c corresponding to the posture illustrated in FIG. 48.

In the posture in FIG. 48, traverse angle θ2 is in the intermediate direction just between the proximal end of first link member 4a and the proximal end of first link member 4c. In such a case, all of second link members 6a to 6c are less likely to interfere with distal end-side second link hub 3. In such a posture, the upper limit of bend angle θ1 is close to about 90°.

Here, in the eleventh embodiment, while ωa=0 is fixed, angles ωb and ωc correspond to two degrees of freedom, θ1 and θ2. However, if ωa is variable, the posture illustrated in FIG. 48 can be oriented to any direction.

More specifically, all of rotating bodies 2a to 2c are only rotated by the same angle in the same direction as indicated by the arrow in FIG. 41 so that second link hub 3 can be rotated around rotation center axis 12 (see FIG. 38) while the posture of distal end-side second link hub 3 is maintained. At this moment, the relative positional relation between the protrusions of rotating bodies 2a to 2c, that is, between the proximal ends of first link members 4a to 4c is maintained.

Furthermore, as illustrated in FIG. 42, the rotation direction or the rotation angle of rotating body 2a in addition to rotating bodies 2b and 2c is varied so that the posture of distal end-side second link hub 3 relative to proximal end-side first link hub 1 can be changed as desired. That is, the rotation angles of three rotating bodies 2a to 2c are controlled so that bend angle θ1, traverse angle θ2, and the rotation angle in the posture of distal end-side second link hub 3 as viewed from spherical link center point 30 can be controlled. That is, the posture of distal end-side second link hub 3 has three degrees of freedom, namely, bend angle θ1, traverse angle θ2, and rotation angle.

As used herein the rotation angle is rotation angle ωa when the proximal end of first link member 4a rotates from the reference position illustrated in FIG. 40 around rotation center axis 12 relative to proximal end-side first link hub 1.

However, with some kinds of end effector 302 (shown by a broken line in FIG. 38) attached to distal end-side second link hub 3, the end effector needs a rotation process. For example, an end effector that does not have directionality, such as a needle, does not require a rotation process. On the other hand, for an end effector for use in inspection, such as a camera, it is desirable to perform a process of rotating a camera image such that an image is rotated. Furthermore, when end effector 302 is a two-finger hand that picks up a work, it is desirable that a rotation mechanism 301 (shown by a broken line in FIG. 38) for rotating the hand is provided on distal end-side second link hub 3 to rotate the hand according to rotation angle ωa. The image rotation process or the physical rotation process for an end effector such as a hand is executed if necessary.

Figure 50:
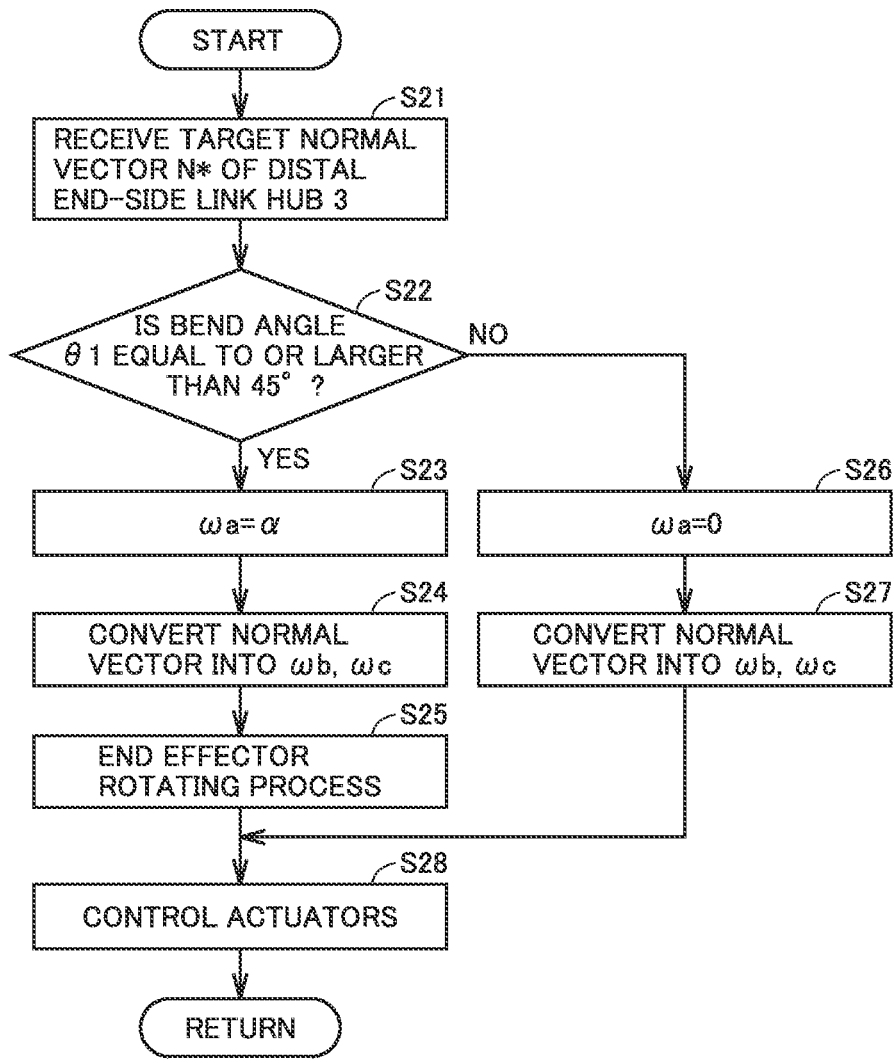
FIG. 50 is a flowchart for explaining a process executed by control device 100 in a twelfth embodiment.

FIG. 50 is a flowchart for explaining a process executed by control device 100 in a twelfth embodiment. Referring to FIG. 37 and FIG. 50, at step S21, control device 100 receives information corresponding to a target normal vector of distal end-side second link hub 3.

Subsequently, at step S22, control device 100 determines whether bend angle θ1 corresponding to the information acquired at step S21 is equal to or larger than 45°. Although the determination threshold is 45° here, the determination value is changed as appropriate depending on the structure of parallel link mechanism 200.

If bend angle θ1 is not equal to or larger than 45° (NO at step S22), the rotation angle need not be changed, and at step S26, rotation angle ωa=0 is set, and at step S27, control device 100 converts the received information into corresponding ωb and ωc in converter 104, in the same manner as in the eleventh embodiment. The conversion in converter 104 may be conversion by computation using mathematical expressions or may use a conversion table in which bend angle θ1 and traverse angle θ2 are inputs and angles ωb and ωc are outputs.

On the other hand, if bend angle θ1 is equal to or larger than 45° (YES at step S22), distal end-side second link hub 3 and second link member 6a interfere with each other unless the rotation angle is changed, and therefore, at step S23, control device 100 sets rotation angle ωa=α. When there are three link mechanisms 11, for example, α=60° may be set, but α may be a value other than 0°. Then, at step S24, control device 100 converts the received information into corresponding ωb and ωc in converter 104. When a conversion table is used, at step S27, a conversion table where ωa=0, similar to the one in the eleventh embodiment, is referred to, and at step S24, a conversion table where ωa=α is prepared and stored in storage unit 106 in advance, and the conversion table where ωa=α is referred to.

At step S25, control device 100 further performs a rotation process for the end effector attached to distal end-side second link hub 3, if necessary. The rotation process here includes a process of rotating an image captured by the end effector or a process of physically rotating the end effector.

Subsequently or simultaneously, at step S28, control device 100 determines target angles ωa*, ωb*, and ωc* corresponding to the obtained angles and drives actuators 111 to 113 by drive unit 103 such that the positions of the proximal ends of first link members 4a to 4c are matched with target angles ωa*, ωb*, and ωc*.

In the link actuation device according to the twelfth embodiment, at least three link mechanisms 11 are first to third link mechanisms. At least two rotating bodies are first to third rotating bodies 2a to 2c respectively corresponding to first to third link mechanisms 11.

Parallel link mechanism 200 described above further includes third rotating body 2a connected to third link mechanism 11a among at least three link mechanisms 11. When receiving information, control device 100 determines rotation angle ωa of third rotating body 2a, in addition to rotation angle ωb of first rotating body 2b and rotation angle ωc of second rotating body 2c.

In this way, in the twelfth embodiment, since three rotating bodies 2a to 2c are provided as rotating bodies, parallel link mechanism 200 can be moved with three degrees of freedom including rotation angle α in addition to bend angle θ1 and traverse angle θ2.

Preferably, as explained with reference to FIG. 50, if, at the point of time when the information indicating a target normal vector is given, bend angle θ1 indicated by the normal vector indicated by the information is unable to be achieved with the rotation angle of third rotating body 2a (YES at S22), control device 100 changes rotation angle ωa of first rotating body 2a and determines rotation angles ωa to ωc of rotating bodies 2a to 2c such that bend angle θ1 is achieved (S23, S24).

Further preferably, when the rotation angle of first rotating body 2a is changed, control device 100 also executes a rotation process for an end effector attached to second link hub 3 (S25).

In this way, in the link actuation device in the twelfth embodiment, control device 100 drives the actuators as explained with reference to FIG. 50 so that the posture of distal end-side second link hub 3 of parallel link mechanism 200 is matched with the designated posture. By doing so, the operable range of bend angle θ1 can be widened for any direction of traverse angle θ2.

Thirteenth Embodiment

In the eleventh and twelfth embodiments, rotating bodies 2a to 2c are driven by actuators 111 to 113. For example, two rotating bodies can be rotated using a hollow rotation shaft. In this respect, in a thirteenth embodiment, an example in which posture control drive sources 35a to 35c are attached as actuators to the proximal end-side first link hub will be described. For control of the actuators, the method described in the eleventh embodiment or the twelfth embodiment is applied, and a description thereof will not be repeated here.

Figure 51:
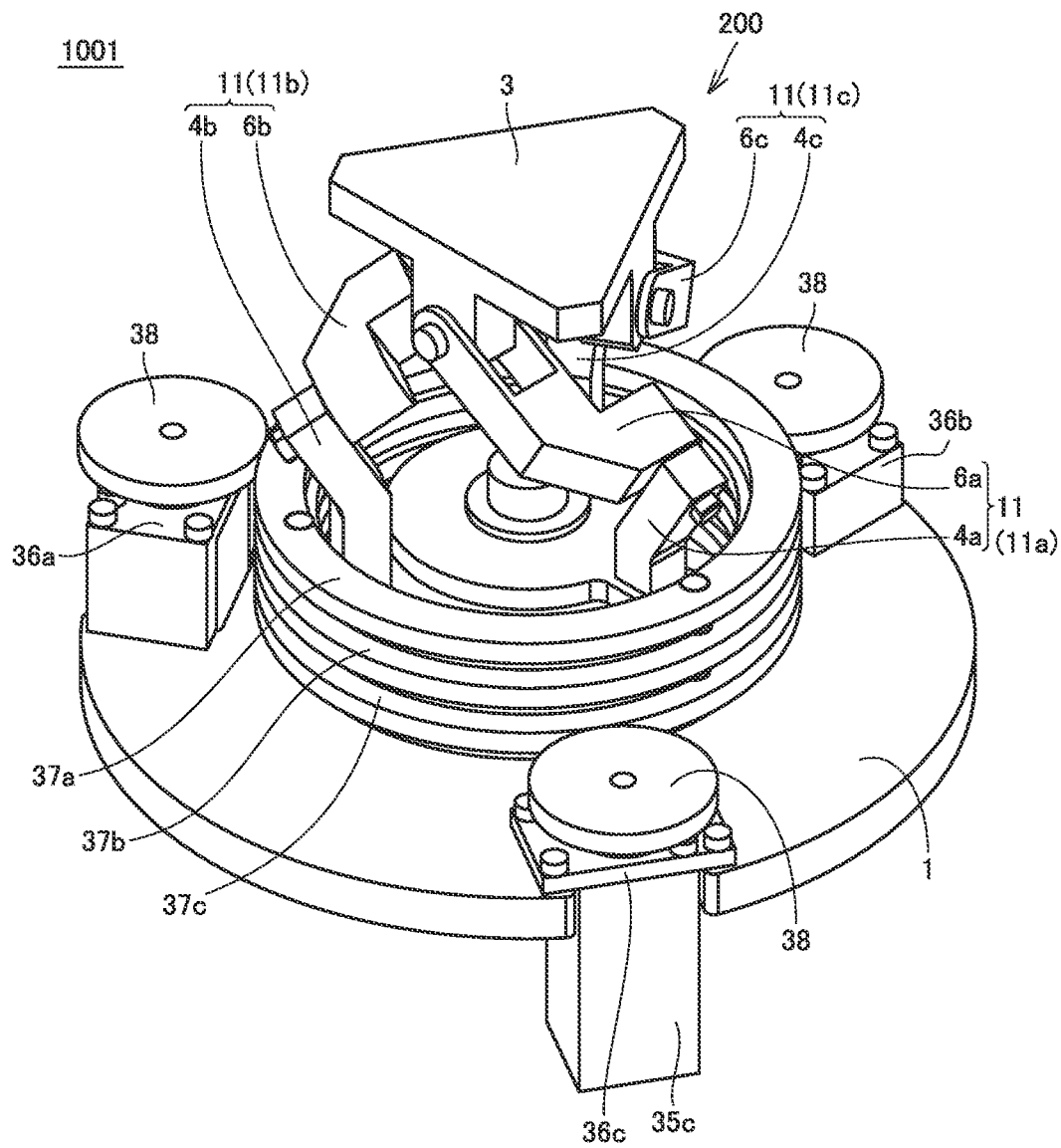
FIG. 51 is a perspective view illustrating a configuration of the link actuation device according to a thirteenth embodiment.

FIG. 51 is a perspective view illustrating a configuration of the link actuation device according to the thirteenth embodiment. A link actuation device 1001 illustrated in FIG. 51 is basically a link actuation device including parallel link mechanism 200 illustrated in FIG. 37 to FIG. 50. Link actuation device 1001 illustrated in FIG. 51 mainly includes parallel link mechanism 200 and posture control drive sources 35a to 35c for driving the parallel link mechanism 200.

In link actuation device 1001 illustrated in FIG. 51, proximal end-side first link hub 1 is formed so as to extend to the outside of the outer periphery of rotating bodies 2a to 2c. That is, the size of proximal end-side first link hub 1 in a two-dimensional view is larger than the size of rotating bodies 2a to 2c in a two-dimensional view. The two-dimensional shape of proximal end-side first link hub 1 may be circular as illustrated in FIG. 51 or may be any other shape, for example, a polygonal shape such as a quadrangular shape or a triangular shape, or may be an oval shape. Three posture control drive sources 35a to 35c are fixed to proximal end-side first link hub 1 through fastening parts 36a to 36c. For example, electric motors can be used as posture control drive sources 35a to 35c.

Posture control drive sources 35a to 35c are respectively connected to rotating bodies 2a to 2c such that drive force can be transmitted through gears 38 and rotation transmitting members 37a to 37c. Posture control drive sources 35a to 35c are arranged substantially at regular intervals in a circumferential direction around rotation center axis 12 in a two-dimensional view. Posture control drive sources 35a to 35c may be arranged at different intervals in the circumferential direction.

Specifically, posture control drive sources 35a to 35c each include a rotation shaft, and gear 38 is connected to an end of the rotation shaft. Furthermore, rotation transmitting members 37a to 37c are fixed to the outer peripheral portions of rotating bodies 2a to 2c by fastening members 47 such as screws. Rotation transmitting members 37a to 37c are annular members each having a gear portion on the outer peripheral portion. Any method other than the method using fastening members 47 described above can be employed to fix rotation transmitting members 37a to 37c to rotating bodies 2a to 2c as long as necessary strength and precision is ensured. For example, rotation transmitting members 37a to 37c may be fixed to rotating bodies 2a to 2c by bonding, press-fitting, crimping, or the like.

The gear portions of rotation transmitting members 37a to 37c are meshed with gears 38 connected to the rotation shafts of posture control drive sources 35a to 35c. The rotation shafts of posture control drive sources 35a to 35c rotate to cause gears 38 and rotation transmitting members 37a to 37c to rotate and consequently drive the rotation of rotating bodies 2a to 2c.

First link members 4a to 4c of link mechanisms 11 are fixed to rotating bodies 2a to 2c by screws serving as fastening members 46. Rotating bodies 2a to 2c are rotated by posture control drive sources 35a to 35c to change the positions of link mechanisms 11 around rotation center axis 12. As a result, the posture of distal end-side second link hub 3 can be changed.

As described above, link actuation device 1001 according to the thirteenth embodiment includes parallel link mechanism 200 and posture control drive sources 35a to 35c. Posture control drive sources 35a to 35c rotate at least three rotating bodies 2a to 2c among three or more rotating bodies 2a to 2c and change the posture of distal end-side second link hub 3 as desired relative to proximal end-side first link hub 1.

In this case, posture control drive sources 35a to 35c individually control a plurality of link mechanisms 11 to enable distal end-side second link hub 3 to operate in a wide range and precisely. Furthermore, the parallel link mechanism as described above can be used to implement a lightweight and compact link actuation device.

The link actuation device described above includes rotation transmitting members 37a to 37c connected to at least three rotating bodies 2a to 2c. Posture control drive sources 35a to 35c rotate at least three rotating bodies 2a to 2c through rotation transmitting members 37a to 37c. In this case, since rotation transmitting members 37a to 37c are installed as separate members on rotating bodies 2a to 2c, the material of rotation transmitting members 37a to 37c can be selected independently of the material of rotating bodies 2a to 2c.

Even in the thirteenth embodiment, when one of the rotating bodies is fixed and used as in the eleventh embodiment, one of the rotating bodies may be omitted and one first link member may be fixed to proximal end-side first link hub 1.

Embodiments disclosed here should be understood as being illustrative rather than being limitative in all respects. The scope of the present invention is shown not in the foregoing description but in the claims, and it is intended that all modifications that come within the meaning and range of equivalence to the claims are embraced here.

REFERENCE SIGNS LIST 1 proximal end-side link hub (first link hub), 2a to 2d rotating body, 3 distal end-side link hub (second link hub), 4a to 4d first link member, 6a to 6d second link member, 7, 17 bolt, 8, 18 nut, 9, 69 washer, 11, 11a to 11c link mechanism, 12 rotation center axis, 15a to 15d first center axis, 16a to 16d second center axis, 19, 29 rotation friction reducing member, 22a, 22b protrusion, 25a to 25d first revolute pair portion, 26a to 26d second revolute pair portion, 27a to 27c through hole, 28a to 28c connection portion, 30 spherical link center point, 31 distal end-side link hub center axis, 33 shim, 35a, 35b, 35c, 35d, 95a, 95b, 95c posture control drive source, 36a to 36c fastening part, 37a to 37c rotation transmitting member, 38 gear, 39, 49, 59 bearing, 46, 47 fastening member, 48a to 48c rotation transmitting portion, 56 screw, 58 pulley, 60 arrow, 65, 75a, 75b, 75c yoke, 66a, 66b, 66c, 76a, 76b, 76c, 766b teeth, 67a, 67b, 67c, 77a, 77b, 77c magnet, 68a, 68b, 68c, 78a, 78b, 78c stator coil, 70 projection, 71 retaining member, 81a, 81b, 81c, 83a, 83b, 83c detection target, 82c, 84a detector, 98a bevel gear, 98a, 98c bevel gear.

The invention claimed is:

1. A parallel link mechanism comprising:
a proximal end-side link hub;
three or more link mechanisms;
three or more rotating bodies connected to the three or more link mechanisms, respectively; and
a distal end-side link hub, wherein
the three or more rotating bodies are rotatably coupled to the proximal end-side link hub and are aligned such that respective rotation center axes coincide one another,
each of the three or more link mechanisms includes i) a first link member and ii) a second link member rotatably connected to the first link member at a first revolute pair portion,
the second link member is rotatably connected to the distal end-side link hub at a second revolute pair portion,
the first link member of each of the three or more link mechanisms is fixed to one of the three or more rotating bodies, in the three or more link mechanisms, a first center axis of the first revolute pair portion intersects with a second center axis of the second revolute pair portion at a spherical link center point, a rotation center axis of the three or more rotating bodies intersects with the spherical link center point, the proximal end-side link hub has a surface facing the three or more rotating bodies, the three or more rotating bodies are stacked in a direction along the rotation center axis on the surface of the proximal end-side link hub in order from a side closer to the proximal end-side link hub, and the parallel link mechanism further comprises a fastening member that fixes the three or more rotating bodies to the proximal end side link hub, and a plurality of bearings that are disposed between the fastening member and each of the three or more rotating bodies.

2. The parallel link mechanism according to claim 1, wherein the three or more rotating bodies are stacked such that the respective rotation center axes are coincident.

3. The parallel link mechanism according to claim 2, wherein the three or more rotating bodies each have an annular through hole surrounding the rotation center axis, the three or more rotating bodies include a first rotating body and a second rotating body disposed on the side closer to the proximal end-side link hub as viewed from the first rotating body, and the first link member connected to the second rotating body passes through inside of the through hole of the first rotating body and extends toward the distal end-side link hub.

4. The parallel link mechanism according to claim 2, wherein at least one of the first revolute pair portion and the second revolute pair portion includes a bearing.

5. A link actuation device comprising:

the parallel link mechanism of claim 1; and a posture control drive source that rotates the one or more rotating bodies and changes a posture of the distal end-side link hub as desired relative to the proximal end-side link hub.

6. The link actuation device according to claim 5, wherein the one or more rotating bodies and the posture control drive source are mechanically connected.

7. The link actuation device according to claim 6, further comprising a rotation transmitting member connected to the one or more rotating bodies, wherein the posture control drive source rotates the one or more rotating bodies through the rotation transmitting member.

8. The link actuation device according to claim 6, wherein the one or more rotating bodies include a rotation transmitting portion, and the posture control drive source rotates the one or more rotating bodies through the rotation transmitting portion.

9. The link actuation device according to claim 5, wherein the one or more rotating bodies and the posture control drive source are magnetically connected.

10. The link actuation device according to claim 5, wherein the one or more rotating bodies include a magnet, and the posture control drive source includes a coil disposed to face the magnet in a radial direction with respect to the rotation center axis.

11. The link actuation device according to claim 5, wherein the one or more rotating bodies are three rotating bodies, and the posture control drive source rotates the three rotating bodies.

12. The link actuation device according to claim 5, wherein the one or more rotating bodies are four rotating bodies, and the posture control drive source rotates the four rotating bodies.

13. The link actuation device according to claim 5, further comprising a rotation amount detecting mechanism that detects an amount of rotation of the one or more rotating bodies.

14. The link actuation device according to claim 5, further comprising a control device, wherein the one or more rotating bodies include a first rotating body and a second rotating body respectively connected to a first link mechanism and a second link mechanism among the three or more link mechanisms, and when the control device receives information representing a normal vector corresponding to a posture of the distal end-side link hub relative to the spherical link center point, the control device determines rotation angles of the first rotating body and the second rotating body.

15. The link actuation device according to claim 14, wherein in the parallel link mechanism, the one or more rotating bodies further include a third rotating body connected to a third link mechanism among the three or more link mechanisms, and when the control device receives the information, the control device determines rotation angles of the first to third rotating bodies.

16. The link actuation device according to claim 15, wherein when a bend angle indicated by the normal vector indicated by the information is unable to be achieved with a rotation angle of the third rotating body at a point of time when the information is received, the control device changes the rotation angle of the third rotating body and determines rotation angles of the first to third rotating bodies such that the bend angle is achieved.

17. The link actuation device according to claim 16, wherein when the rotation angle of the third rotating body is changed, the control device also executes a rotation process for an end effector attached to the distal end-side link hub.

18. The link actuation device according to claim 5, wherein the distal end side link hub overlaps with the second link member when viewed along the rotation center axis of the three or more rotating bodies.

19. A parallel link mechanism comprising:

a proximal end-side link hub;

three or more link mechanisms;

three or more rotating bodies connected to the three or more link mechanisms, respectively; and a distal end-side link hub, wherein the three or more rotating bodies are rotatably coupled to the proximal end-side link hub and are aligned such that respective rotation center axes coincide with one another, each of the three or more link mechanisms includes i) a first link member and ii) a second link member rotatably connected to the first link member at a first revolute pair portion, the second link member is rotatably connected to the distal end-side link hub at a second revolute pair portion, the first link member of each of the three or more link mechanisms is fixed to one of the three or more rotating bodies, in the three or more link mechanisms, a first center axis of the first revolute pair portion intersects with a second center axis of the second revolute pair portion at a spherical link center point, a rotation center axis of the three or more rotating bodies intersects with the spherical link center point, the three or more rotating bodies are disposed annularly, inner diameters of the three or more rotating bodies are different from each other, and the three or more rotating bodies are aligned in a radial direction with respect to the rotation center axis such that the respective rotation center axes are coincident.

* * * * *